(12) United States Patent
Shiflett et al.

US008707720B2

(10) Patent No.: US 8,707,720 B2
(45) Date of Patent: Apr. 29, 2014

(54) HYBRID VAPOR COMPRESSION-ABSORPTION CYCLE

(75) Inventors: Mark Brandon Shiflett, Wilmington, DE (US); Akimichi Yokozeki, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 254 days.

(21) Appl. No.: 12/820,635

(22) Filed: Jun. 22, 2010

(65) Prior Publication Data

US 2010/0257879 A1 Oct. 14, 2010

Related U.S. Application Data

(62) Division of application No. 11/435,352, filed on May 16, 2006, now Pat. No. 7,765,823.

(60) Provisional application No. 60/682,191, filed on May 18, 2005.

(51) Int. Cl.
| | | |
|---|---|---|
| *F25B 41/00* | (2006.01) | |
| *F25B 27/00* | (2006.01) | |
| *F25B 15/00* | (2006.01) | |
| *C09K 5/00* | (2006.01) | |

(52) U.S. Cl.
USPC .............. 62/196.1; 62/238.6; 62/483; 252/67

(58) Field of Classification Search
USPC ..................... 62/197, 87, 483, 238, 6; 252/67
See application file for complete search history.

(56) References Cited

U.S. PATENT DOCUMENTS

| | | | |
|---|---|---|---|
| 4,013,712 | A | 3/1977 | Ragoonanan et al. |
| 4,031,712 | A * | 6/1977 | Costello .......................... 62/483 |
| 4,388,812 | A | 6/1983 | Clark |
| 5,672,293 | A | 9/1997 | Minor et al. |
| 5,709,092 | A | 1/1998 | Shiflett |
| 5,950,451 | A | 9/1999 | Kim |
| 6,500,358 | B2 | 12/2002 | Singh et al. |
| 2006/0197053 | A1 | 9/2006 | Shiflett et al. |
| 2006/0251961 | A1 | 11/2006 | Olbert et al. |
| 2007/0027038 | A1* | 2/2007 | Kamimura et al. .......... 508/244 |
| 2007/0089449 | A1 | 4/2007 | Gurin |
| 2007/0131535 | A1 | 6/2007 | Shiflett et al. |
| 2007/0144186 | A1 | 6/2007 | Shiflett et al. |
| 2007/0295478 | A1 | 12/2007 | Shiflett et al. |

FOREIGN PATENT DOCUMENTS

| | | |
|---|---|---|
| DE | 3623680 A1 | 1/1988 |
| DE | 44 15 199 A1 | 4/1994 |
| EP | 0 012 856 B1 | 12/1983 |
| RU | 2079071 | 5/1997 |
| WO | 2005/007657 A2 | 1/2005 |
| WO | 2005/113702 A1 | 12/2005 |
| WO | 2006/134015 A1 | 12/2006 |

OTHER PUBLICATIONS

Ki-Sub Kim et al., Refractive index and heat capacity of 1-butyl-3-methylimidazolium bromide and 1-butyl-3-methylimidazolium tetrafluoroborate, and vapor pressure of binary systems for 1-butyl-3-methylimidazolium bromide + trifluoroethanol and 1-butyl-3-methylimidazolium tetrafluoroborate + trifluoroethanol, Fluid Phase Equilibria 218 (2004), pp. 215-220.
Y. Nezu et al., Thermodynamic Properties of Working-Fluid Pairs with R-134a for Absorption Refrigeration System, Natural Fluids, 2003, pp. 446-453.
International Search Report and Written Opinion, Jan. 22, 2007.
Haaf et al., Refrigeration Technology, Ullmann's Encyclopedia of Industrial Chemistry, 6th Edition, vol. 31:269-312, 2002.
Nezu et al.,Thermogynamic Properties of Working-Fluid Pairs With R-134A for Absorption Refrigeration System, Natural Working Fluids, IIR Gustav Lorentzen Conf. 5th, China, Sep. 17-20, 2002, pp. 446-453.
Fatouh et al., Comparison of R22-Absorbent Pairs for Absorption Cooling Based on P-T-X Data, Renewable Energy, 1993, vol. 3:31-37.
Bhatt et al., Thermodynamic Modelling OG Absorption-Resorption Heating Cycles With Some New Working Pairs, Heat Recovery System & CHP, 1992, vol. 12:225-233.
Yokozeki, Solubility and Viscosity of Refrigerant-Oil Mixtures, Proc. Int. Compressor Eng., Conf. A Purdue, 1994, vol. 1:335-340.
Yokozeki, Int. Solubility of Refrigerants in Various Lubricants, J. Thermophys., 2001, vol. 22:1057-1071.
Yokozeki, Theoretical Performances of Various Refrigerant-Absorbent Pairs in a Vapor-Absorption Refrigeration Cycle by the Use of Equations of State, Applied Energy, 2005, vol. 80:383-399.
Tillner-Roth, A Helmholtz Free Energy Formulation of the Thermodynamic Properties of the Mixture (Water & Ammonia), J. Phys. Chem. Ref. Data, 1998, vol. 27:63-96.
Yokozeki, Refrigerants of Ammonia and N-Butane Mixtures, Ecolibrium, 2004, vol. 3:20-24.
Stoecker et al., Absorption Refrigeration, Refrigeration and Air Conditioning, 1982, pp. 328-350, McGraw-Hill.

(Continued)

*Primary Examiner* — Monique Peets

(57) ABSTRACT

The present invention relates to a hybrid vapor compression—absorption cooling or heating system and apparatus containing a refrigerant pair comprising at least one refrigerant and at least one ionic liquid. The present invention also provides for the performance of a hybrid vapor compression—absorption cycle that utilizes refrigerants and absorbents such as fluorocarbon gases in fluorinated ionic liquids. The present invention also provides a method of cooling by the execution of a hybrid vapor compression—absorption cycle using a refrigerant pair comprising at least one refrigerant and at least one ionic liquid. The present invention also provides a method of heating by the execution of a hybrid vapor compression—absorption cycle using a refrigerant pair comprising at least one refrigerant and at least one ionic liquid.

13 Claims, 13 Drawing Sheets

(56) References Cited

OTHER PUBLICATIONS

L. Xu et al., Fluoroalkylated N-Heterocyclic Carbene Complexes of Palladium, Journal of Organometallic Chemistry, 2000, vol. 598:409-416.

Yokozeki, Time-Dependent Behavior of Gas Absorption in Lubricant Oil, Int. J. Refrigeration, 2002, vol. 22:695-704.

Silvestri et al., Performance of Hybrid Chemical/Mechanical Heat Pump, Proceedings of the Intersociety Energy Conversion Engineering Conference, 1990, vol. 2:239-243.

Grzyll et al., The Development of a Performance-Enhancing Additive for Vapor-Compression Heat Pumps, Proceedings of the 32nd Intersociety Energy Conversion Engineering Conference, 1997, vol. 3 & 4:1252-1257.

Fukata et al., Performance of Compression/Absorption Hybeid Refrigeration Cycle With Propane/Mineral Combination, International Journal of Refrigeration, 2002, vol. 25:907-915.

Grzyll et al., Development of a Hybrid Chemical/Mechanical Heat Pump, Proceedings of the Intersociety Energy Conversion Engineering Conference, 1991, vol. 2:547-552.

\* cited by examiner

HYBRID VAPOR COMPRESSION-ABSORPTION CYCLE

This application is a divisional application and claims the priority benefit of U.S. patent application Ser. No. 11/435,352, filed May 16, 2006, now allowed, which claims priority benefit of U.S. Provisional Application No. 60/682,191, filed May 18, 2005, which is incorporated in its entirety as a part hereof for all purposes.

TECHNICAL FIELD

The present invention relates to a hybrid vapor compression—absorption cooling or heating system utilizing a refrigerant pair comprising at least one refrigerant and at least one absorbent, wherein the absorbent in a preferred embodiment may be at least one ionic liquid.

BACKGROUND OF THE INVENTION

As a new type of solvent with immeasurable vapor pressure, room-temperature ionic liquids are being used for chemical separation and unique reaction media. Solvent phase behavior is an important factor in the attractiveness of using ionic liquids in these applications as well as in new applications such as absorption cooling or heating.

Vapor compression and absorption refrigeration cycles are well-known methods of cooling and are described by Haaf, S. and Henrici, H. in "Refrigeration Technology" (*Ullmann's Encyclopedia of Industrial Chemistry*, Sixth Edition, Wiley-VCH Verlag GmbH, Weinheim, Germany, Volume 31, pages 269-312). The basic cooling cycle is the same for the absorption and vapor compression systems. Both systems use a low-temperature liquid refrigerant that absorbs heat from water, air or any medium to be cooled, and converts to a vapor phase (in the evaporator section). The refrigerant vapors are then compressed to a higher pressure (by a compressor or a generator), converted back into a liquid by rejecting heat to the external surroundings (in the condenser section), and then expanded to a low-pressure mixture of liquid and vapor (in the expander section) that goes back to the evaporator section and the cycle is repeated. The basic difference between the vapor compression system and absorption system is that a vapor compression system uses an electric motor for operating a compressor used for raising the pressure of refrigerant vapors, and an absorption system uses heat for compressing refrigerant vapors to a high-pressure.

Absorption chillers have been combined with vapor compression chillers in "hybrid" central plants to provide cooling at the lowest energy costs; for example the absorption chiller will be operated during high electric peak load when charges are high, whereas the vapor compression chiller will be operated during low electric peak load when charges are low, resulting in a more economical system. It would be desirable to have one system that integrates components of both the vapor compression and absorption cycles.

Vapor compression systems generally use ammonia or fluorocarbon derivatives as refrigerants, whereas absorption cycles generally use ammonia/water or lithium bromide/water. The two systems are not compatible in that fluorocarbon derivatives are not very soluble in water. While ammonia could be used for both systems, the toxicity and flammability associated with ammonia makes this option less desirable.

Although U.S. patent application Ser. No. 11/346,028, which is incorporated in its entirety as a part hereof for all purposes, discloses an absorption cycle wherein refrigerant pairs comprising at least one refrigerant and at least one ionic liquid are utilized, a need remains for systems to run a hybrid vapor compression—absorption cycle utilizing a refrigerant pair comprising at least one refrigerant and at least one ionic liquid.

SUMMARY

This invention provides for the execution or performance of a hybrid vapor compression—absorption cycle by operating or running a system or other equipment or apparatus that are suitable to accomplish heating or cooling in view of the heat rejected and absorbed during the repetition of the cycle.

One embodiment of this invention provides an apparatus for temperature adjustment that includes (a) an absorber that forms a mixture of a mixture of a refrigerant and an absorbent; (b) a generator that receives the mixture from the absorber and heats the mixture to separate refrigerant, in vapor form, from the absorbent, and increases the pressure of the refrigerant vapor; (c) a condenser that receives the vapor from the generator and condenses the vapor under pressure to a liquid; (d) a pressure reduction device through which the liquid refrigerant leaving the condenser passes to reduce the pressure of the liquid to form a mixture of liquid and vapor refrigerant; (e) an evaporator that receives the mixture of liquid and vapor refrigerant that passes through the pressure reduction device to evaporate the remaining liquid to form first and second portions of refrigerant vapor; (f) a compressor that receives the first portion of the refrigerant vapor, increases the pressure thereof, and passes the first portion of the refrigerant vapor to the condenser; and (g) a conduit that passes the second portion of the refrigerant vapor leaving the evaporator to the absorber.

Another embodiment of this invention provides an apparatus for temperature adjustment that includes (a) an absorber that forms a mixture of a mixture of a refrigerant and an absorbent; (b) a generator that receives the mixture from the absorber and heats the mixture to separate refrigerant, in vapor form, from the absorbent, and increases the pressure of the refrigerant vapor; (c) a compressor that receives the vapor from the generator and further increases its pressure; (d) a condenser that receives the vapor from the compressor and condenses the vapor under pressure to a liquid; (e) a pressure reduction device through which the liquid refrigerant leaving the condenser passes to reduce the pressure of the liquid to form a mixture of liquid and vapor refrigerant; (f) an evaporator that receives the mixture of liquid and vapor refrigerant that passes through the pressure reduction device to evaporate the remaining liquid to form refrigerant vapor; and (g) a conduit that passes the refrigerant vapor leaving the evaporator to the absorber.

In either of these embodiments, the apparatus may be used for heating by locating the condenser in proximity to an object, medium or space to be heated, or the apparatus may be used for cooling by locating the evaporator in proximity to an object, medium or space to be cooled.

In a further embodiment, this invention provides a process for adjusting the temperature of an object, medium or a space by (a) absorbing refrigerant vapor with an absorbent to form a mixture; (b) heating the mixture to separate refrigerant, in vapor form, from the absorbent and increase the pressure of the refrigerant vapor; (c) condensing the refrigerant vapor under pressure to a liquid; (d) reducing the pressure of the liquid refrigerant, and evaporating the refrigerant to form first and second portions of refrigerant vapor; (e-1) mechanically increasing the pressure of the first portion of refrigerant vapor, and then repeating step (c) to subject the first portion of refrigerant vapor to condensation to liquid; and (e-2) repeating step (a) to re-absorb, with the absorbent, the second portion of refrigerant vapor.

In yet another embodiment, this invention provides a process for adjusting the temperature of an object, medium or a space comprising (a) absorbing refrigerant vapor with an absorbent to form a mixture; (b) heating the mixture to separate refrigerant, in vapor form, from the absorbent and increase the pressure of the refrigerant vapor; (c) further increasing the pressure of the refrigerant vapor mechanically; (d) condensing the refrigerant vapor under pressure to a liquid; (e) reducing the pressure of the liquid refrigerant, and evaporating the refrigerant to form refrigerant vapor; and (f) repeating step (a) to re-absorb the refrigerant vapor with the absorbent.

In either of these process embodiments, the temperature adjustment performed by the process may be an increase in temperature, and for that purpose refrigerant vapor is condensed to a liquid in proximity to an object, medium or space to be heated; or the temperature adjustment performed by the process may be a decrease in temperature, and for that purpose liquid refrigerant is evaporated in proximity to an object, medium or space to be cooled.

In any of the above embodiments, the refrigerant may be selected from one or more members of the group consisting of a hydrofluorocarbon, a hydrochlorofluorocarbon, a chlorofluorocarbon, a fluorocarbon, $N_2$, $O_2$, $CO_2$, $NH_3$, Ar, $H_2$, $H_2O$, and a non-fluorinated hydrocarbon, wherein the non-fluorinated hydrocarbon is selected from the group consisting of $C_1$ to $C_4$ straight-chain, branched or cyclic alkanes and $C_1$ to $C_4$ straight-chain, branched or cyclic alkenes; and/or the absorbent may be one or more ionic liquids.

DETAILED DESCRIPTION

Figure 1:
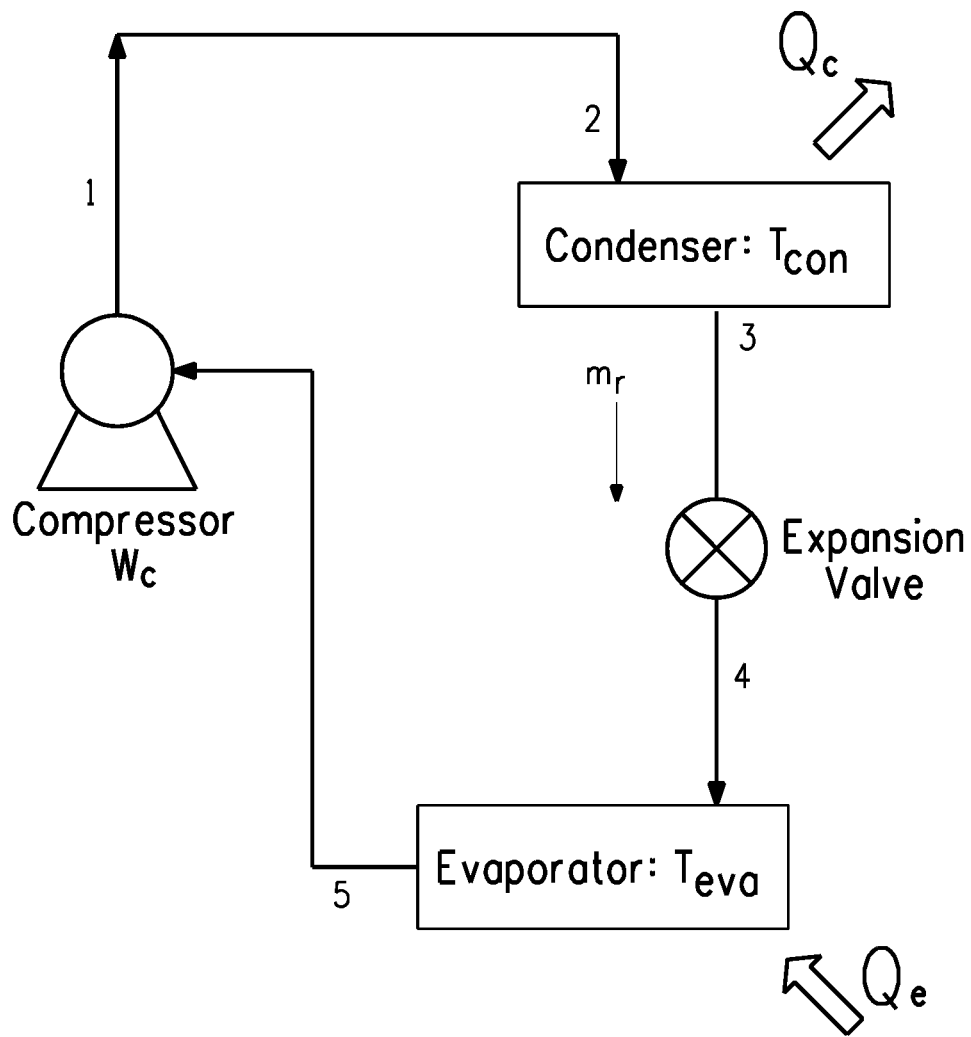
FIG. 1 shows a schematic diagram of a system to run a simple vapor compression cycle.

In this disclosure, definitions are provided for various terms as set forth in the following list and elsewhere below:

The term "ionic liquid" is defined as an organic salt that is fluid at or below about 100° C.

The term "fluorinated ionic liquid" is defined as an ionic liquid having at least one fluorine on either the cation or the anion. A "fluorinated cation" or "fluorinated anion" is a cation or anion, respectively, comprising at least one fluorine.

The terms "refrigerant pair" and "refrigerant/ionic liquid pair" are used interchangeably and refer to a pair or mixture comprising both a refrigerant and an ionic liquid. A "refrigerant pair composition" is a composition comprising a refrigerant pair. A "mixed refrigerant" is a refrigerant composition comprising at least two refrigerants.

A "refrigerant" is a fluidic substance such as a fluorocarbon (FC), hydrofluorocarbon (HFC), chlorofluorocarbon (CFC), hydrochlorofluorocarbon (HCFC), or ammonia, alkanes, alkenes, aromatics, carbon dioxide, or other gas such as hydrogen, oxygen, nitrogen, and argon that may be used as a thermal energy transfer vehicle. A refrigerant, when it changes phase from liquid to vapor (evaporates), removes heat from the surroundings; and when it changes phase from vapor to liquid (condenses), it adds heat to the surroundings. Although the term refrigerant may carry the connotation of a substance used only for cooling, the term is used herein in the generic sense of a thermal energy transfer vehicle or substance that is applicable for use in a system or apparatus that may be used for heating or cooling.

The term "fluorinated refrigerant" or "fluorine-containing refrigerant" refers to a fluorocarbon, hydrofluorocarbon, chlorofluorocarbon, or hydrochlorofluorocarbon.

The term "vacuum" refers to pressures less than about 1 bar but greater than about $10^{-4}$ bar for practical use in absorption cycles.

The term "alkane" refers to a saturated hydrocarbon having the general formula $C_nH_{2n+2}$ that may be a straight-chain, branched or cyclic. A cyclic compound requires a minimum of three carbons.

The term "alkene" refers to an unsaturated hydrocarbon that contains one or more C=C double bonds and that may be a straight-chain, branched or cyclic. An alkene requires a minimum of two carbons. A cyclic compound requires a minimum of three carbons.

The term "aromatic" refers to benzene and compounds that resemble benzene in chemical behavior.

A "heteroatom" is an atom other than carbon in the structure of an alkanyl, alkenyl, cyclic or aromatic compound.

"Heteroaryl" refers to an alkyl group having a heteroatom.

An "azeotropic" or "constant boiling" mixture of two or more refrigerants is a mixture wherein the composition of the vapor and liquid phases are substantially the same at a temperature and pressure encountered in a cooling or heating cycle. Included in the definition of a constant boiling mixture is a "near-azeotropic" mixture, which, as described in U.S. Pat. No. 5,709,092, maintains a substantially constant vapor pressure even after evaporative losses, thereby exhibiting constant boiling behavior.

Hybrid Vapor Compression—Absorption Cycles

The present invention relates to a hybrid vapor compression—absorption cooling and heating system that utilizes refrigerant pairs comprising at least one refrigerant and at least one absorbent. In preferred embodiments, the absorbent may be one or more ionic liquids. The invention also provides a process for temperature adjustment, either cooling or heating, utilizing refrigerant/absorbent pairs in a hybrid vapor compression—absorption cooling or heating system.

Figure 2:
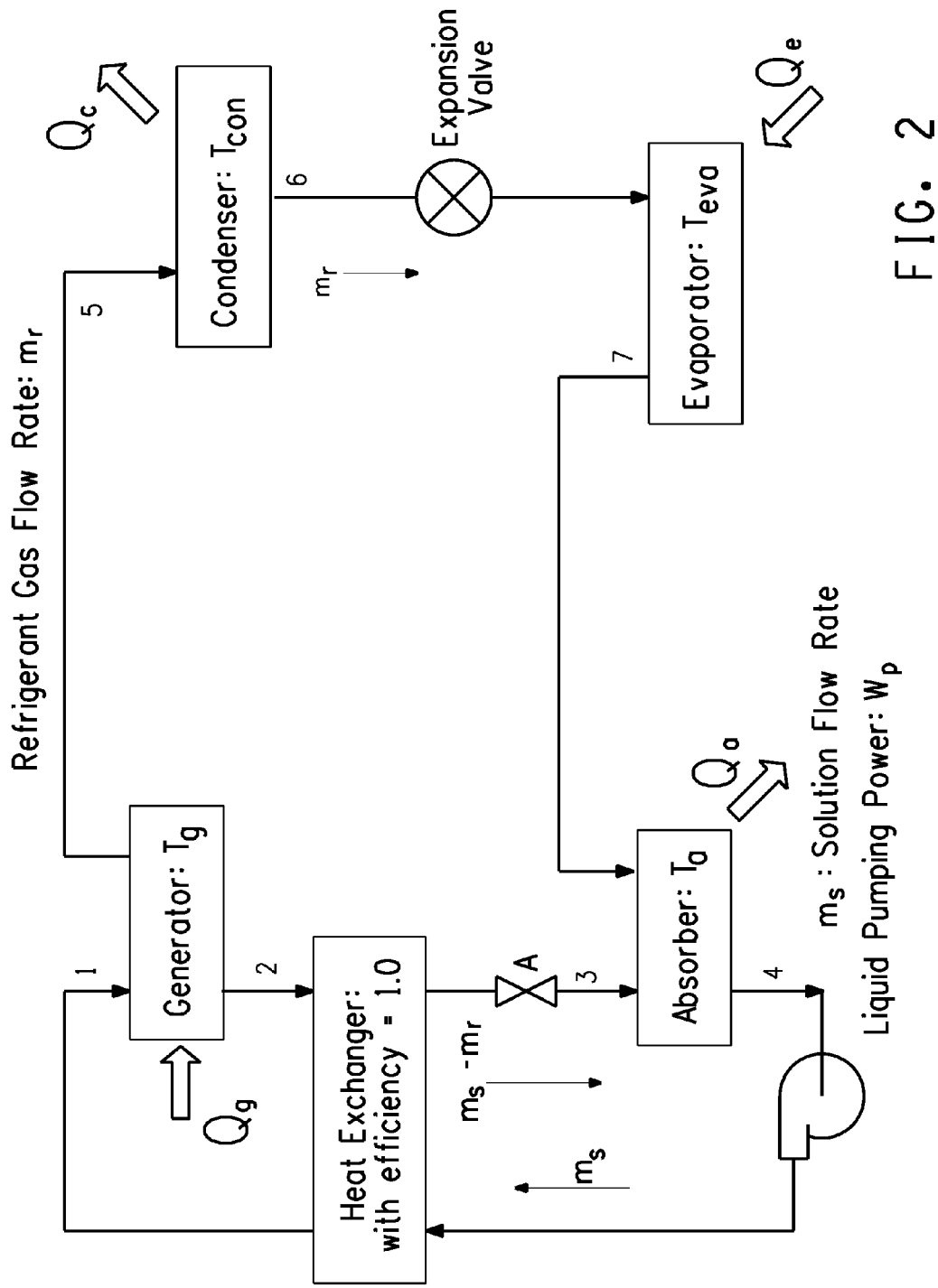
FIG. 2 shows a schematic diagram of a system to run a simple absorption cycle.

Vapor compression and absorption cycles, and systems in which they are run, are described in Application Guide for Absorption Cooling/Refrigeration Using Recovered Heat [Dorgan et at (American Society of Heating, Refrigeration and Air Conditioning Engineers, Inc., 1995, Atlanta, Ga., Chapter 5)]. A schematic diagram for a system in which a simple vapor compression cycle is run is shown in FIG. 1. The system is composed of condenser and evaporator units with an expansion valve, and a vapor compressor that is capable of mechanically increasing the pressure of a refrigerant vapor. A schematic diagram for a simple absorption cycle is shown in FIG. 2. The system is composed of condenser and evaporator units with an expansion valve similar to an ordinary vapor compression cycle shown in FIG. 1, but an absorber-generator solution circuit replaces the compressor. The circuit may be composed of an absorber, a generator, a heat exchanger, a pressure control device (A) and a pump for circulating the solution. In some embodiments, the heat released by the absorber upon the absorption of the refrigerant by the absorbent may be used to heat a mixture of refrigerant and absorbent in the generator to separate the refrigerant in vapor form from the absorbent.

Figure 3:
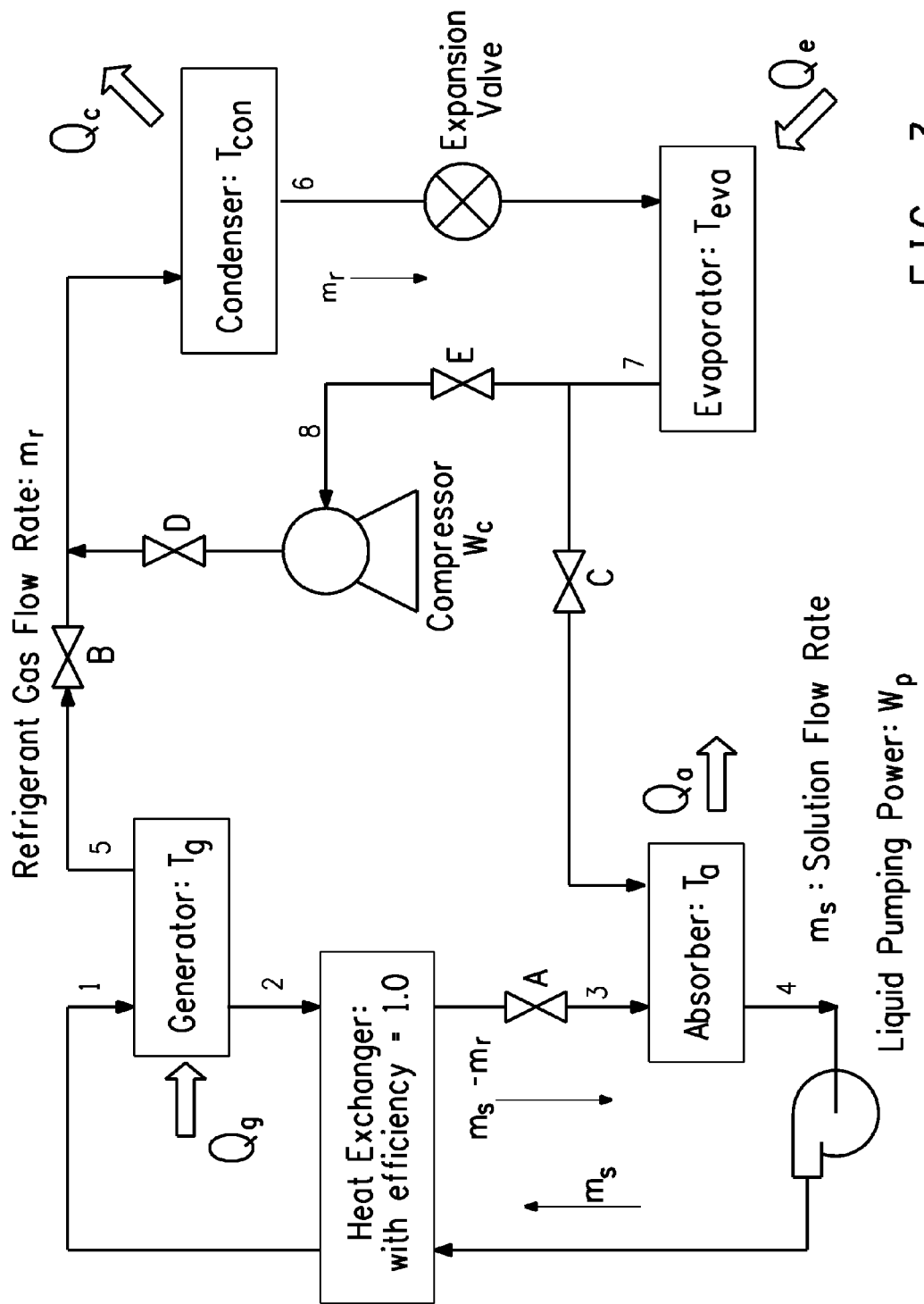
FIG. 3 shows a schematic diagram of a system to run a simple hybrid vapor compression—absorption cycle (parallel configuration).

A schematic diagram for a system running a simple hybrid vapor compression-absorption cycle with a parallel configuration is shown in FIG. 3. The system is composed of a condenser unit and an evaporator unit with an expansion valve similar to an ordinary vapor compression cycle as shown in FIG. 1, a compressor, an absorber-generator solution circuit, which has a vapor absorber, a gas generator, a heat exchanger, a pressure control (reducing) valve (A), a solution liquid pump, and isolation valves to direct the refrigerant flow path (B-E).

The parallel configuration can operate in three modes. Mode 1 operates like a conventional absorption cycle where isolation valves D and E are closed and isolation valves B and C are open, which reassembles the same flow path as shown in FIG. 2. Mode 2 operates like a conventional vapor compression cycle where isolation valves D and E are open and isolation valves B and C are closed, which reassembles the same flow path as shown in FIG. 1. Mode 3 combines the use of both the vapor compression and the absorption cycles where isolation valves B, C, D, and E are all open, as shown in FIG. 3. The system is referred to as a "hybrid" system because the same configuration of the equipment and/or apparatus can be run with or without the involvement of the compressor.

Figure 4:
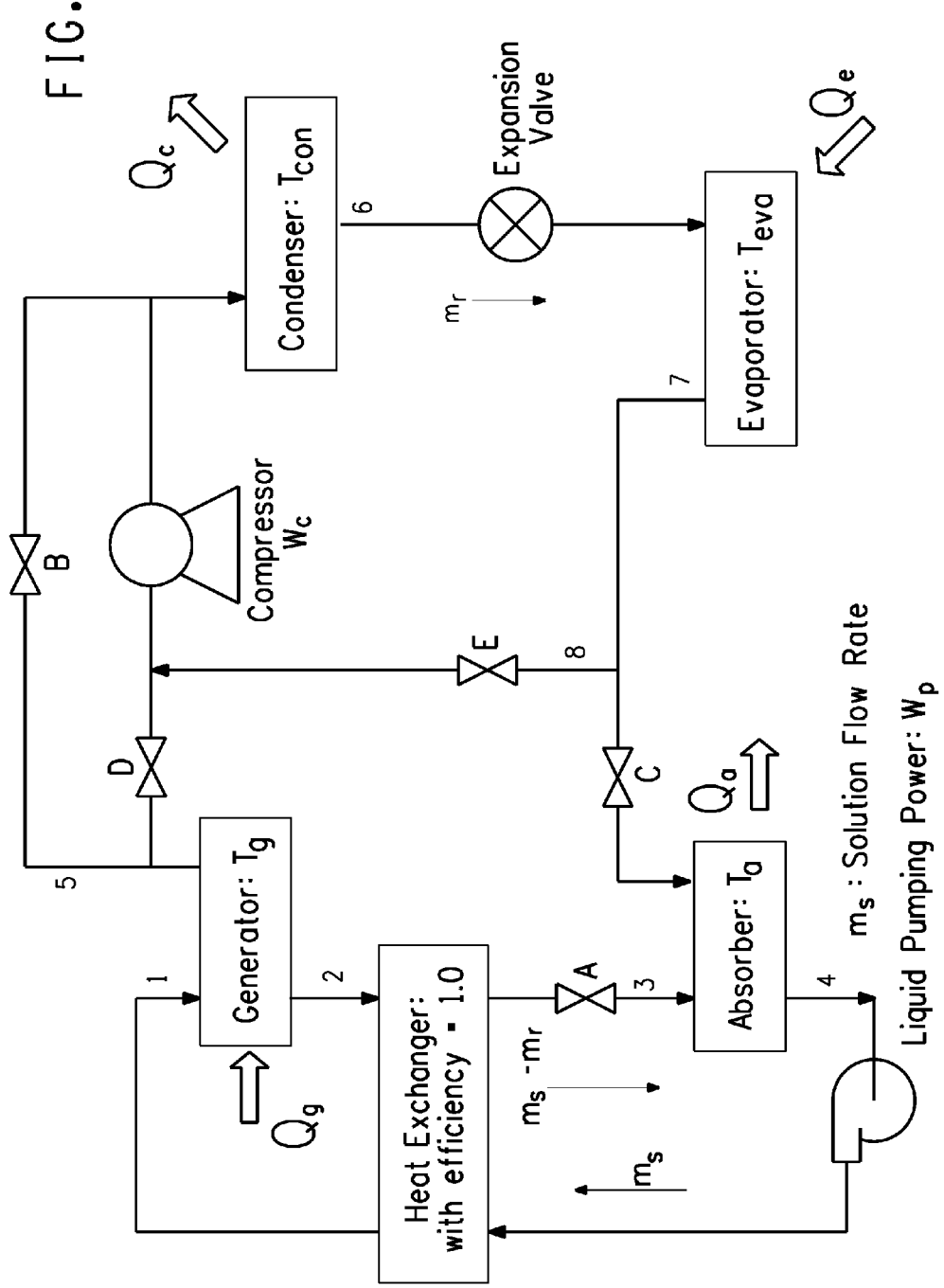
FIG. 4 shows a schematic diagram of a system to run a simple hybrid vapor compression—absorption cycle (series configuration).
Figure 5:
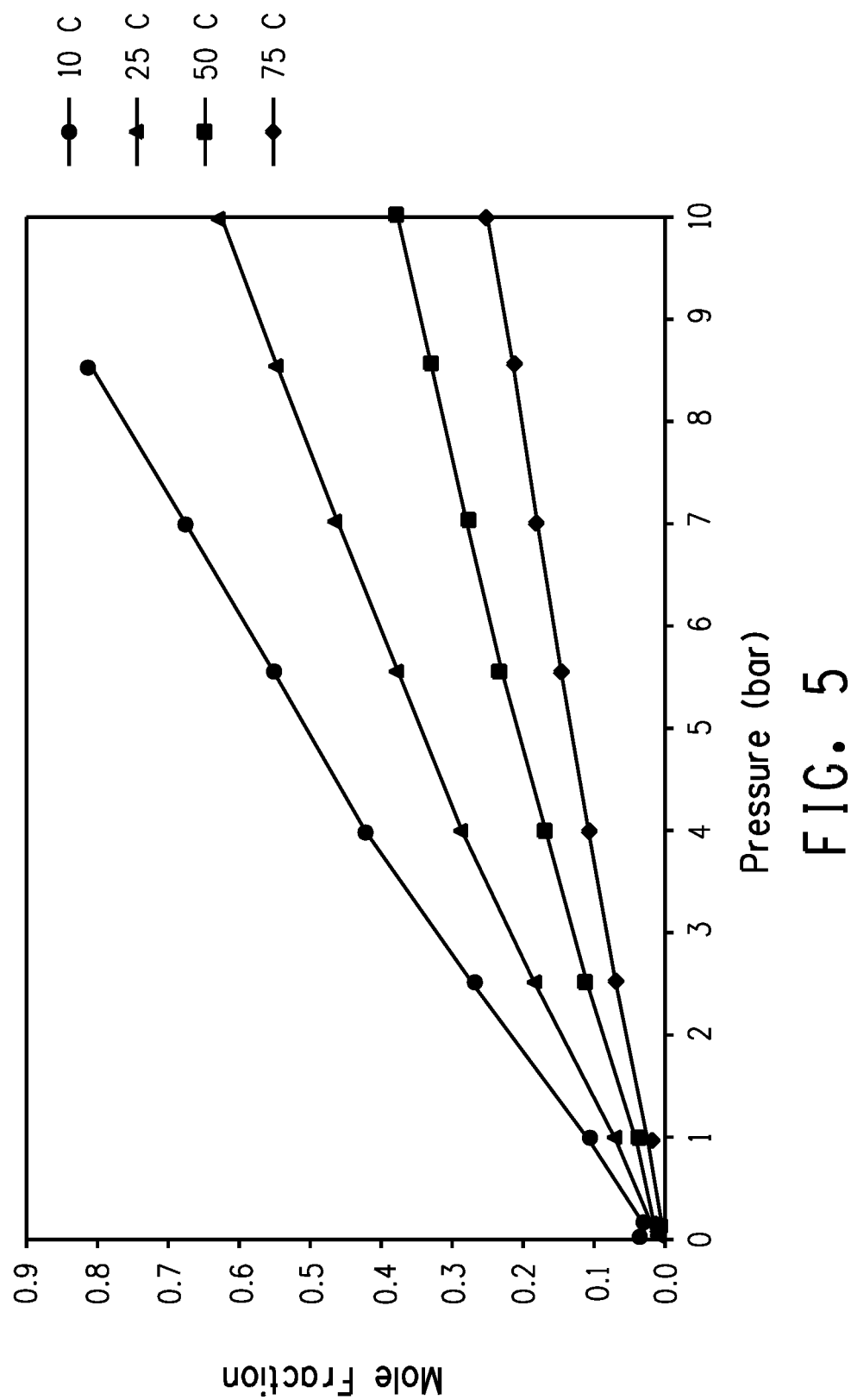
FIG. 5 shows measured isothermal solubility data (in mole fraction) for HFC-32 in [bmim][$PF_6$] as a function of pressure. Filled circles (●) represent measured isothermal data at 10° C., filled triangles (▲) represent measured isothermal data at 25° C., filled squares (■) represent measured isothermal data at 50° C., and filled diamonds (◆) represent measured isothermal data at 75° C. Solid lines represent data trends.
Figure 6:
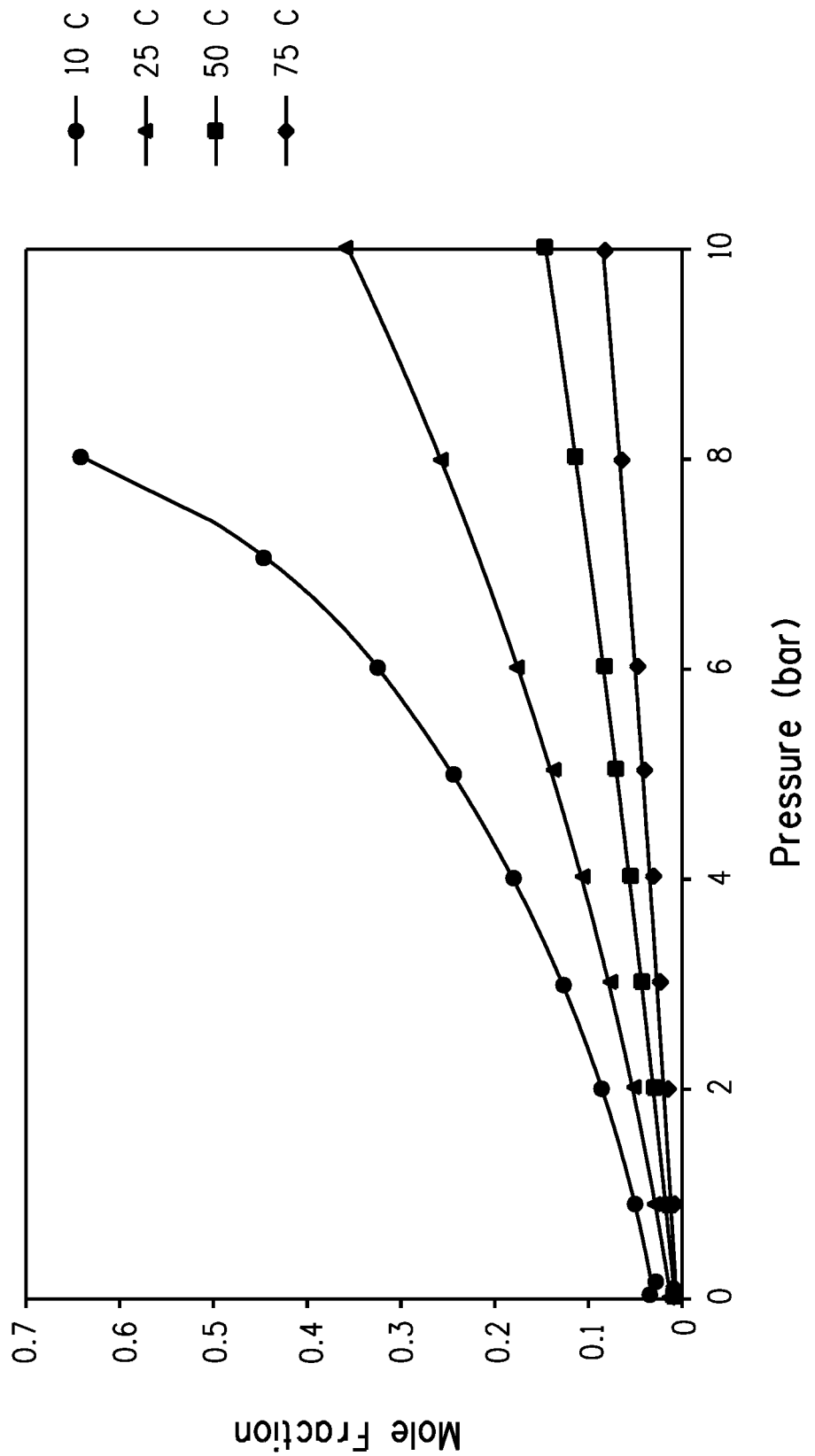
FIG. 6 shows measured isothermal solubility data (in mole fraction) for HFC-125 in [bmim][$PF_6$] as a function of pressure. Filled circles (●) represent measured isothermal data at 10° C., filled triangles (▲) represent measured isothermal data at 25° C., filled squares (■) represent measured isothermal data at 50° C., and filled diamonds (◆) represent measured isothermal data at 75° C. Solid lines represent data trends.
Figure 7:
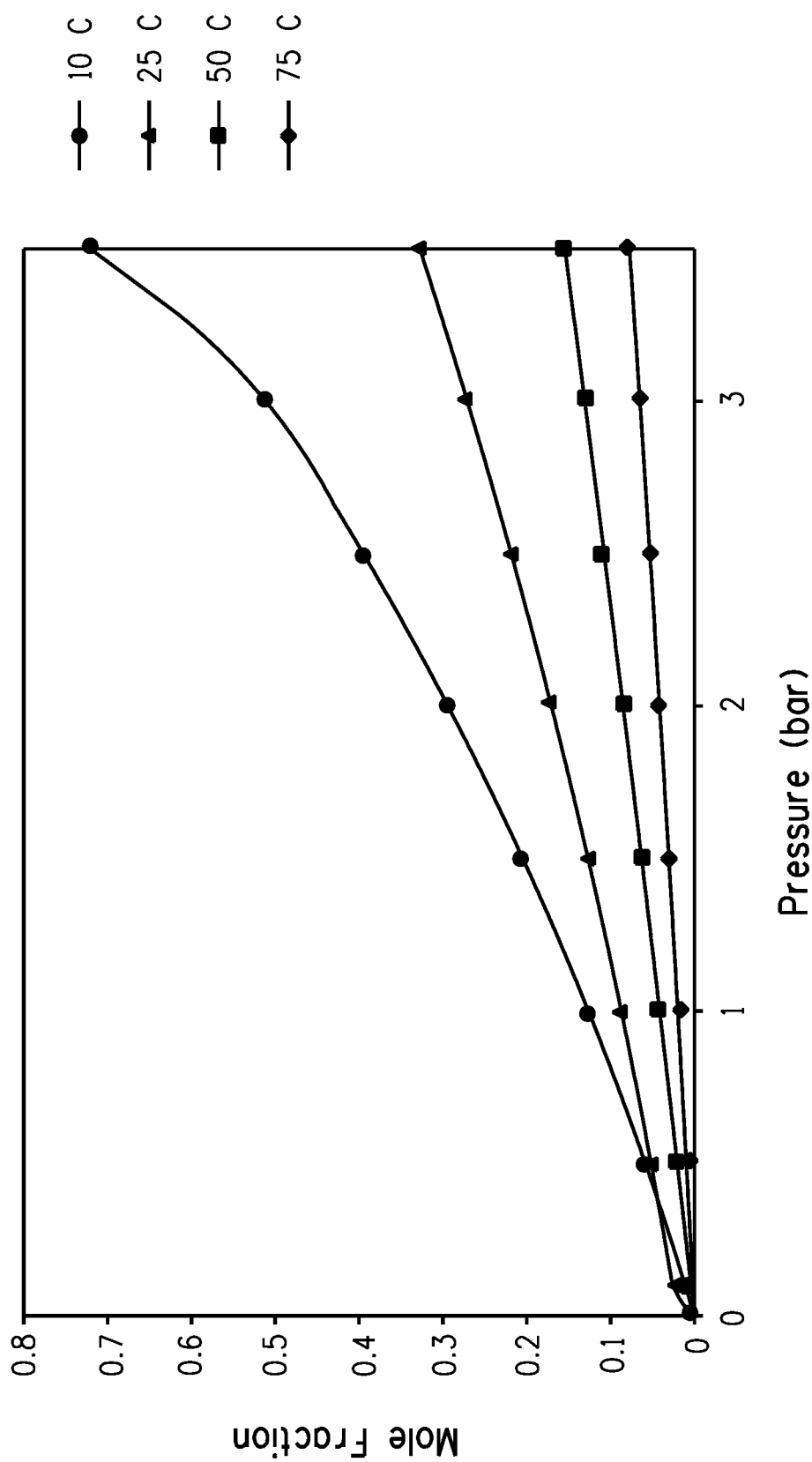
FIG. 7 shows measured isothermal solubility data (in mole fraction) for HFC-134a in [bmim][$PF_6$] as a function of pressure. Filled circles (●) represent measured isothermal data at 10° C., filled triangles (▲) represent measured isothermal data at 25° C., filled squares (■) represent measured isothermal data at 50° C., and filled diamonds (◆) represent measured isothermal data at 75° C. Solid lines represent data trends.
Figure 8:
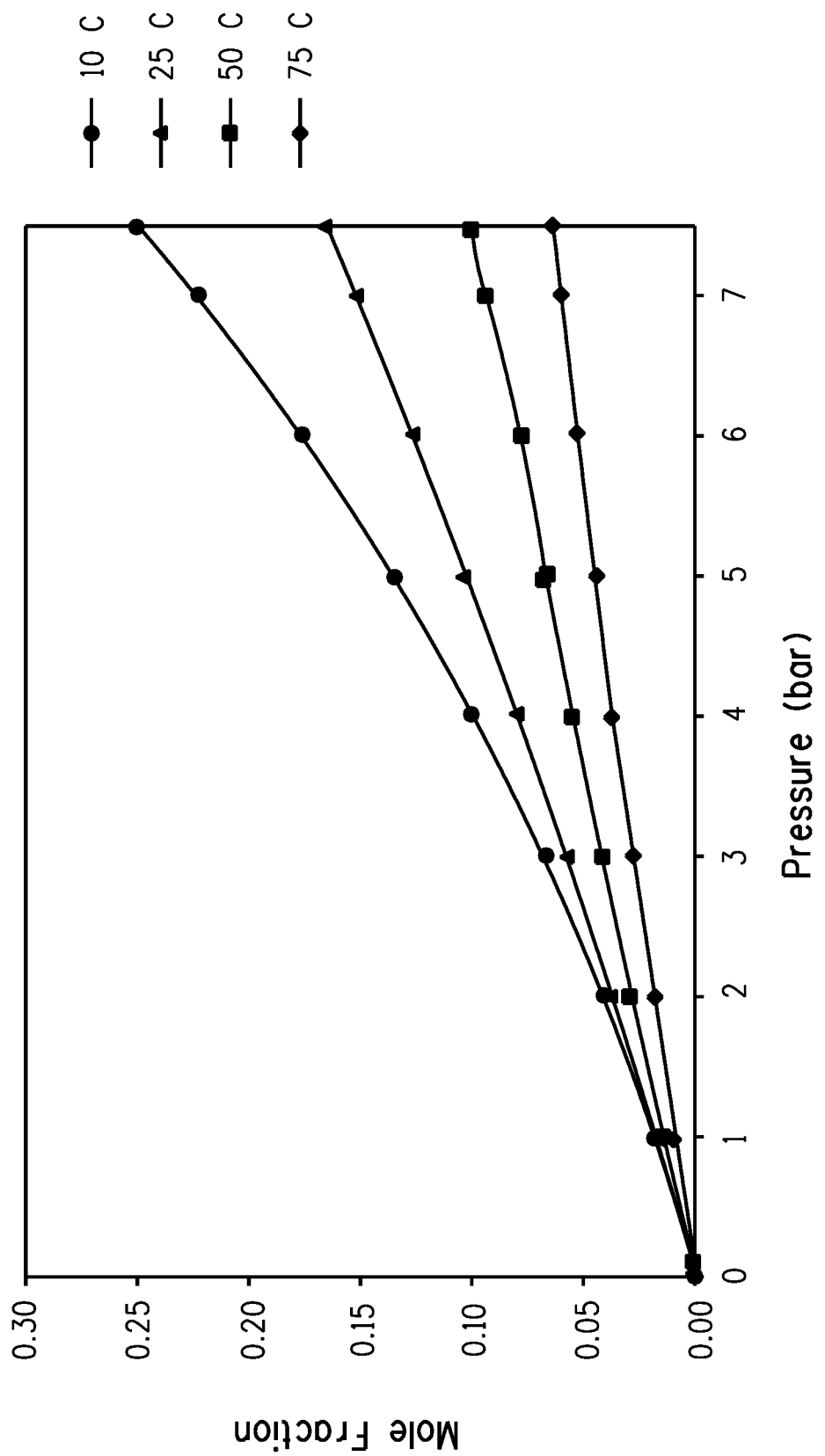
FIG. 8 shows measured isothermal solubility data (in mole fraction) for HFC-143a in [bmim][$PF_6$] as a function of pressure. Filled circles (●) represent measured isothermal data at 10° C., filled triangles (▲) represent measured isothermal data at 25° C., filled squares (■) represent measured isothermal data at 50° C., and filled diamonds (◆) represent measured isothermal data at 75° C. Solid lines represent data trends.
Figure 9:
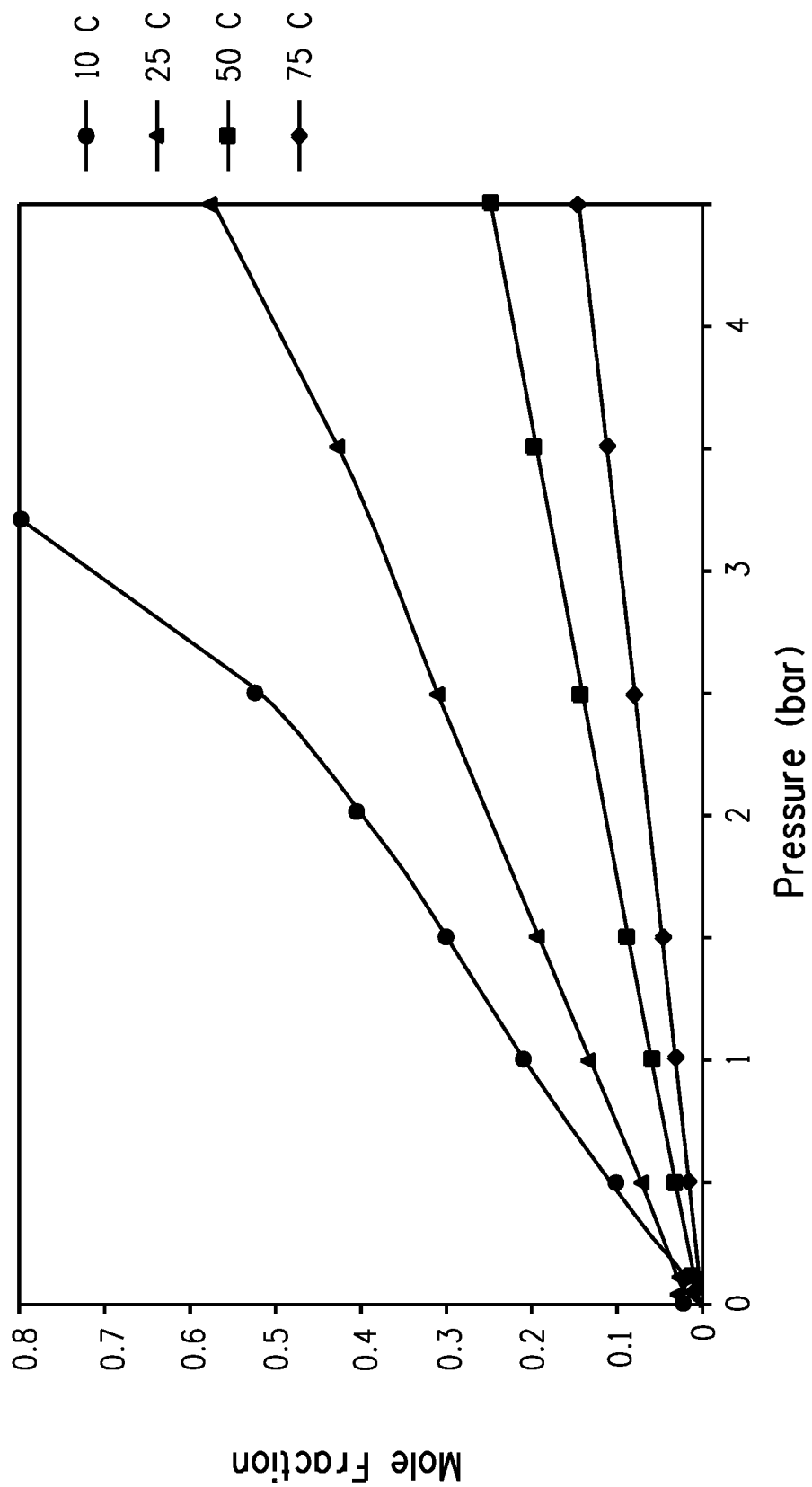
FIG. 9 shows measured isothermal solubility data (in mole fraction) for HFC-152a in [bmim][$PF_6$] as a function of pressure. Filled circles (●) represent measured isothermal data at 10° C., filled triangles (▲) represent measured isothermal data at 25° C., filled squares (■) represent measured isothermal data at 50° C., and filled diamonds (◆) represent measured isothermal data at 75° C. Solid lines represent data trends.

A schematic diagram for a system running a simple hybrid vapor compression-absorption cycle with a series configuration is shown in FIG. 4. The system is composed of a condenser unit and an evaporator unit with an expansion valve (similar to an ordinary vapor compression cycle as shown in FIG. 1), a compressor, an absorber-generator solution circuit, which has a vapor absorber, a gas generator, a heat exchanger, a pressure control (reducing) valve (A), a solution liquid pump, and isolation valves to direct the refrigerant flow path (B-E).

The series configuration can also operate in three modes. Mode 1 operates like a conventional absorption cycle where isolation valves D and E are closed and isolation valves B and C are open, which reassembles the same flow path as shown in FIG. 2. Mode 2 operates like a conventional vapor compression cycle where isolation valve E is open and isolation valves B, C, and D are closed, which reassembles the same flow path as shown in shown in FIG. 1. In this case the results are identical to those described in the previous case for parallel configuration Mode 2. Mode 3 combines the use of both the vapor compression and the absorption cycles where isolation valves C and D are open and isolation valves B and E are closed as shown in FIG. 4. The system is referred to as a "hybrid" system because in one configuration of the equipment and/or apparatus (Mode 3), the pressure of the refrigerant vapor can be increased by both a generator and a compressor.

When an ionic liquid is used as the absorbent, the two cycles (absorption and vapor compression) may be directly linked because the same refrigerant gas can be used in both cycles, and this eliminates the need of a secondary heat exchanger and increases the overall cycle efficiency.

The present invention also provides an apparatus for adjusting temperature that executes a hybrid vapor compression-absorption cycle as described herein to cool or heat an object (for example a conduit or a container), a medium (for example a fluid such as air or water) or a space. The apparatus may include components such as an absorber-generator solution circuit (which by the outflow and inflow of heat increases the pressure of refrigerant vapor as a compressor does mechanically) where the circuit may be composed of an absorber, a generator, a heat exchanger, a pressure control device and a pump for circulating the solution. The apparatus also is composed of condenser and evaporator units with an expansion valve similar to equipment used in an ordinary vapor compression cycle. As this is a hybrid system, a conventional compressor is used in parallel or series configuration with the above described elements of an absorption refrigeration cycle. The apparatus hereof is capable of executing a hybrid vapor compression-absorption cycle using any one or more of the refrigerants described herein and/or any one or more absorbents, including for example any of the ionic liquids described herein. The apparatus hereof is capable of executing any one or more of the processes as described herein. Yet another embodiment of this invention is an apparatus substantially as shown or described in either of FIGS. 3 and 4.

An apparatus of this invention may be deployed for use in, or fabricated or operated as, a refrigerator, a freezer, an ice machine, an air conditioner, an industrial cooling system, a heater or heat pump. Each of these instruments may be situated in a residential, commercial or industrial setting, or may be incorporated into a mobilized device such as a car, truck, bus, train, airplane, or other device for transportation, or may be incorporated into a piece of equipment such as a medical instrument.

This invention also provides an apparatus for heating an object, medium or space that includes (a) an absorber that forms a mixture of a mixture of a refrigerant and an absorbent; (b) a generator that receives the mixture from the absorber and heats the mixture to separate refrigerant, in vapor form, from the absorbent, and increases the pressure of the refrigerant vapor; (c) a condenser, located in proximity to the object, medium or space to be heated, that receives the vapor from the generator and condenses the vapor under pressure to a liquid; (d) a pressure reduction device through which the liquid refrigerant leaving the condenser passes to reduce the pressure of the liquid to form a mixture of liquid and vapor refrigerant; (e) an evaporator that receives the mixture of liquid and vapor refrigerant that passes through the pressure reduction device to evaporate the remaining liquid to form first and second portions of refrigerant vapor; (f) a compressor that receives the first portion of the refrigerant vapor, increases the pressure thereof, and passes the first portion of the refrigerant vapor to the condenser; and (g) a conduit that passes the second portion of the refrigerant vapor leaving the evaporator to the absorber.

This invention also provides an apparatus for cooling an object, medium or space that includes (a) an absorber that forms a mixture of a mixture of a refrigerant and an absorbent; (b) a generator that receives the mixture from the absorber and heats the mixture to separate refrigerant, in vapor form, from the absorbent, and increases the pressure of the refrigerant vapor; (c) a condenser that receives the vapor from the generator and condenses the vapor under pressure to a liquid; (d) a pressure reduction device through which the liquid refrigerant leaving the condenser passes to reduce the pressure of the liquid to form a mixture of liquid and vapor refrigerant; (e) an evaporator, located in proximity to the object, medium or space to be cooled, that receives the mixture of liquid and vapor refrigerant that passes through the pressure reduction device to evaporate the remaining liquid to form first and second portions of refrigerant vapor; (f) a compressor that receives the first portion of the refrigerant vapor, increases the pressure thereof, and passes the first portion of the refrigerant vapor to the condenser; and (g) a conduit that passes the second portion of the refrigerant vapor leaving the evaporator to the absorber.

This invention also provides an apparatus for heating an object, medium or space that includes (a) an absorber that forms a mixture of a mixture of a refrigerant and an absorbent; (b) a generator that receives the mixture from the absorber and heats the mixture to separate refrigerant, in vapor form, from the absorbent, and increases the pressure of the refrigerant vapor; (c) a compressor that receives the vapor from the generator and further increases its pressure; (d) a condenser, located in proximity to the object, medium or space to be heated, that receives the vapor from the compressor and condenses the vapor under pressure to a liquid; (e) a pressure reduction device through which the liquid refrigerant leaving the condenser passes to reduce the pressure of the liquid to form a mixture of liquid and vapor refrigerant; (f) an evaporator that receives the mixture of liquid and vapor refrigerant that passes through the pressure reduction device to evaporate the remaining liquid to form refrigerant vapor; and (g) a conduit that passes the refrigerant vapor leaving the evaporator to the absorber.

This invention also provides an apparatus for cooling an object, medium or space that includes (a) an absorber that forms a mixture of a mixture of a refrigerant and an absorbent; (b) a generator that receives the mixture from the absorber and heats the mixture to separate refrigerant, in vapor form, from the absorbent, and increases the pressure of the refrigerant vapor; (c) a compressor that receives the vapor from the generator and further increases its pressure; (d) a condenser that receives the vapor from the compressor and condenses the vapor under pressure to a liquid; (e) a pressure reduction device through which the liquid refrigerant leaving the condenser passes to reduce the pressure of the liquid to form a mixture of liquid and vapor refrigerant; (f) an evaporator, located in proximity to the object, medium or space to be cooled, that receives the mixture of liquid and vapor refrigerant that passes through the pressure reduction device to evaporate the remaining liquid to form refrigerant vapor; and (g) a conduit that passes the refrigerant vapor leaving the evaporator to the absorber.

This invention also provides a process for heating an object, medium or a space comprising (a) absorbing refrigerant vapor with an absorbent to form a mixture; (b) heating the mixture to separate refrigerant, in vapor form, from the absorbent and increase the pressure of the refrigerant vapor; (c) condensing the refrigerant vapor under pressure to a liquid in proximity to the object, medium or space to be heated; (d) reducing the pressure of the liquid refrigerant, and evaporating the refrigerant to form first and second portions of refrigerant vapor; (e-1) mechanically increasing the pressure of the first portion of refrigerant vapor, and then repeating step (c) to subject the first portion of refrigerant vapor to condensation to liquid; and (e-2) repeating step (a) to re-absorb, with the absorbent, the second portion of refrigerant vapor.

This invention also provides a process for cooling an object, medium or a space comprising (a) absorbing refrigerant vapor with an absorbent to form a mixture; (b) heating the mixture to separate refrigerant, in vapor form, from the absorbent and increase the pressure of the refrigerant vapor; (c) condensing the refrigerant vapor under pressure to a liquid; (d) reducing the pressure of the liquid refrigerant, and evaporating the refrigerant, in proximity to the object, medium or space to be cooled, to form first and second portions of refrigerant vapor; (e-1) mechanically increasing the pressure of the first portion of refrigerant vapor, and then repeating step (c) to subject the first portion of refrigerant vapor to condensation to liquid; and (e-2) repeating step (a) to re-absorb, with the absorbent, the second portion of refrigerant vapor.

This invention also provides a process for heating an object, medium or a space comprising (a) absorbing refrigerant vapor with an absorbent to form a mixture; (b) heating the mixture to separate refrigerant, in vapor form, from the absorbent and increase the pressure of the refrigerant vapor; (c) further increasing the pressure of the refrigerant vapor mechanically; (d) condensing the refrigerant vapor under pressure to a liquid in proximity to the object, medium or space to be heated; (e) reducing the pressure of the liquid refrigerant, and evaporating the refrigerant to form refrigerant vapor; and (f) repeating step (a) to re-absorb the refrigerant vapor with the absorbent.

This invention also provides a process for cooling an object, medium or a space comprising (a) absorbing refrigerant vapor with an absorbent to form a mixture; (b) heating the mixture to separate refrigerant, in vapor form, from the absorbent and increase the pressure of the refrigerant vapor; (c) further increasing the pressure of the refrigerant vapor mechanically; (d) condensing the refrigerant vapor under pressure to a liquid; (e) reducing the pressure of the liquid refrigerant, and evaporating the refrigerant to form refrigerant vapor in proximity to the object, medium or space to be cooled; and (f) repeating step (a) to re-absorb the refrigerant vapor with the absorbent.

This invention also provides a process for heating an object, medium or a space in an apparatus that executes a hybrid vapor compression-absorption cycle by (a) forming in an absorber a mixture of a refrigerant and an absorbent; (b) passing the mixture to a generator where the mixture is heated to separate refrigerant, in vapor form, from the absorbent, and the pressure of the refrigerant vapor is increased; (c) passing the refrigerant vapor to a condenser where the vapor is condensed under pressure to a liquid in proximity to the object, medium or space to be heated; (d) passing the liquid refrigerant to an expansion device where the pressure of the liquid refrigerant is reduced to form a mixture of liquid and vapor refrigerant; (e) passing the mixture of liquid and vapor refrigerant to an evaporator where the remaining liquid is evaporated to form first and second portions of refrigerant vapor; (f-1) passing the first portion of the refrigerant vapor to a compressor to increase the pressure thereof, and then passing the first portion of the refrigerant vapor to the condenser where the vapor is condensed under pressure to a liquid by repeating step (c); and (f-2) passing the second portion of the refrigerant vapor to the absorber to repeat step (a) and form a mixture of the second portion of the refrigerant vapor and the absorbent.

This invention also provides a process for cooling an object, medium or a space in an apparatus that executes a hybrid vapor compression-absorption cycle by (a) forming in an absorber a mixture of a refrigerant and an absorbent; (b) passing the mixture to a generator where the mixture is heated to separate refrigerant, in vapor form, from the absorbent, and the pressure of the refrigerant vapor is increased; (c) passing the refrigerant vapor to a condenser where the vapor is condensed under pressure to a liquid; (d) passing the liquid refrigerant to an expansion device where the pressure of the liquid refrigerant is reduced to form a mixture of liquid and vapor refrigerant; (e) passing the mixture of liquid and vapor refrigerant to an evaporator in proximity to the object, medium or space to be cooled where the remaining liquid is evaporated to form first and second portions of refrigerant vapor; (f-1) passing the first portion of the refrigerant vapor to a compressor to increase the pressure thereof, and then passing the first portion of the refrigerant vapor to the condenser where the vapor is condensed under pressure to a liquid by repeating step (c); and (f-2) passing the second portion of the refrigerant vapor to the absorber to repeat step (a) and form a mixture of the second portion of the refrigerant vapor and the absorbent.

This invention also provides a process for heating an object, medium or a space in an apparatus that executes a hybrid vapor compression-absorption cycle by (a) forming in an absorber a mixture of a refrigerant and an absorbent; (b) passing the mixture to a generator where the mixture is heated to separate refrigerant, in vapor form, from the absorbent, and the pressure of the refrigerant vapor is increased; (c) passing the refrigerant vapor to a compressor to further increase its pressure; (d) passing the refrigerant vapor to a condenser in proximity to the object, medium or space to be heated where the vapor is condensed under pressure to a liquid; (e) passing the liquid refrigerant to an expansion device where the pressure of the liquid refrigerant is reduced to form a mixture of liquid and vapor refrigerant; (f) passing the mixture of liquid and vapor refrigerant to an evaporator where the remaining liquid is evaporated to form refrigerant vapor; and (g) passing the refrigerant vapor leaving the evaporator to the absorber to repeat step (a) and re-form a mixture of the refrigerant vapor and the absorbent.

This invention also provides a process for cooling an object, medium or a space in an apparatus that executes a hybrid vapor compression-absorption cycle by (a) forming in an absorber a mixture of a refrigerant and an absorbent; (b) passing the mixture to a generator where the mixture is heated to separate refrigerant, in vapor form, from the absorbent, and the pressure of the refrigerant vapor is increased; (c) passing the refrigerant vapor to a compressor to further increase its pressure; (d) passing the refrigerant vapor to a condenser where the vapor is condensed under pressure to a liquid; (e) passing the liquid refrigerant to an expansion device where the pressure of the liquid refrigerant is reduced to form a mixture of liquid and vapor refrigerant; (f) passing the mixture of liquid and vapor refrigerant to an evaporator in proximity to the object, medium or space to be cooled where the remaining liquid is evaporated to form refrigerant vapor; and (g) passing the refrigerant vapor leaving the evaporator to the absorber to repeat step (a) and re-form a mixture of the refrigerant vapor and the absorbent.

In any process as described above, the absorbent separated from refrigerant in step (b) may be recirculated for use in a later step.

Refrigerant/Absorbent Pairs:

Refrigerants:

The present invention provides refrigerant pair compositions for use in hybrid vapor compression—absorption cycles. Hybrid vapor compression—absorption cycles can be used for cooling, or for generating heat, depending on the application. One member of the refrigerant pair comprises at least one refrigerant selected from the group consisting of hydrofluorocarbon, hydrochlorofluorocarbon, chlorofluorocarbon, fluorocarbon, nitrogen ($N_2$), oxygen ($O_2$), carbon dioxide ($CO_2$), ammonia ($NH_3$), argon (Ar), hydrogen ($H_2$), water ($H_2O$), and non-fluorinated hydrocarbon, wherein the non-fluorinated hydrocarbon is selected from the group consisting of $C_1$ to $C_4$ straight-chain, branched or cyclic alkanes and $C_1$ to $C_4$ straight-chain, branched or cyclic alkenes. The second member of the refrigerant pair comprises at least one ionic liquid.

Hydrofluorocarbon refrigerants may include compounds having any combination of hydrogen and fluorine with carbon and include compounds with carbon-carbon double bonds with normal boiling points below 0° C. Examples of hydrofluorocarbon refrigerants useful for the invention include difluoromethane (HFC-32), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a) and fluoroethane (HFC-161). In one embodiment of the invention, the hydrofluorocarbon refrigerants are selected from the group consisting of difluoromethane (HFC-32), pentafluoroethane (HFC-125), 1,1,1,2-tetrafluoroethane (HFC-134a), 1,1,1-trifluoroethane (HFC-143a) and 1,1-difluoroethane (HFC-152a).

Chlorofluorocarbon refrigerants may include compounds having any combination of chlorine and fluorine with carbon and include compounds with carbon-carbon double bonds with normal boiling points below 0° C. An example of a chlorofluorocarbon refrigerant useful for the invention is dichlorodifluoromethane (CFC-12).

Hydrochlorofluorocarbon refrigerants may include compounds with any combination of hydrogen, chlorine and fluorine with carbon and include compounds with carbon-carbon double bonds with normal boiling points below 0° C. An example of a hydrochlorofluorocarbon refrigerant useful for the invention includes chlorodifluoromethane (HCFC-22).

Fluorocarbon refrigerants may include compounds with any combination of fluorine and carbon and include compounds with carbon-carbon double bonds with normal boiling points below 0° C. Examples of fluorocarbon refrigerants useful for the invention include perfluoromethane (FC-14) and perfluoroethane (FC-116).

Non-fluorinated hydrocarbon refrigerants useful for the invention may include methane, ethane, ethylene, propane, cyclopropane, propylene, butane, butene and isobutane.

A refrigerant as used herein may also be selected from the group consisting of HFC-32, HFC-125, HFC-134, HFC-134a, HFC-143a, HFC-152a, HFC-161, HCFC-22, FC-14, FC-116, CFC-12, $NH_3$, $CO_2$, $N_2$, $O_2$, $H_2$, Ar, $H_2O$, methane, ethane, propane, cyclopropane, propylene, butane, butene, and isobutane.

Mixtures of refrigerants are also useful for achieving proper boiling temperature or pressure appropriate for absorption equipment. In particular mixtures which form azeotropes or constant boiling mixtures are preferred because minimal to no fractionation of the mixture will occur if the refrigerant leaks from the absorption cooling system. U.S. Pat. No. 5,709,092, for example, discloses azeotropic or constant boiling compositions of difluoromethane (HFC-32), pentafluoroethane (HFC-125), and 1,1,1,2-tetrafluoroethane (HFC-134a), for use as refrigerants.

Absorbents:

In a preferred embodiment, the absorbent used in this invention is an ionic liquid. The ionic liquid useful for the invention in principle can be any ionic liquid that absorbs the refrigerant gas. Ionic liquids that have minimal absorption of the refrigerant gas will be less effective as absorption cycle working fluids. Ideally, high absorption and diffusivity are required to achieve a high-energy efficiency absorption cycle. Ionic liquids, which are described in WO 05/113,702 (and references therein cited), may be synthesized by salt metathesis, by an acid-base neutralization reaction or by quaternizing a selected nitrogen-containing compound; or they may be obtained commercially from several companies such as Merck (Darmstadt, Germany) or BASF (Mount Olive, N.J.). A cation or anion of an ionic liquid of the invention can in principle be any cation or anion such that the cation and anion together form an organic salt that is liquid at or below about 100° C.

In one embodiment of the invention, ionic liquids may have cations selected from the following Formulae:

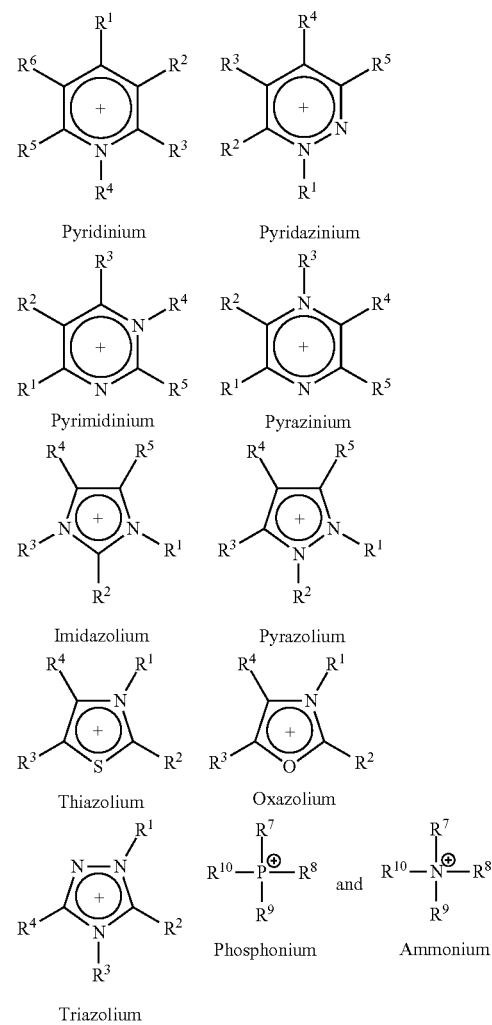

wherein $R^1$, $R^2$, $R^3$, $R^4$, $R^5$ and $R^6$ are each independently selected from the group consisting of:

(i) H;
(ii) halogen;
(iii) —$CH_3$, —$C_2H_5$, or $C_3$ to $C_{25}$ straight-chain, branched or cyclic alkane or alkene, optionally substituted with at least one member selected from the group consisting of Cl, Br, F, I, OH, $NH_2$ and SH;
(iv) —$CH_3$, —$C_2H_5$, or $C_3$ to $C_{25}$ straight-chain, branched or cyclic alkane or alkene comprising one to three heteroatoms selected from the group consisting of O, N, Si and S, and optionally substituted with at least one member selected from the group consisting of Cl, Br, F, I, OH, $NH_2$ and SH;
(v) $C_6$ to $C_{20}$ unsubstituted aryl, or $C_3$ to $C_{25}$ unsubstituted heteroaryl having one to three heteroatoms independently selected from the group consisting of O, N, Si and S; and
(vi) $C_6$ to $C_{25}$ substituted aryl, or $C_3$ to $C_{25}$ substituted heteroaryl having one to three heteroatoms independently selected from the group consisting of O, N, Si and S; wherein said substituted aryl or substituted heteroaryl has one to three substituents independently selected from the group consisting of:
  (1) —$CH_3$, —$C_2H_5$, or $C_3$ to $C_{25}$ straight-chain, branched or cyclic alkane or alkene, optionally substituted with at least one member selected from the group consisting of Cl, Br, F I, OH, $NH_2$ and SH,
  (2) OH,
  (3) $NH_2$, and
  (4) SH; and
wherein $R^7$, $R^8$, $R^9$, and $R^{10}$ are each independently selected from the group consisting of:
(vii) —$CH_3$, —$C_2H_5$, or $C_3$ to $C_{25}$ straight-chain, branched or cyclic alkane or alkene, optionally substituted with at least one member selected from the group consisting of Cl, Br, F, I, OH, $NH_2$ and SH;
(viii) —$CH_3$, —$C_2H_5$, or $C_3$ to $C_{25}$ straight-chain, branched or cyclic alkane or alkene comprising one to three heteroatoms selected from the group consisting of O, N, Si and S, and optionally substituted with at least one member selected from the group consisting of Cl, Br, F, I, OH, $NH_2$ and SH;
(ix) $C_6$ to $C_{25}$ unsubstituted aryl, or $C_3$ to $C_{25}$ unsubstituted heteroaryl having one to three heteroatoms independently selected from the group consisting of O, N, Si and S; and
(x) $C_6$ to $C_{25}$ substituted aryl, or $C_3$ to $C_{25}$ substituted heteroaryl having one to three heteroatoms independently selected from the group consisting of O, N, Si and S; wherein said substituted aryl or substituted heteroaryl has one to three substituents independently selected from the group consisting of:
  (1) —$CH_3$, —$C_2H_5$ or $C_3$ to $C_{25}$ straight-chain, branched or cyclic alkane or alkene, optionally substituted with at least one member selected from the group consisting of Cl, Br, F, I, OH, $NH_2$ and SH,
  (2) OH,
  (3) $NH_2$, and
  (4) SH; and
wherein optionally at least two of $R^1$, $R^2$, $R^3$, $R^4$, $R^5$, $R^6$, $R^7$, $R^8$, $R^9$, and $R^{10}$ can together form a cyclic or bicyclic alkanyl or alkenyl group.

In another embodiment, an ionic liquid useful for the invention may comprise a fluorinated cation wherein any one of, or any group of more than one of, $R^1$, $R^2$, $R^3$, $R^4$, $R^5$, $R^6$, $R^7$, $R^8$, $R^9$ and $R^{10}$ comprises $F^-$.

In a further embodiment, an ionic liquid may have an anion selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, $SCN^-$; and any fluorinated anion. Fluorinated anions useful herein may include $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]^-$, $[CF_3CF_2OCF_2CF_2SO_3]^-$, $[(CF_2HCF_2SO_2)_2N]^-$, $[(CF_3CFHCF_2SO_2)_2N]^-$; and $F^-$.

In a further embodiment, an ionic liquid may comprise a cation selected from the group consisting of pyridinium, pyridazinium, pyrimidinium, pyrazinium, imidazolium, pyrazolium, thiazolium, oxazolium, triazolium, phosphonium, and ammonium cations; and an anion selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, $SCN^-$; and any fluorinated anion. In yet another embodiment, an ionic liquid may comprise a cation selected from the group consisting of pyridinium, pyridazinium, pyrimidinium, pyrazinium, imidazolium, pyrazolium, thiazolium, oxazolium, triazolium, phosphonium, and ammonium cations; and an anion selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]^-$, $[CF_3CF_2OCF_2CF_2SO_3]^-$, $[(CF_2HCF_2SO_2)_2N]_-$, $[(CF_3CFHCF_2SO_2)_2N]^-$, and $F^-$.

In a further embodiment, an ionic liquid may comprise a cation selected from the group consisting of pyridinium, pyridazinium, pyrimidinium, pyrazinium, imidazolium, pyrazolium, thiazolium, oxazolium, triazolium, phosphonium, and ammonium cations as defined above, wherein any one of, or any group of more than one of $R^1$, $R^2$, $R^3$, $R^4$, $R^5$, $R^6$, $R^7$, $R^8$, $R^9$, and $R^{10}$ comprises $F^-$; and an anion selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, $SCN^-$; and any fluorinated anion. In still another embodiment, an ionic liquid may comprise a cation selected from the group consisting of pyridinium, pyridazinium, pyrimidinium, pyrazinium, imidazolium, pyrazolium, thiazolium, oxazolium, triazolium, phosphonium, and ammonium cations as defined above, wherein any one of or any group of more than one of $R^1$, $R^2$, $R^3$, $R^4$, $R^5$, $R^6$, $R^7$, $R^8$, $R^9$, and $R^{10}$ comprises $F^-$; and an anion selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCH_2CF_2SO_3]^-$, $[CF_2HCF_2OCF_2CF_2SO_3]^-$, $[CF_2ICF_2OCF_2CF_2SO_3]^-$, $[CF_3CF_2OCF_2CF_2SO_3]^-$, $[(CF_2HCF_2SO_2)_2N]^-$, $[(CF_3CFHCF_2SO_2)_2N]^-$, and $F^-$.

In a further embodiment, an ionic liquid may comprise a cation selected from 1,2-dimethyl-3-propylimidazolium, 3-methyl-1-propylpyridinium, 1-ethyl-3-methylimidazolium, 1-propyl-2,3-dimethylimidazolium, 1-propyl-3-methylpyridinium, 1-butyl-3-methylimidazolium, 1-butyl-3-methylpyridinium, 1-heptyl-3-methylimidazolium, 1-octyl-3-methylimidazolium, 1,3-dioctylimidazolium, 1-dodecyl-3-methylimidazolium, tetradecyl(trihexyl)phosphonium, and tributyl(tetradecyl)phosphonium cations; and an anion selected from the group consisting of [CH$_3$CO$_2$]$^-$, [HSO$_4$]$^-$, [CH$_3$SO$_3$]$^-$, [C$_2$H$_5$OSO$_3$]$^-$, [AlCl$_4$]$^-$, [CO$_3$]$^{2-}$, [HCO$_3$]$^-$, [NO$_2$]$^-$, [NO$_3$]$^-$, [SO$_4$]$^{2-}$, [PO$_4$]$^{3-}$, [HPO$_4$]$^{2-}$, [H$_2$PO$_4$]$^-$, [HSO$_3$]$^-$, [CuCl$_2$]$^-$, Cl$^-$, Br$^-$, I$^-$, SCN$^-$, [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$CF$_2$SO$_2$)$_2$N]$^-$, [(CF$_3$SO$_2$)$_3$C]$^-$, [CF$_3$CO$_2$]$^-$, [CF$_3$OCFHCF$_2$SO$_3$]$^-$, [CF$_3$CF$_2$OCFHCF$_2$SO$_3$]$^-$, [CF$_3$CFHOCF$_2$CF$_2$SO$_3$]$^-$, [CF$_2$HCF$_2$OCF$_2$CF$_2$SO$_3$]$^-$, [CF$_2$ICF$_2$OCF$_2$CF$_2$SO$_3$]$^-$, [CF$_3$CF$_2$OCF$_2$CF$_2$SO$_3$]$^-$, [(CF$_2$HCF$_2$SO$_2$)$_2$N]$^-$, and [(CF$_3$CFHCF$_2$SO$_2$)$_2$N]$^-$.

In a further embodiment, an ionic liquid suitable for use herein may be selected from the group consisting of 1-butyl-3-methylimidazolium hexafluorophosphate [bmim][PF$_6$],
1-butyl-3-methylimidazolium tetrafluoroborate [bmim][BF$_4$],
1,2-dimethyl-3-propylimidazolium tris(trifluoromethylsulfonyl)methide [dmpim][TMeM],
1-octyl-3-methylimidazolium iodide [omim][I],
1,3-dioctylimidazolium iodide [doim][I],
1-ethyl-3-methylimidazolium bis(pentafluoroethylsulfonyl)imide [emim][BEI],
1,2-dimethyl-3-propylimidazolium bis(trifluoromethylsulfonyl)imide [dmpim][BMeI],
3-methyl-1-propylpyridinium bis(trifluoromethylsulfonyl)imide [pmpy][BMeI],
1-ethyl-3-methylimidazolium hexafluorophosphate [emim][PF$_6$],
1-ethyl-3-methylimidazolium bis(trifluoroethylsulfonyl)imide [emim][BMeI],
1-butyl-3-methylpyridinium bis(trifluoromethylsulfonyl)imide [bmpy][BMeI],
1-ethyl-3-methylimidazolium 1,1,2,2-tetrafluoroethanesulfonate [emim][TFES],
1-butyl-3-methylimidazolium 1,1,2,2-tetrafluoroethanesulfonate [bmim][TFES],
1-dodecyl-3-methylimidazolium 1,1,2,2-tetrafluoroethanesulfonate [dmim][TFES],
1-heptyl-3-methylimidazolium 1,1,2,2-tetrafluoroethanesulfonate [hmim][TFES],
1-butyl-3-methylimidazolium acetate [bmim][Ac],
1-butyl-3-methylimidazolium 2-(1,2,2,2-tetrafluoroethoxy)-1,1,2,2-tetrafluoroethanesulfonate [bmim][FS],
1-butyl-3-methylimidazolium 1,1,2,3,3,3-hexafluoropropanesulfonate [bmim][HFPS],
1-butyl-3-methylimidazolium methyl sulfonate [bmim][MeSO$_4$],
1-butyl-3-methylimidazolium thiocyanate [bmim][SCN],
1-butyl-3-methylimidazolium 1,1,2-trifluoro-2-(perfluoroethoxy)ethanesulfonate [bmim][TPES],
1-butyl-3-methylimidazolium 1,1,2-trifluoro-2-(trifluoromethoxy)ethanesulfonate [bmim][TTES],
1-butyl-3-methylimidazolium 1,1,2-trifluoro-2-(trifluoromethoxy)ethanesulfonate [bmim][TTES],
1-butyl-3-methylimidazolium 1,1,2-trifluoro-2-(perfluoroethoxy)ethanesulfonate [bmim][TPES],
1-ethyl-3-methylimidazolium bis(pentafluoroethylsulfonyl)imide [emim][BEI],
1-butyl-3-methylimidazolium 1,1,2,3,3-hexafluoropropanesulfonate [bmim][HFPS],
tetradecyl(trihexyl) phosphonium 1,1,2-trifluoro-2-(perfluoroethoxy)ethanesulfonate[6,6,6,14-P][TPES], and
tributyl(tetradecyl)phosphonium 1,1,2,3,3,3-hexafluoropropanesulfonate[4,4,4,14-P][HFPS].

Refrigerant/Ionic Liquid Pairs:

Hybrid vapor compression-absorption cycles of the invention comprise refrigerant pairs consisting of at least one refrigerant selected from the group consisting of hydrofluorocarbon, hydrochlorofluorocarbon, chlorofluorocarbon, fluorocarbon, NH$_3$, CO$_2$, N$_2$, O$_2$, H$_2$, Ar, H$_2$O, and non-fluorinated hydrocarbon selected from the group consisting of C$_1$ to C$_4$ straight-chain, branched or cyclic alkanes and C$_1$ to C$_4$ straight-chain, branched or cyclic alkenes; and at least one ionic liquid. In another embodiment, refrigerant pairs consist of at least one refrigerant selected from the group consisting of HFC-32, HFC-125, HFC-134, HFC-134a, HFC-143a, HFC-152a, HFC-161, HCFC-22, FC-14, FC-116, CFC-12, NH$_3$, CO$_2$, N$_2$, O$_2$, H$_2$, Ar, H$_2$O, methane, ethane, propane, cyclopropane, propylene, butane, butene, and isobutane; and at least one ionic liquid.

In a further embodiment, refrigerant pairs may include at least one refrigerant selected from the group consisting of HFC-32, HFC-125, HFC-134, HFC-134a, HFC-143a, HFC-152a, HFC-161, HCFC-22, FC-14, FC-116, CFC-12, NH$_3$, CO$_2$, N$_2$, O$_2$, H$_2$, Ar, H$_2$O, methane, ethane, propane, cyclopropane, propylene, butane, butene, and isobutane; and at least one ionic liquid having a cation selected from the group consisting of pyridinium, pyridazinium, pyrimidinium, pyrazinium, imidazolium, pyrazolium, thiazolium, oxazolium and triazolium cations. In a further embodiment, refrigerant pairs may include at least one refrigerant selected from the group consisting of HFC-32, HFC-125, HFC-134, HFC-134a, HFC-143a, HFC-152a, HFC-161, HCFC-22, FC-14, FC-116, CFC-12, NH$_3$, CO$_2$, N$_2$, O$_2$, H$_2$, Ar, H$_2$O, methane, ethane, propane, cyclopropane, propylene, butane, butene, and isobutane; and at least one ionic liquid having an anion selected from selected from the group consisting of [CH$_3$CO$_2$]$^-$, [HSO$_4$]$^-$, [CH$_3$OSO$_3$]$^-$, [C$_2$H$_5$OSO$_3$]$^-$, [AlCl$_4$]$^-$, [CO$_3$]$^{2-}$, [HCO$_3$]$^-$, [NO$_2$]$^-$, [NO$_3$]$^-$, [SO$_4$]$^{2-}$, [PO$_4$]$^{3-}$, [HPO$_4$]$^{2-}$, [HSO$_3$]$^-$, [CuCl$_2$]$^-$, Cl$^-$, Br$^-$, I$^-$, SCN$^-$; [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$CF$_2$SO$_2$)$_2$N]$^-$, [(CF$_3$SO$_2$)$_3$C]$^-$, [CF$_3$CO$_2$]$^-$, [CF$_3$OCFHCF$_2$SO$_3$]$^-$, [CF$_3$CF$_2$OCFHCF$_2$SO$_3$]$^-$, [CF$_3$CFHOCF$_2$CF$_2$SO$_3$]$^-$, [CF$_2$HCF$_2$OCF$_2$CF$_2$SO$_3$]$^-$, [CF$_2$ICF$_2$OCF$_2$CF$_2$SO$_3$]$^-$, [CF$_3$CF$_2$OCF$_2$CF$_2$SO$_3$]$^-$, [(CF$_2$HCF$_2$SO$_2$)$_2$N]$^-$, [(CF$_3$CFHCF$_2$SO$_2$)$_2$N]$^-$, and F$^-$.

Refrigerant pairs useful herein may include at least one refrigerant selected from the group consisting of HFC-32, HFC-125, HFC-134, HFC-134a, HFC-143a, HFC-152a, HFC-161, HCFC-22, FC-14, FC-116, CFC-12, NH$_3$, CO$_2$, N$_2$, O$_2$, H$_2$, Ar, H$_2$O, methane, ethane, propane, cyclopropane, propylene, butane, butene, and isobutane; and at least one ionic liquid selected from the group consisting of:

a) an ionic liquid having a cation selected from the group consisting of pyridinium, pyridazinium, pyrimidinium, pyrazinium, imidazolium, pyrazolium, thiazolium, oxazolium and triazolium cations;

b) an ionic liquid having a cation selected from the group consisting of pyridinium, pyridazinium, pyrimidinium, pyrazinium, imidazolium, pyrazolium, thiazolium, oxazolium and triazolium cations as described above wherein at least one of R$^1$ through R$^6$ comprises fluorine;

c) an ionic liquid having a cation selected from the group consisting of pyridinium, pyridazinium, pyrimidinium, pyrazinium, imidazolium, pyrazolium, thiazolium, oxazolium and triazolium cations, and having an anion selected from the group consisting of [CH$_3$CO$_2$]$^-$, [HSO$_4$]$^-$, [CH$_3$OSO$_3$]$^-$, [C$_2$H$_5$OSO$_3$]$^-$, [AlCl$_4$]$^-$,

[CO$_3$]$^{2-}$, [HCO$_3$]$^-$, [NO$_2$]$^-$, [NO$_3$]$^-$, [SO$_4$]$^{2-}$, [PO$_4$]$^{3-}$, [HPO$_4$]$^{2-}$, [H$_2$PO$_4$]$^-$, [HSO$_3$]$^-$, [CuCl$_2$]$^-$, Cl$^-$, Br$^-$, I$^-$, and any fluorinated anion;
d) an ionic liquid having a cation selected from the group consisting of pyridinium, pyridazinium, pyrimidinium, pyrazinium, imidazolium, pyrazolium, thiazolium, oxazolium and triazolium cations, and having an anion selected from the group consisting of [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$CF$_2$SO$_2$)$_2$N]$^-$, [(CF$_3$SO$_2$)$_3$C]$^-$, [CF$_3$CO$_2$]$^-$, and F$^-$;
e) an ionic liquid having a cation selected from the group consisting of pyridinium, pyridazinium, pyrimidinium, pyrazinium, imidazolium, pyrazolium, thiazolium, oxazolium and triazolium cations as described above wherein at least one of R$^1$ through R$^6$ comprises fluorine, and having an anion selected from the group consisting of [CH$_3$CO$_2$]$^-$, [HSO$_4$]$^-$, [CH$_3$OSO$_3$]$^-$, [C$_2$H$_5$OSO$_3$]$^-$, [AlCl$_4$]$^-$, [CO$_3$]$^{2-}$, [HCO$_3$]$^-$, [NO$_2$]$^-$, [NO$_3$]$^-$, [SO$_4$]$^{2-}$, [PO$_4$]$^{3-}$, [HPO$_4$]$^{2-}$, [H$_2$PO$_4$]$^-$, [HSO$_3$]$^-$, [CuCl$_2$]$^-$, Cl$^-$, Br$^-$, I$^-$, and any fluorinated anion; and
f) an ionic liquid having a cation selected from the group consisting of pyridinium, pyridazinium, pyrimidinium, pyrazinium, imidazolium, pyrazolium, thiazolium, oxazolium and triazolium cations as described above wherein at least one of R$^1$ through R$^6$ comprises fluorine, and having an anion selected from the group consisting of [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$CF$_2$SO$_2$)$_2$N]$^-$, [(CF$_3$SO$_2$)$_3$C]$^-$, [CF$_3$CO$_2$]$^-$, and F$^-$.

Additional examples of useful refrigerant pairs include those having at least one refrigerant selected from the group consisting of HFC-32, HFC-125, HFC-134, HFC-134a, HFC-143a, HFC-152a, HFC-161, HCFC-22, FC-14, FC-116, CFC-12, NH$_3$, CO$_2$, N$_2$, O$_2$, H$_2$, Ar, H$_2$O, methane, ethane, propane, cyclopropane, propylene, butane, butene, and isobutane; and at least one ionic liquid selected from the group consisting of:
  g) an ionic liquid having an imidazolium cation or a fluorinated imidazolium cation and an anion selected from the group consisting of [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$SO$_2$)$_3$C]$^-$, and [CF$_3$CO$_2$]$^-$;
  h) an ionic liquid having 1-ethyl-3-methylimidazolium as the cation and [(CF$_3$CF$_2$SO$_2$)$_2$N]$^-$ as the anion;
  i) an ionic liquid having a 1-butyl-3-methylimidazolium cation or a fluorinated 1-butyl-3-methylimidazolium cation and an anion selected from the group consisting of [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$CF$_2$SO$_2$)$_2$N]$^-$, [(CF$_3$SO$_2$)$_3$C]$^-$, and [CF$_3$CO$_2$]$^-$;
  j) an ionic liquid having a 1-propyl-2,3-dimethylimidazolium cation or a fluorinated 1-propyl-2,3-dimethylimidazolium cation and an anion selected from the group consisting of [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$CF$_2$SO$_2$)$_2$N]$^-$, [(CF$_3$SO$_2$)$_3$C]$^-$, and [CF$_3$CO$_2$]$^-$; and preferably from the group consisting of [(CF$_3$SO$_2$)$_2$N]$^-$ and [(CF$_3$SO$_2$)$_3$C]$^-$.
  k) an ionic liquid having a 1-propyl-3-methylimidazolium cation or a fluorinated 1-propyl-3-methylimidazolium cation and an anion selected from the group consisting of [BF$_4$]$^-$, [PF$_6$]$^-$, [SbF$_6$]$^-$, [CF$_3$SO$_3$]$^-$, [HCF$_2$CF$_2$SO$_3$]$^-$, [CF$_3$HFCCF$_2$SO$_3$]$^-$, [HCClFCF$_2$SO$_3$]$^-$, [(CF$_3$SO$_2$)$_2$N]$^-$, [(CF$_3$CF$_2$SO$_2$)$_2$N]$^-$, [(CF$_3$SO$_2$)$_3$C]$^-$, and [CF$_3$CO$_2$]$^-$; and preferably [CF3SO$_2$)$_2$N]$^-$ as the anion; and
  l) an ionic liquid having a cation selected from the group consisting of 1,3-dioctylimidazolium, 1-octyl-3-methylimidazolium, fluorinated 1,3-dioctylimidazolium, or fluorinated 1-octyl-3-methylimidazolium, and [I]$^-$ as the anion.

Refrigerant pairs useful for the invention may constitute a composition comprising at least one refrigerant and at least one ionic liquid containing about 0.05 to about 99.95 mole percent of a refrigerant over a temperature range from the evaporator temperature to the generator temperature at a pressure from vacuum to the critical pressure. Systems running absorption cycles operate at varying evaporator temperatures and heating temperatures depending on the application. A system running a typical absorption cycle for chilling water may operate with an evaporator temperature of 5 to 10° C., or for chilling brine or ethylene glycol to even lower temperatures (i.e. 0 to −40° C.) and the generator can operate over a temperature range from 75 to 240° C. depending on the heat source and the number of stages used. A system running a hybrid vapor compression—absorption cycle could run under the same range of operating temperatures.

In another embodiment, however, a composition comprising a refrigerant and an ionic liquid may contain from about 0.1 to about 99.9 mole percent of a refrigerant over a temperature range from the evaporator temperature (e.g. 5 to 10° C. as used for chilling water) to the generator temperature [e.g. 75 to 90° C. for half effect, 75 to 90° C. for single effect, 150 to 180° C. for double effect, and 200 to 240° C. for triple effect (where half effect, single effect, and double effect are described in *Application Guide for Absorption Cooling/Refrigeration Using Recovered Heat*, Dorgan et al, American Society of Heating, Refrigeration and Air Conditioning Engineers, Inc., 1995, Atlanta, Ga.)] at a pressure from vacuum to the critical pressure. For example,
  compositions comprising HFC-32 and ionic liquids comprise from about 0.1 to about 99.9 mole percent of HFC-32 over a temperature range from −40 to 240° C. at a pressure from vacuum to 57.8 bar;
  compositions comprising HFC-125 and ionic liquids comprise from about 0.1 to about 99.9 mole percent of HFC-125 over a temperature range from −40 to 240° C. at a pressure from vacuum to 36.2 bar;
  compositions comprising HFC-134a and ionic liquids comprise from about 0.1 to about 99.9 mole percent of HFC-134a over a temperature range from −40 to 240° C. at a pressure from vacuum to 40.6 bar;
  compositions comprising HFC-143a and ionic liquids comprise from about 0.1 to about 99.9 mole percent of HFC-143a over a temperature range from −40 to 240° C. at a pressure from vacuum to 37.6 bar; and
  compositions comprising HFC-152a and ionic liquids comprise from about 0.1 to about 99.9 mole percent of HFC-152a over a temperature range from −40 to 240° C. at a pressure from vacuum to 45.2 bar.

Examples of other compositions suitable as a refrigerant pair for use herein in a system running a hybrid vapor compression—absorption cooling or heating system include those in which
  the ionic liquid is [bmim][PF$_6$], and the refrigerant pair contains from about 0.3 to about 81.2 mole percent of HFC-32 over a temperature range from about 10 to about 75° C. at a pressure from about 0.1 to about 10 bar.

the ionic liquid is [bmim][PF$_6$], and the refrigerant pair contains from about 0.1 to about 65.1 mole percent of HFC-125 over a temperature range from about 10 to about 75° C. at a pressure from about 0.1 to about 10 bar.

the one ionic liquid is [bmim][PF$_6$], and the refrigerant pair contains from about 0.1 to about 72.1 mole percent of HFC-134a over a temperature range from about 10 to about 75° C. at a pressure from about 0.1 to about 3.5 bar.

the ionic liquid is [bmim][PF$_6$], and the refrigerant pair contains from about 0.1 to about 23.5 mole percent of HFC-143a over a temperature range from about 10 to about 75° C. at a pressure from about 0.1 to about 10 bar.

the ionic liquid is [bmim][PF$_6$], and the refrigerant pair contains from about 0.5 to about 79.7 mole percent of HFC-152a over a temperature range from about 10 to about 75° C. at a pressure from about 0.1 to about 4.5 bar.

the ionic liquid is [bmim][BF$_4$], and the refrigerant pair contains from about 0.1 to about 76.5 mole percent of HFC-32 over a temperature range from about 10 to about 75° C. at a pressure from about 0.1 to about 10 bar.

the ionic liquid is [dmpim][tTFMSmethide], and the refrigerant pair contains from about 0.4 to about 80.2 mole percent of HFC-32 over a temperature range from about 10 to about 75° C. at a pressure from about 0.1 to about 10 bar.

the ionic liquid is [omim][I], and the refrigerant pair contains from about 0.4 to about 41.6 mole percent of HFC-32 at a temperature of about 25° C. and a pressure from about 0.1 to about 10 bar.

the ionic liquid is [doim][I], and the refrigerant pair contains from about 0.7 to about 46.8 mole percent of HFC-32 at a temperature of about 25° C. and a pressure from about 0.1 to about 10 bar.

the ionic liquid is [emim][bPFESimide], and the refrigerant pair contains from about 1.0 to about 66.6 mole percent of HFC-32 at a temperature of about 25° C. and a pressure from about 0.1 to about 10 bar.

the ionic liquid is [dmpim][bTFMSimide], and the refrigerant pair contains from about 0.8 to about 64.5 mole percent of HFC-32 at a temperature of about 25° C. and a pressure from about 0.1 to about 10 bar.

the ionic liquid is [pmpy][bTFMSimide], and the refrigerant pair contains from about 1.0 to about 63.9 mole percent of HFC-32 at a temperature of about 25° C. and a pressure from about 0.1 to about 10 bar.

the ionic liquid is [bmim][PF$_6$], and the refrigerant pair contains from about 0.1 to 63 mole percent of HFC-32 at about 10° C. and P/P$_0$ from about 0.1 to about 0.63.

the ionic liquid is [bmim][PF$_6$], and the refrigerant pair contains from about 0.1 to about 65 mole percent of HFC-125 at about 10° C. and P/P$_0$ from about 0.1 to about 0.88.

the ionic liquid is [bmim][PF$_6$], and the refrigerant pair contains from about 0.1 to about 72 mole percent of HFC-134a at about 10° C. and P/P$_0$ from about 0.1 to about 0.84.

the ionic liquid is [bmim][PF$_6$], and the refrigerant pair contains from about 0.1 to about 25 mole percent of HFC-143a at about 10° C. and P/P$_0$ from about 0.1 to about 0.90.

the ionic liquid is [bmim][PF$_6$], and the refrigerant pair contains from about 0.1 to about 80 mole percent of HFC-152a at about 10° C. and P/P$_0$ from about 0.1 to about 0.86.

Additional examples of refrigerants useful in a composition with an ionic liquid, wherein the refrigerant comprises from about 0.1 to 99 mole percent of the composition, are shown in the following Table 1, along with the normal boiling point temperature, critical point temperature and critical point pressure of each refrigerant. The data in Table 1 were obtained from Reid et al, supra; and from REFPROP Version 7, Lemmon et al, [NIST reference: Fluid Thermodynamic and Transport Properties—REFPROP, Version 7.0 User's Guide (U.S. Department of Commerce, Technology Administration, National Institute of Standards and Technology, Standard Reference Data Program, Gaithersburg, Md., 2002)].

TABLE 1

| Refrigerant | Boiling Point Temperature (° C.) | Critical Point Temperature (° C.) | Critical Point Pressure (bar) |
|---|---|---|---|
| Perfluoromethane (FC-14) | −128.1 | −45.6 | 37.5 |
| Perfluoroethane (FC-116) | −78.2 | 19.9 | 30.5 |
| Perfluoropropane (FC-218) | −36.8 | 72.0 | 26.7 |
| Dichlorodifluoromethane CFC-12) | −29.8 | 112.0 | 41.4 |
| Hydrochlorodifluoromethane (HCFC-22) | −40.8 | 96.1 | 49.9 |
| Fluoromethane (HFC-41) | −78.1 | 44.1 | 59.0 |
| 1,1,1,3,3,3-hexafluoropropane (HFC-236fa) | −1.4 | 124.9 | 32.0 |
| 1,1,1,2,3,3,3-heptafluoropropane (HFC-227ea) | −16.5 | 101.7 | 29.3 |
| Carbon Dioxide | −78.4 | 30.9 | 73.7 |
| Ammonia | −33.3 | 132.3 | 113.3 |
| Nitrogen | −195.8 | −147.0 | 33.9 |
| Oxygen | −183 | −118.6 | 50.4 |
| Hydrogen | −252.8 | −240.0 | 13.2 |
| Argon | −185.9 | −122.5 | 46.0 |
| Methane | −161.5 | −82.6 | 46.0 |
| Ethane | −88.6 | 32.2 | 48.7 |
| Ethylene | −103.9 | 9.3 | 50.4 |
| Propane | −42.1 | 96.7 | 42.4 |
| Propylene | −47.7 | 92.4 | 46.6 |
| Cyclopropane | −32.9 | 124.7 | 54.9 |
| Butane | −0.6 | 152.0 | 37.9 |
| Isobutane | −11.7 | 134.7 | 36.4 |
| H$_2$O | 100 | 374 | 220 |

The refrigerant pair compositions may be prepared by any convenient method, including mixing or combining the desired amounts of the at least one refrigerant and the at least one ionic liquid in an appropriate container.

Additives, such as lubricants, corrosion inhibitors, stabilizers, dyes, and other appropriate materials may be added to the refrigerant pair compositions for a variety of purposes provided they do not have an adverse influence on the composition, for their intended applications.

To evaluate the performance of an absorption cycle, thermodynamic property charts such as temperature-pressure-concentration (TPX) and enthalpy-temperature (HT) diagrams are useful. These charts correspond to the familiar PH (pressure-enthalpy) or TS (temperature-entropy) diagram in vapor compression cycle analysis. However, these charts may not be applicable to an absorption cycle in the same manner as they are to vapor compression with a compressor, where the compression process is theoretically a single isentropic path, while the absorption cycle employs the so-called generator-absorber solution circuit, and several thermodynamic processes are involved.

The PH or TS diagram in the vapor compression cycle is constructed using equations of state (EOS), and the cycle performance and all thermodynamic properties can be calculated. The thermodynamic charts for the absorption cycle are usually made by empirical correlation equations, which are fitted to experimental solubility and heat capacity data for solution properties, while the vapor phase properties are calculated with the refrigerant EOS. Sometimes, the solubility data are correlated using theoretical solution (often called "activity") models, such as those disclosed in Nezu et at (*Natural Working Fluids*, 2002, IIR Gustav Lorentzen Conf. 5th, China, Sep. 17-20, 2002, 446-453); Fatouh et at (*Renewable Energy*, 1993, 3, 31-37); Bhatt et at (*Heat Recovery System & CHP*, 1992, 12, 225-233]; and Ness et at (*Classical Thermodynamics of Nonelectrolyte Solutions with Applications to Phase Equilibria*, 1982, MacGraw-Hill, New York). However, such models are limited in their use to temperatures well below the refrigerant critical temperature, and modeling solutions at high generator temperatures may become invalid. Thus, the combined use of empirical fitting equations or partially correct equations with the gas phase EOS may not always be completely consistent. Therefore, it is desirable to model the absorption cycle process with more thermodynamically sound EOS. Perhaps, one of the most significant benefits of using EOS is that, even above the critical temperature of refrigerants, thermodynamic properties can be correctly calculated, as discussed in Yokozeki, *Int. J. Refrigeration*, 2004, April (submitted).

Although modeling refrigerant mixtures with EOS is familiar, refrigerant and non-volatile compound mixtures are traditionally treated with empirical correlation models by air conditioning and refrigeration engineers, with regard for example to refrigerant-lubricant oil solubility. One of the difficult problems in using EOS for such mixtures would be to set up EOS parameters for non-volatile compounds without much information about the critical parameters and vapor pressure data. EOS models have been successfully applied to refrigerant-lubricant oil solubility data, however, as disclosed in Yokozeki, Proc. *Int. Compressor Eng. Conf at Purdue*, 1994, 1, 335-340; Yokozeki, *Int. J. Thermophys.*, 2001, 22, 1057-1071; and Yokozeki, *Applied Energy*, 2005, 80, 383-399. EOS models similar to these, and also as described in Tillner-Roth, *J. Phys. Chem. Ref Data*, 1998, 27, 63-96, can therefore be used to calculate thermodynamic properties consistently, and to demonstrate that refrigerants and ionic liquids are useful in this invention as absorption cycle refrigerant pairs For modeling of refrigerant/ionic liquid compositions, a generic Redlich-Kwong (RK) type of cubic equations of state (EOS), as discussed in Shiflett et al, *Ind. Eng. Chem. Res.*, 2004 (submitted), was employed:

$$P = \frac{RT}{\tilde{V} - b} - \frac{a(T)}{\tilde{V}(\tilde{V} + b)} \quad (1)$$

$$a(T) = 0.427480 \frac{R^2 T_c^2}{P_c} \alpha(T) \quad (2)$$

$$b = 0.08664 \frac{RT_c}{P_c} \quad (3)$$

The temperature-dependent part of the a parameter in the EOS for pure compounds is modeled by the following empirical form, as disccued in Yokozeki, *Int. J. Thermophys.*, 2001, 22, 1057-107; Yokozeki, *Applied Energy*, 2005, 80, 383-399; and Shiflett et al, *Ind. Eng. Chem. Res.*, 2004 (submitted).

$$\alpha(T) = \sum_{k=0}^{\leq 3} \beta_k \left(\frac{T_c}{T} - \frac{T}{T_c}\right)^k. \quad (4)$$

The coefficients, $\beta_k$, are determined so as to reproduce the vapor pressure of each pure compound.

For absorbents, however, usually no vapor pressure data are available, or vapor pressures are practically zero at application temperatures, and furthermore, no data for the critical parameters ($T_c$ and $P_c$) exist. The critical parameters of absorbents can be estimated in various ways, as discussed in Reid et al in *The Properties of Gases & Liquids*, 4th edn. (McGraw-Hill, New York 1987). As discussed by Yokozeki, *Int. J. Thermophys.*, 2001, 22, 1057-1071, estimates of critical parameters for high boiling-point compounds are sufficient for correlating solubility (PTx) data. On the other hand, the temperature-dependent part of the a parameter for absorbents is significant when the PTx data of refrigerant-absorbent mixtures are correlated, although the vapor pressure of absorbents is essentially zero at the temperature of interest. Here, $\alpha(T)$ for an absorbent is modeled by only two terms in eq 4, as applied for the case of refrigerant-lubricant oil mixtures:

$$k_{ij} = \frac{l_{ij} l_{ji} (x_i + x_j)}{l_{ji} x_i + l_{ij} x_j} \text{ where } k_{ii} = 0 \quad (5)$$

$$\alpha(T) = 1 + \beta_1 \left(\frac{T_c}{T} - \frac{T}{T_c}\right) \quad (6)$$

The coefficient $\beta_1$ in eq 6 will be treated as an adjustable fitting parameter.

Then, the a and b parameters for general N-component mixtures are modeled in terms of binary interaction parameters (as discussed in Yokozeki A [*Applied Energy*, 2005, 80, 383-399]; and Shiflett M B and Yokozeki A, supra), which may be regarded as a modified van der Waals-Berthelot mixing formula.

$$a(T) = \sum_{i,j=1}^{N} \sqrt{a_i a_j}\,(1 - f(T)k_{ij})x_i x_j,\ a_i = 0.427480\frac{R^2 T_{ci}^2}{P_{ci}}\alpha_i(T) \quad (7)$$

$$f(T) = 1 + \tau_{ij}/T,\text{ where } \tau_{ij} = \tau_{ji},\text{ and } \tau_{ii} = 0 \quad (8)$$

$$b = \frac{1}{2}\sum_{i,j=1}^{N}(b_i + b_j)(1 - m_{ij})x_i x_j,\ b_i = 0.08664\frac{RT_{ci}}{P_{ci}}, \quad (9)$$

where $m_{ij} = m_{ji}$, $m_{ii} = 0$ $T_{ci}$: critical temperature of i-th species.
$P_{ci}$: critical pressure of i-th species.
$x_i$: mole fraction of i-th species.

In the present model, there are four binary interaction parameters: $l_{ij}, l_{ji}, m_{ij}$, and $\tau_{ij}$ for each binary pair. It should be noted that when $l_{ij}=l_{ji}$ in eq 5 and $\tau_{ij}=0$ in eq 8, eq 7 becomes the ordinary quadratic-mixing rule for the a parameter. The present EOS model has been successfully applied to mixtures that are highly non-symmetric with respect to polarity and size, such as various refrigerant/oil mixtures (see, for example, Yokozeki A, 2001, supra); and ammonia/butane mixtures (see, for example, Yokozeki A [*Proc. Int. Congress of Refrigeration*, Washington, D.C. 2003]; and EcoLibrium™ [2004, 3, 20-24]).

For phase equilibrium (solubility) calculations, the fugacity coefficient $\phi_i$ for each compound is needed and derived for the present mixing rule in this manner:

$$\ln\phi_i = -\ln\frac{PV}{RT}\left(1 - \frac{b}{V}\right) + \frac{b_i'}{V-b} - \frac{ab_i'}{bRT(V+b)} + \frac{a}{bRT}\left(\frac{a_i'}{a} - \frac{b_i'}{b} + 1\right)\ln\frac{V}{V+b}, \quad (10)$$

where $b_i'$ and $a_i'$ are given by:

$$b_i' = \sum_{j=1}^{N}(b_i + b_j)(1 - m_{ij})x_j - b \quad (11)$$

$$a_i' = 2\sum_{j=1}^{N}\sqrt{a_i a_j}\,x_j\left\{1 - k_{ij} - \frac{x_i x_j(l_{ji} - l_{ij})(1+\tau_{ij}/T)}{(l_{ji}x_i + l_{ij}x_j)^2}\right\}. \quad (12)$$

A thermodynamically derived function relevant to the present study is an enthalpy (H), which is given, in a general form:

$$H = \int \sum_{i=1}^{N} C_{pi}^0 x_i dT + \left(\frac{a}{b} - \frac{T}{b}\frac{da}{dT}\right)\ln\frac{V}{V+b} + RT\left(\frac{PV}{RT}-1\right) - \frac{RT^2}{V-b}\frac{db}{dT} + \frac{a}{b}\frac{db}{dT}\left[\frac{1}{V+b} - \frac{1}{b}\ln\left(1+\frac{b}{V}\right)\right] + C, \quad (13)$$

where C is an arbitrary constant, which can be any value of choice but must be the same constant for any component mixtures within the system in question. The ideal-gas heat capacity for each compound $C_{pi}^0$ in eq 13 is modeled with a polynomial form:

$$C_p^0 = C_0 + C_1 T + C_2 T^2 + C_3 T^3. \quad (14)$$

Theoretical cycle performances for the system running the absorption refrigeration cycle shown in FIG. 2 are modeled as follows. The overall energy balance gives:

$$Q_g + Q_e + W_p = Q_c + Q_a \quad (15)$$

From the material balance in the absorber or generator:

$$m_s x_a = (m_s - m_r)x_g; \quad (16)$$

this provides a mass-flow-rate ratio, f, as defined by:

$$f \equiv \frac{m_s}{m_r} = \frac{x_g}{x_g - x_a}, \quad (17)$$

where x is a mass fraction of an absorbent in solution, the subscripts a and g stand for the absorber and generator solutions, and $m_r$ and $m_s$ are mass flow rates of gaseous refrigerant and absorber-exit solution (or solution pumping rate), respectively.

When a heat transfer efficiency of unity in the heat exchanger unit is assumed, the energy balance equation becomes:

$$Q_h = (H_2 - H_3)(m_s - m_r) = (H_1 - H_4)m_s - W_p, \quad (18)$$

where H is an enthalpy, and the subscript numbers (1, 2, 3, and 4) correspond to the locations shown in FIG. 2. From eq 18, the generator-inlet enthalpy, $H_1$, can be obtained:

$$H_1 = H_4 + (H_2 - H_3)(1 - 1/f) + W_p/m_r. \quad (19)$$

From the energy balance around the generator, the generator heat input, $Q_g$, is given by, $$Q_g = H_5 m_r + H_2(m_s - m_r) - H_1 m_s. \quad (20)$$

By eliminating $H_1$ from this equation with eq 19, eq 20 can be written as:

$$Q_g/m_r = H_5 - H_4 f + H_3(f-1) - W_p/m_r. \quad (21)$$

Similarly, the heat rejection in the absorber, $Q_a$, is given by, $$Q_a/m_r = H_3(f-1) + H_7 - H_4 f. \quad (22)$$

Condenser and evaporator heats per unit mass flow, respectively, are:

$$Q_c/m_r = H_5 - H_6 \quad (23)$$

$$Q_e/m_r = H_7 - H_6. \quad (24)$$

Then, the system performance is defined by a heat ratio, η, (output power divided by input power):

$$\eta = \frac{Q_e}{Q_g + W_P}.$$

However, the solution pumping power, $W_p$, is usually much smaller than $Q_g$, and it is customary to use a COP (coefficient of performance) defined as:

$$COP = \frac{Q_e}{Q_g}. \quad (25)$$

This can be expressed in terms of H and f.

$$COP = \frac{H_7 - H_6}{H_5 + H_3(f-1) - H_4 f}. \quad (26)$$

Enthalpies at all locations and solubility in the absorber and generator units are calculated in a thermodynamically consistent way by use of the EOS model discussed above.

The pure component EOS constants for refrigerants have been taken from Yokozeki A (2001, supra), Yokozeki A (*Proc. Int. Congress of Refrigeration*, Washington, D.C. 2003), and EcoLibrium™ (2004, 3, 20-24), and are listed in Example 1, Table 2. For selected absorbents in this study, the critical parameters have been estimated from group contribution methods (as discussed in Reid R C, et al., supra) and are also shown in Example 1, Table 2. The accuracy in critical parameters for these high boiling-point materials is of relataively less importance for correlating solubility data (see, for example, Yokozeki A, 2001, supra), but the $\beta_1$ parameter (in eq 6 as mentioned earlier) is important, and will be treated as an adjustable parameter in the analysis of binary solubility data.

In order to calculate thermal properties with EOS, the ideal gas heat capacity for each pure compound is needed as a function of temperature (see eq 14). The coefficients for eq 14 are listed in Example 1, Table 3, where those for absorbents have been all estimated from group contribution methods (as discussed in Reid R C, et al, supra). Next, the solubility (VLE: vapor-liquid equilibrium) data of fluorocarbon/ionic liquid binary mixtures is analyzed in order to determine the EOS parameters for mixtures. The four binary interaction parameters, $l_{ij}$, $l_{ji}$, $m_{ij}$, and $\tau_{ij}$, and the absorbent $\beta_1$ parameter for each binary pair have been determined by non-linear least squares analyses with an object function of relative pressure differences. The results for selected binary mixtures are shown in Example 1, Table 4.

The performance of the absorption refrigeration cycle is based on a system running a simple ideal cycle as shown in FIG. 2, and the present theoretical model. Here, the pumping power $W_p$ is neglected, since it is usually insignificant with respect to other thermal powers. In addition, several assumptions are made:

(1) There is no pressure drop in connecting lines.
(2) The refrigerant expansion process from the condenser to the evaporator is iso-enthalpic, as usually done in vapor compression cycle calculations. The condition at Point 7 in FIG. 2 (exit of evaporator) is a pure refrigerant dew point with T=$T_{eva}$.
(3) The condition at Point 6 is a refrigerant bubble point and there is no subcooled liquid. The condition at Point 5 (inlet to condenser) is a superheated state of a pure refrigerant with P=$P_{con}$ and T=$T_g$.
(4) Pressures in the condenser and the generator ($P_{con}$ and $P_g$) are the same, and similarly evaporator and absorber pressures ($P_{eva}$ and $P_a$) are equal.
(5) The condition at Point 3 (solution inlet to the absorber) is a solution's bubble point specified with the absorber pressure ($P_a$) and a solution concentration of the generator ($x_g$).
(6) Temperatures in the generator ($T_g$), absorber ($T_a$), condenser ($T_{con}$), and evaporator ($T_{eva}$) are specified as a given cycle condition.
(7) The refrigerant gas flow rate ($m_r$) is set to be 1 kg·s$^{-1}$, without loss of generality, and the absorbent vapor is neglected.

The first step of cycle calculations is to obtain $P_{eva}$ and $P_{con}$ as saturated vapor pressures of a pure refrigerant at given temperatures, using for example a Bubble-Point P routine (as discussed in Ness, H C V et al, supra). Then, using a usual TP (Temperature-Pressure) Flash routine (as discussed in Ness, H C V et al, supra), absorbent compositions, $x_g$ and $x_a$, in the generator and absorber units are calculated. This provides f (flow rate ratio) in eq 17. The thermodynamic properties at Point 3 are determined from the assumption (5), a Bubble-Point T routine (as discussed in Ness, H C V et al., supra). The enthalpy at Point 1 is obtained from eq 19. Enthalpies at all other points are easily calculated with known T, P, and compositions. Thus, the necessary quantities for the performance evaluation can be obtained using the listed equations. Cycle performances for the present binary systems are summarized in Example 1, Table 5 with selected thermodynamic quantities, where the specified temperatures for the cycle condition are: $T_g/T_{con}/T_a/T_{eva}$=100/40/30/10° C., and $m_r$=1 kg·s$^-$.

Properties for the well-known refrigerant-absorbent pairs, $NH_3/H_2O$ and $H_2O/LiBr$, have also been calculated, and are shown in Example 1, Table 5, for comparison. In the case of $NH_3/H_2O$, the absorbent $H_2O$ has a non-negligible vapor pressure at the generator exit, and in practical applications a rectifier (distillation) unit is required in order to separate the refrigerant from absorbent water. The effects of vapor pressure and extra power requirement due to the rectifier have been ignored; thus, the calculated COP is over-estimated for the present performance comparison. For $H_2O/LiBr$, empirical correlation diagrams for the thermodynamic properties (in the manner presented in the temperature-pressure-concentration diagram and enthalpy-temperature diagram in Stoecker et al, *Refrigeration and Air Conditioning* [McGraw-Hill, New York, 1982, 328-350]) were employed instead of an EOS model.

Cycle calculations for an absorption refrigeration cycle may be obtained in the manner set forth herein, but evaluation of the results is different from the case of an ordinary vapor compression cycle. In the latter case, a high pressure/temperature refrigerant gas is produced by a vapor compressor, where the thermodynamic process is theoretically a single isoentropic step: inlet and exit enthalpies of the compressor are sufficient for describing the compressor work. In the absorption cycle, however, the process generating the corresponding high pressure/temperature gas involves enthalpies at several different locations as well as refrigerant-absorbent solubility differences at the absorber and generator units (related to the f value), as seen in eqs. 17, 21 and 22.

Performance of the condenser and evaporator is the same for both cycles at given temperatures, and may be properly viewed in terms of the latent heat of vaporization (or condensation). In general, the refrigerating effect is the latent heat at the evaporator, which increases with an increase in the temperature difference between $T_c$ and $T_{eva}$. Thus, at a given $T_{eva}$, the latent heat is larger for a refrigerant with a higher $T_c$. In addition, the molar latent heat (J/mol) is generally not so much different among refrigerants at their boiling point (or far away from $T_c$), while the specific latent heat (J/kg) can be significantly different due to a large difference in molar masses. These factors affect the differences in the calculated refrigerating power $Q_e$ among refrigerants as shown in Example 1, Table 5.

An absorbent is a compound that, desirably, has high solubility for a refrigerant and also a very high boiling point relative to the refrigerant. For example the systems HFC-32+[bmim][PF$_6$], HFC-32+[bmim][BF$_4$], HFC-134a+[bmim][PF$_6$], HFC-152a+[bmim][PF$_6$] and HFC-125+[bmim][PF$_6$]

have COP/f values of 0.385/7.35, 0.330/6.41, 0.254/10.66, 0.300/13.27, and 0.128/16.49, respectively (see Example 1, Table 5).

A schematic diagram for a system running a simple hybrid vapor compression-absorption cycle with a parallel configuration is shown in FIG. 3. The system is composed of a condenser unit and an evaporator unit with an expansion valve similar to an ordinary vapor compression cycle as shown in FIG. 1, a compressor, an absorber-generator solution circuit, which has a vapor absorber, a gas generator, a heat exchanger, a pressure control (reducing) valve (A), a solution liquid pump, and isolation valves to direct the refrigerant flow path (B-E). The advantage of such a combined cycle is that, when the heating or cooling capacity requirements are high, the vapor compressor can assist with the high capacity demand. The advantage of using an ionic liquid with high gas solubility for fluorocarbons allows the two cycles (absorption and vapor compression) to be directly linked because the same refrigerant gas can be used in both cycles, and this eliminates the need of a secondary heat exchanger and increases the overall cycle efficiency. In addition, as the ionic liquid has zero measurable vapor pressure, little or no crossover of the ionic liquid from the generator into the refrigerant is expected. This reduces the need for secondary separation equipment, such as rectifiers, which can reduce the overall energy efficiency of the absorption cycle.

The parallel configuration can operate in three modes. Mode 1 operates like a conventional absorption cycle where isolation valves D and E are closed and isolation valves B and C are open, which reassembles the same flow path as shown in FIG. 2, and has performance characteristics as shown in Example 1, Table 5. Mode 2 operates like a conventional vapor compression cycle where isolation valves D and E are open and isolation valves B and C are closed, which reassembles the same flow path as shown in FIG. 1, and has performance characteristics as shown in Example 2, Table 6. Mode 3 combines the use of both the vapor compression and the absorption cycles where isolation valves B, C, D, and E are all open, as shown in FIG. 3, and has performance characteristics as shown in Example 2, Table 6.

A schematic diagram for a system running a simple hybrid vapor compression-absorption cycle with a series configuration is shown in FIG. 4. The system is composed of a condenser unit and an evaporator unit with an expansion valve (similar to an ordinary vapor compression cycle as shown in FIG. 1), a compressor, an absorber-generator solution circuit, which has a vapor absorber, a gas generator, a heat exchanger, a pressure control (reducing) valve (A), a solution liquid pump, and isolation valves to direct the refrigerant flow path (B-E). As mentioned above, the advantage of such a combined cycle is that, when the heating or cooling capacity requirements are high, the vapor compressor can assist with the high capacity demand. Using an ionic liquid with high gas solubility for fluorocarbons allows the two cycles (absorption and vapor compression) to be directly linked because the same refrigerant gas can be used in both cycles, which eliminates the need for a secondary heat exchanger and increases the overall cycle efficiency. In addition, as the ionic liquid has zero measurable vapor pressure, little or no cross-over of the ionic liquid from the generator into the refrigerant is expected. This reduces the need for secondary separation equipment, such as rectifiers, which also reduce the overall energy efficiency of the absorption cycle.

The series configuration can also operate in three modes. Mode 1 operates like a conventional absorption cycle where isolation valves D and E are closed and isolation valves B and C are open, which reassembles the same flow path as shown in FIG. 2, and has performance characteristics as shown in Example 1, Table 5. Mode 2 operates like a conventional vapor compression cycle where isolation valve E is open and isolation valves B, C, and D are closed, which reassembles the same flow path as shown in shown in FIG. 1, and has performance characteristics as shown in Example 2, Table 6. In this case the results are identical to those described in the previous case for parallel configuration Mode 2. Mode 3 combines the use of both the vapor compression and the absorption cycles where isolation valves C and D are open and isolation valves B and E are closed as shown in FIG. 4, and has performance characteristics as shown in Example 2, Table 6.

For each refrigerant/ionic liquid pair tested, in both the parallel and series configurations, the results for the system running the hybrid vapor compression—absorption cycle (as shown in Example 2, Table 6) has a higher COP than the results for the system running the absorption cycle alone (as shown in Example 1, Table 5). The solubility curves for these refrigerant pairs are shown in FIGS. 5 to 10 at constant T of 10, 25, 50, and 75° C. Indeed, the good solubility at the absorbent-rich side, which is indicative of concave-upward or near linear vapor pressures, corresponds to good performance.

Where an apparatus or process of this invention is stated or described as comprising, including, containing, having, being composed of or being constituted by certain features, components or steps, it is to be understood, unless the statement or description explicitly provides to the contrary, that one or more features, components or steps in addition to those explicitly stated or described may be present in the apparatus or process. In an alternative embodiment, however, the apparatus or process of this invention may be stated or described as consisting essentially of certain features, components or steps, in which embodiment features, components or steps that would materially alter the principle of operation or the distinguishing characteristics of the apparatus or process are not present therein. In a further alternative embodiment, the apparatus or process of this invention may be stated or described as consisting of certain features, components or steps, in which embodiment features, components or steps other than as named are not present therein.

In the various embodiments of this invention, where the indefinite article "a" or "an" is used with respect to a statement or description of the presence of a feature, component or step in an apparatus or process of this invention, it is to be understood, unless the statement or description explicitly provides to the contrary, that the use of such indefinite article does not limit the presence of the feature, component or step in the apparatus or process to one in number.

In alternative embodiments of this invention, a refrigerant may be any one or more of all of the members of the total group of refrigerants disclosed herein. In those embodiments, the refrigerant may also, however, be any one or more of those members of a subgroup of the total group of refrigerants disclosed herein, where the subgroup is formed by excluding any one or more other members from the total group. As a result, the refrigerant in those embodiments may not only be any one or more of the refrigerants in any subgroup of any size that may be selected from the total group of refrigerants in all the various different combinations of individual members of the total group, but the members in any subgroup may thus be used in the absence of one or more of the members of the total group that have been excluded to form the subgroup. The subgroup formed by excluding various members from the total group of refrigerants may, moreover, be an individual member of the total group such that that refrigerant is used in the absence of all other members of the total group except the selected individual member.

Correspondingly, in further alternative embodiments of this invention, an ionic liquid may be any one or more of all of the members of the total group of ionic liquids disclosed herein. In those embodiments, the liquid may also, however, be any one or more of those members of a subgroup of the total group of ionic liquids disclosed herein, where the subgroup is formed by excluding any one or more other members from the total group. As a result, the ionic liquid in those embodiments may not only be any one or more of the ionic liquids in any subgroup of any size that may be selected from the total group of ionic liquids in all the various different combinations of individual members of the total group, but the members in any subgroup may thus be used in the absence of one or more of the members of the total group that have been excluded to form the subgroup. The subgroup formed by excluding various members from the total group of ionic liquids may, moreover, be an individual member of the total group such that that ionic liquid is used in the absence of all other members of the total group except the selected individual member.

As a result, in yet other alternative embodiments of this invention, refrigerant pairs may be formed from (i) any one or more of all of the members of the total group of refrigerants disclosed herein, selected as described above as a single member or any subgroup of any size taken from the total group of refrigerants in all the various different combinations of individual members of that total group, together with (ii) any one or more of all of the members of the total group of ionic liquids disclosed herein, selected as described above as a single member or any subgroup of any size taken from the total group of ionic liquids in all the various different combinations of individual members of that total group.

The following examples are presented to illustrate the advantages of the present invention and to assist one of ordinary skill in making and using the same. These examples are not intended in any way otherwise to limit the scope of the disclosure.

General Methods and Materials

1-Butyl-3-methylimidazolium hexafluorophosphate ([bmim][PF$_6$], C$_8$H$_{15}$N$_2$F$_6$P, 284 g mol$^{-1}$), 1-butyl-3-methylimidazolium tetrafluoroborate ([bmim][BF$_4$], C$_8$H$_{15}$N$_2$F$_4$B, 226 g mol$^{-1}$), 1,2-dimethyl-3-propylimidazolium tris(trifluoromethylsulfonyl)methide ([dmpim][tTFMS-methide], C$_{12}$H$_{15}$N$_2$F$_9$O$_6$S$_3$, 550 g mol$^{-1}$), 1,2-dimethyl-3-propylimidazolium bis(trifluoromethylsulfonyl)imide ([dmpim][bTFMSimide], C$_{10}$H$_{15}$N$_3$F$_6$O$_4$S$_2$, 419 g mol$^{-1}$), 1-ethyl-3-methylimidazolium bis(pentafluoroethylsulfonyl) imide ([emim][bPFESimide], C$_{10}$H$_{11}$N$_3$F$_{10}$O$_4$S$_2$, 491.33 g mol$^{-1}$), and 1-propyl-3-methylpyridinium bis(trifluoromethylsulfonyl)imide ([pmpy][bTFMSimide], C$_{11}$H$_{14}$N$_2$F$_6$O$_4$S$_2$, 416.36 g mol$^{-1}$) were each obtained from Fluka Chemika (may be obtained from Sigma-Aldrich, St. Louis, Mo.) with a purity of >96 to 97% each.

Difluoromethane (HFC-32, CH$_2$F$_2$, 52.02 g mol$^{-1}$), pentafluoroethane (HFC-125, C$_2$HF$_5$, 120.02 g mol$^{-1}$), 1,1,1,2-tetrafluoroethane (HFC-134a, C$_2$H$_2$F$_4$, 102.03 g mol$^{-1}$), 1,1,1-trifluoroethane (HFC-143a, C$_2$H$_3$F$_3$, 82.04 g mol$^{-1}$), and 1,1-difluoroethane (HFC-152a, C$_2$H$_4$F$_2$, 66.05 g mol$^{-1}$) were obtained from DuPont Fluorochemicals (Wilmington, Del.), with a minimum purity of 99.99%. A molecular sieve trap was installed to remove trace amounts of water from the gases and each of the ionic liquids tested were degassed prior to making solubility measurements.

In the following description, (A)-(D) provide syntheses for anions of ionic liquids that are useful for the invention, and (E)-(W) provide syntheses for ionic liquids useful for the invention.

Preparation of Anions not Generally Available Commercially (A) Synthesis of Potassium 1,1,2,2-tetrafluoroethanesulfonate (TFES-K) [HCF$_2$CF$_2$SO$_3$]$^-$)

A 1-gallon Hastelloy® C276 reaction vessel was charged with a solution of potassium sulfite hydrate (176 g, 1.0 mol), potassium metabisulfite (610 g, 2.8 mol) and deionized water (2000 ml). The pH of this solution was 5.8. The vessel was cooled to 18 degrees C., evacuated to 0.10 MPa, and purged with nitrogen. The evacuate/purge cycle was repeated two more times. To the vessel was then added tetrafluoroethylene (TFE, 66 g), and it was heated to 100 degrees C. at which time the inside pressure was 1.14 MPa. The reaction temperature was increased to 125 degrees C. and kept there for 3 h. As the TFE pressure decreased due to the reaction, more TFE was added in small aliquots (20-30 g each) to maintain operating pressure roughly between 1.14 and 1.48 MPa. Once 500 g (5.0 mol) of TFE had been fed after the initial 66 g precharge, the vessel was vented and cooled to 25 degrees C. The pH of the clear light yellow reaction solution was 10-11. This solution was buffered to pH 7 through the addition of potassium metabisulfite (16 g).

The water was removed in vacuo on a rotary evaporator to produce a wet solid. The solid was then placed in a freeze dryer (Virtis Freezemobile 35×1; Gardiner, N.Y.) for 72 hr to reduce the water content to approximately 1.5 wt % (1387 g crude material). The theoretical mass of total solids was 1351 g. The mass balance was very close to ideal and the isolated solid had slightly higher mass due to moisture. This added freeze drying step had the advantage of producing a free-flowing white powder whereas treatment in a vacuum oven resulted in a soapy solid cake that was very difficult to remove and had to be chipped and broken out of the flask.

The crude TFES-K can be further purified and isolated by extraction with reagent grade acetone, filtration, and drying.

$^{19}$F NMR (D$_2$O) δ −122.0 (dt, J$_{FH}$=6 Hz, J$_{FF}$=6 Hz, 2F); −136.1 (dt, J$_{FH}$53 Hz, 2F).

$^1$H NMR (D$_2$O) δ 6.4 (tt, J$_{FH}$=53 Hz, J$_{FH}$=6 Hz, 1H).

% Water by Karl-Fisher titration: 580 ppm.

Analytical calculation for C$_2$HO$_3$F$_4$SK: C, 10.9: H, 0.5: N, 0.0 Experimental results: C, 11.1: H, 0.7: N, 0.2.

Mp (DSC): 242 degrees C.

TGA (air): 10% wt. loss@367 degrees C., 50% wt. loss@375 degrees C.

TGA (N$_2$): 10% wt. loss@363 degrees C., 50% wt. loss@375 degrees C.

(B) Synthesis of Potassium-1,1,2-trifluoro-2-(perfluoroethoxy)ethanesulfonate (TPES-K)

A 1-gallon Hastelloy® C276 reaction vessel was charged with a solution of potassium sulfite hydrate (88 g, 0.56 mol), potassium metabisulfite (340 g, 1.53 mol) and deionized water (2000 ml). The vessel was cooled to 7 degrees C., evacuated to 0.05 MPa, and purged with nitrogen. The evacuate/purge cycle was repeated two more times. To the vessel was then added perfluoro(ethylvinyl ether) (PEVE, 600 g, 2.78 mol), and it was heated to 125 degrees C. at which time the inside pressure was 2.31 MPa. The reaction temperature was maintained at 125 degrees C. for 10 hr. The pressure dropped to 0.26 MPa at which point the vessel was vented and cooled to 25 degrees C. The crude reaction product was a white crystalline precipitate with a colorless aqueous layer (pH=7) above it.

The $^{19}$F NMR spectrum of the white solid showed pure desired product, while the spectrum of the aqueous layer showed a small but detectable amount of a fluorinated impurity. The desired isomer is less soluble in water so it precipitated in isomerically pure form.

The product slurry was suction filtered through a fitted glass funnel, and the wet cake was dried in a vacuum oven (60 degrees C., 0.01 MPa) for 48 hr. The product was obtained as off-white crystals (904 g, 97% yield).

$^{19}$F NMR (D$_2$O) δ −86.5 (s, 3F); −89.2, −91.3 (subsplit ABq, J$_{FF}$=147 Hz, 2F); −119.3, −121.2 (subsplit ABq, J$_{FF}$=258 Hz, 2F); −144.3 (dm, J$_{FH}$=53 Hz, 1F).

$^1$H NMR (D$_2$O) δ 6.7 (dm, J$_{FH}$=53 Hz, 1H).

Mp (DSC) 263 degrees C.

Analytical calculation for C$_4$HO$_4$F$_8$SK: C, 14.3: H, 0.3 Experimental results: C, 14.1: H, 0.3.

TGA (air): 10% wt. loss@359 degrees C., 50% wt. loss@367 degrees C.

TGA (N$_2$): 10% wt. loss@362 degrees C., 50% wt. loss@374 degrees C.

(C) Synthesis of Potassium-1,1,2-trifluoro-2-(trifluoromethoxy)ethanesulfonate (TTES-K)

A 1-gallon Hastelloy® C276 reaction vessel was charged with a solution of potassium sulfite hydrate (114 g, 0.72 mol), potassium metabisulfite (440 g, 1.98 mol) and deionized water (2000 ml). The pH of this solution was 5.8. The vessel was cooled to −35 degrees C., evacuated to 0.08 MPa, and purged with nitrogen. The evacuate/purge cycle was repeated two more times. To the vessel was then added perfluoro (methylvinyl ether) (PMVE, 600 g, 3.61 mol) and it was heated to 125 degrees C. at which time the inside pressure was 3.29 MPa. The reaction temperature was maintained at 125 degrees C. for 6 hr. The pressure dropped to 0.27 MPa at which point the vessel was vented and cooled to 25 degrees C. Once cooled, a white crystalline precipitate of the desired product formed leaving a colorless clear aqueous solution above it (pH=7).

The $^{19}$F NMR spectrum of the white solid showed pure desired product, while the spectrum of the aqueous layer showed a small but detectable amount of a fluorinated impurity.

The solution was suction filtered through a fitted glass funnel for 6 hr to remove most of the water. The wet cake was then dried in a vacuum oven at 0.01 MPa and 50 degrees C. for 48 h. This gave 854 g (83% yield) of a white powder. The final product was isomerically pure (by $^{19}$F and $^1$H NMR) since the undesired isomer remained in the water during filtration.

$^{19}$F NMR (D$_2$O) δ −59.9 (d, J$_{FH}$=4 Hz, 3F); −119.6, −120.2 (subsplit ABq, J=260 Hz, 2F); −144.9 (dm, J$_{FH}$=53 Hz, 1F).

$^1$H NMR (D$_2$O) δ 6.6 (dm, J$_{FH}$=53 Hz, 1H).

% Water by Karl-Fisher titration: 71 ppm.

Analytical calculation for C$_3$HF$_6$SO$_4$K: C, 12.6: H, 0.4: N, 0.0 Experimental results: C, 12.6: H, 0.0: N, 0.1.

Mp (DSC) 257 degrees C.

TGA (air): 10% wt. loss@343 degrees C., 50% wt. loss@358 degrees C.

TGA (N$_2$): 10% wt. loss@341 degrees C., 50% wt. loss@357 degrees C.

(D) Synthesis of Sodium 1,1,2,3,3,3-hexafluoropropanesulfonate (HFPS-Na)

A 1-gallon Hastelloy® C reaction vessel was charged with a solution of anhydrous sodium sulfite (25 g, 0.20 mol), sodium bisulfite 73 g, (0.70 mol) and of deionized water (400 ml). The pH of this solution was 5.7. The vessel was cooled to 4 degrees C., evacuated to 0.08 MPa, and then charged with hexafluoropropene (HFP, 120 g, 0.8 mol, 0.43 MPa). The vessel was heated with agitation to 120 degrees C. and kept there for 3 hr. The pressure rose to a maximum of 1.83 MPa and then dropped down to 0.27 MPa within 30 minutes. At the end, the vessel was cooled and the remaining HFP was vented, and the reactor was purged with nitrogen. The final solution had a pH of 7.3.

The water was removed in vacuo on a rotary evaporator to produce a wet solid. The solid was then placed in a vacuum oven (0.02 MPa, 140 degrees C., 48 hr) to produce 219 g of white solid, which contained approximately 1 wt % water. The theoretical mass of total solids was 217 g.

The crude HFPS-Na can be further purified and isolated by extraction with reagent grade acetone, filtration, and drying.

$^{19}$F NMR (D$_2$O) δ −74.5 (m, 3F); −113.1, −120.4 (ABq, J=264 Hz, 2F); −211.6 (dm, 1F).

$^1$H NMR (D$_2$O) δ 5.8 (dm, J$_{FH}$=43 Hz, 1H).

Mp (DSC) 126 degrees C.

TGA (air): 10% wt. loss@326 degrees C., 50% wt. loss@446 degrees C.

TGA (N$_2$): 10% wt. loss@322 degrees C., 50% wt. loss@449 degrees C.

Preparation of Ionic Liquids

E) Synthesis of 1-butyl-2,3-dimethylimidazolium 1,1,2,2-tetrafluoroethanesulfonate 1-Butyl-2,3-dimethylimidazolium chloride (22.8 g, 0.121 moles) was mixed with reagent-grade acetone (250 ml) in a large round-bottomed flask and stirred vigorously. Potassium 1,1,2,2-tetrafluoroethanesulfonate (TFES-K, 26.6 g, 0.121 moles), was added to reagent grade acetone (250 ml) in a separate round-bottomed flask, and this solution was carefully added to the 1-butyl-2,3-dimethylimidazolium chloride solution. The large flask was lowered into an oil bath and heated at 60 degrees C. under reflux for 10 hours. The reaction mixture was then filtered using a large frit glass funnel to remove the white KCl precipitate formed, and the filtrate was placed on a rotary evaporator for 4 hours to remove the acetone.

The reaction scheme is shown below:

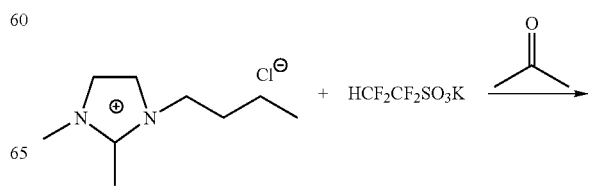

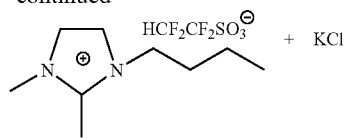

F) Synthesis of 1-butyl-methylimidazolium 1,1,2,2-tetrafluoroethanesulfonate 1-Butyl-3-methylimidazolium chloride (60.0 g) and high purity dry acetone (>99.5%, Aldrich, 300 ml) were combined in a 1 l flask and warmed to reflux with magnetic stirring until the solid completely dissolved. At room temperature in a separate 1 l flask, potassium-1,1,2,2-tetrafluoroethane-sulfonte (TFES-K, 75.6 g) was dissolved in high purity dry acetone (500 ml). These two solutions were combined at room temperature and allowed to stir magnetically for 2 hr under positive nitrogen pressure. The stirring was stopped and the KCl precipitate was allowed to settle, then removed by suction filtration through a fritted glass funnel with a celite pad. The acetone was removed in vacuo to give a yellow oil. The oil was further purified by diluting with high purity acetone (100 ml) and stirring with decolorizing carbon (5 g). The mixture was again suction filtered and the acetone removed in vacuo to give a colorless oil. This was further dried at 4 Pa and 25 degrees C. for 6 hr to provide 83.6 g of product.

$^{19}$F NMR (DMSO-$d_6$) δ −124.7. (dt, J=6 Hz, J=8 Hz, 2F); −136.8 (dt, J=53 Hz, 2F).

$^1$H NMR (DMSO-$d_6$) δ 0.9 (t, J=7.4 Hz, 3H); 1.3 (m, 2H); 1.8 (m, 2H); 3.9 (s, 3H); 4.2 (t, J=7 Hz, 2H); 6.3 (dt, J=53 Hz, J=6Hz, 1H); 7.4 (s, 1H); 7.5 (s, 1H); 8.7 (s, 1H).

% Water by Karl-Fisher titration: 0.14%.

Analytical calculation for $C_9H_{12}F_6N_2O_3S$: C, 37.6: H, 4.7: N, 8.8. Experimental Results: C, 37.6: H, 4.6: N, 8.7.

TGA (air): 10% wt. loss@380 degrees C., 50% wt. loss@420 degrees C.

TGA ($N_2$): 10% wt. loss@375 degrees C., 50% wt. loss@422 degrees C.

G) Synthesis of 1-ethyl-3-methylimidazolium 1,1,2,2-tetrafluoroethane sulfonate To a 500 ml round bottom flask was added 1-ethyl-3 methylimidazolium chloride (Emim-Cl, 98%, 61.0 g) and reagent grade acetone (500 ml). The mixture was gently warmed (50 degrees C.) until almost all of the Emim-Cl dissolved. To a separate 500 ml flask was added potassium 1,1,2,2-tetrafluoroethanesulfonate (TFES-K, 90.2 g) along with reagent grade acetone (350 ml). This second mixture was stirred magnetically at 24 degrees C. until all of the TFES-K dissolved.

These solutions were combined in a 1 l flask producing a milky white suspension. The mixture was stirred at 24 degrees C. for 24 hrs. The KCl precipitate was then allowed to settle leaving a clear green solution above it.

The reaction mixture was filtered once through a celite/acetone pad and again through a fitted glass funnel to remove the KCl. The acetone was removed in vacuo first on a rotovap and then on a high vacuum line (4 Pa, 25 degrees C.) for 2 hr. The product was a viscous light yellow oil (76.0 g, 64% yield).

The reaction scheme is shown below:

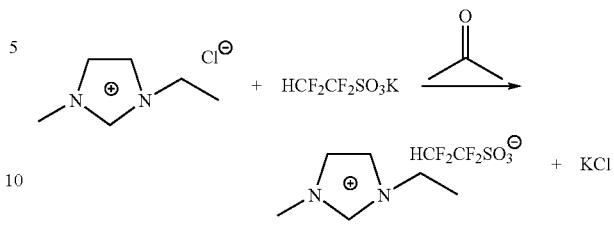

$^{19}$F NMR (DMSO-$d_6$) δ −124.7. (dt, $J_{FH}$=6 Hz, $J_{FF}$=6 Hz, 2F); −138.4 (dt, $J_{FH}$=53 Hz, 2F).

$^1$H NMR (DMSO-$d_6$) δ 1.3 (t, J=7.3 Hz, 3H); 3.7 (s, 3H); 4.0 (q, J=7.3 Hz, 2H);

6.1 (tt, $J_{FH}$=53 Hz, $J_{FH}$=6 Hz, 1H); 7.2 (s, 1H); 7.3 (s, 1H); 8.5 (s, 1H).

% Water by Karl-Fisher titration: 0.18%.

Analytical calculation for $C_8H_{12}N_2O_3F_4S$: C, 32.9: H, 4.1: N, 9.6 Found: C, 33.3: H, 3.7: N, 9.6.

Mp 45-46 degrees C.

TGA (air): 10% wt. loss@379 degrees C., 50% wt. loss@420 degrees C.

TGA ($N_2$): 10% wt. loss@378 degrees C., 50% wt. loss@418 degrees C.

H) Synthesis of 1-ethyl-3-methylimidazolium 1,1,2,3,3,3-hexafluoropropanesulfonate To a 1 l round bottom flask was added 1-ethyl-3-methylimidazolium chloride (Emim-Cl, 98%, 50.5 g) and reagent grade acetone (400 ml). The mixture was gently warmed (50 degrees C.) until almost all of the Emim-Cl dissolved. To a separate 500 ml flask was added potassium 1,1,2,3,3,3-hexafluoropropanesulfonate (HFPS-K, 92.2 g) along with reagent grade acetone (300 ml). This second mixture was stirred magnetically at room temperature until all of the HFPS-K dissolved.

These solutions were combined and stirred under positive $N_2$ pressure at 26 degrees C. for 12 hr producing a milky white suspension. The KCl precipitate was allowed to settle overnight leaving a clear yellow solution above it.

The reaction mixture was filtered once through a celite/acetone pad and again through a fitted glass funnel. The acetone was removed in vacuo first on a rotovap and then on a high vacuum line (4 Pa, 25 degrees C.) for 2 hr. The product was a viscous light yellow oil (103.8 g, 89% yield).

The reaction scheme is shown below:

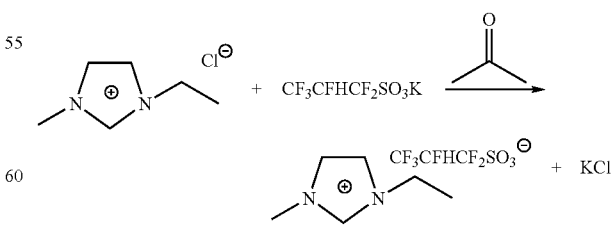

$^{19}$F NMR (DMSO-$d_6$) δ −73.8 (s, 3F); −114.5, −121.0 (ABq, J=258 Hz, 2F); −210.6 (m, 1F, $J_{HF}$=41.5 Hz).

$^1$H NMR (DMSO-$d_6$) δ 1.4 (t, J=7.3 Hz, 3H); 3.9 (s, 3H); 4.2 (q, J=7.3 Hz, 2H,);

5.8 (m, $J_{HF}$=41.5 Hz, 1H,); 7.7 (s, 1H); 7.8 (s, 1H); 9.1 (s, 1H).

% Water by Karl-Fisher titration: 0.12%.

Analytical calculation for $C_9H_{12}N_2O_3F_6S$: C, 31.5: H, 3.5: N, 8.2. Experimental Results: C, 30.9: H, 3.3: N, 7.8.

TGA (air): 10% wt. loss@342 degrees C., 50% wt. loss@373 degrees C.

TGA ($N_2$): 10% wt. loss@341 degrees C., 50% wt. loss@374 degrees C.

I) Synthesis of 1-hexyl-3-methylimidazolium 1,1,2,2-tetrafluoroethanesulfonate 1-Hexyl-3-methylimidazolium chloride (10 g, 0.0493 moles) was mixed with reagent-grade acetone (100 ml) in a large round-bottomed flask and stirred vigorously under a nitrogen blanket. Potassium 1,1,2,2-tetrafluoroethane sulfonate (TFES-K, 10 g, 0.0455 moles) was added to reagent grade acetone (100 ml) in a separate round-bottomed flask, and this solution was carefully added to the 1-hexyl-3-methylimidazolium chloride/acetone mixture. The mixture was left to stir overnight. The reaction mixture was then filtered using a large frit glass funnel to remove the white KCl precipitate formed, and the filtrate was placed on a rotary evaporator for 4 hours to remove the acetone.

The reaction scheme is shown below:

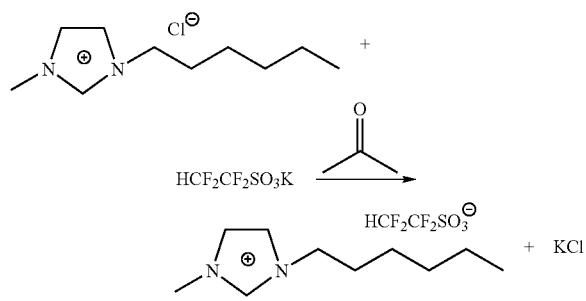

J) Synthesis of 1-dodecyl-3-methylimidazolium 1,1,2,2-tetrafluoroethanesulfonate 1-Dodecyl-3-methylimidazolium chloride (34.16 g, 0.119 moles) was partially dissolved in reagent-grade acetone (400 ml) in a large round-bottomed flask and stirred vigorously. Potassium 1,1,2,2-tetrafluoroethanesulfonate (TFES-K, 26.24 g, 0.119 moles) was added to reagent grade acetone (400 ml) in a separate round-bottomed flask, and this solution was carefully added to the 1-dodecyl-3-methylimidazolium chloride solution. The reaction mixture was heated at 60 degrees C. under reflux for approximately 16 hours. The reaction mixture was then filtered using a large frit glass funnel to remove the white KCl precipitate formed, and the filtrate was placed on a rotary evaporator for 4 hours to remove the acetone.

The reaction scheme is shown below:

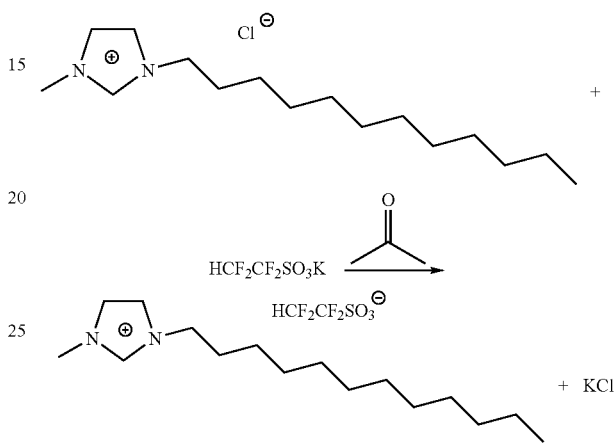

K) Synthesis of 1-hexadecyl-3-methylimidazolium 1,1,2,2-tetrafluoroethanesulfonate 1-Hexadecyl-3-methylimidazolium chloride (17.0 g, 0.0496 moles) was partially dissolved in reagent-grade acetone (100 ml) in a large round-bottomed flask and stirred vigorously. Potassium 1,1,2,2-tetrafluoroethanesulfonate (TFES-K, 10.9 g, 0.0495 moles) was added to reagent grade acetone (100 ml) in a separate round-bottomed flask, and this solution was carefully added to the 1-hexadecyl-3-methylimidazolium chloride solution. The reaction mixture was heated at 60 degrees C. under reflux for approximately 16 hours. The reaction mixture was then filtered using a large frit glass funnel to remove the white KCl precipitate formed, and the filtrate was placed on a rotary evaporator for 4 hours to remove the acetone.

The reaction scheme is shown below:

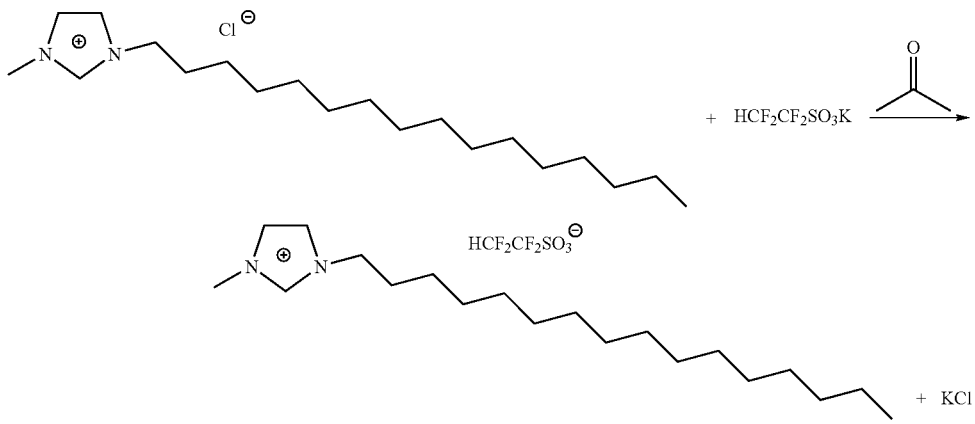

L) Synthesis of 1-octadecyl-3-methylimidazolium 1,1,2,2-tetrafluoroethaneulfonate 1-Octadecyl-3-methylimidazolium chloride (17.0 g, 0.0458 moles) was partially dissolved in reagent-grade acetone (200 ml) in a large round-bottomed flask and stirred vigorously. Potassium 1,1,2,2-tetrafluoroethanesulfonate (TFES-K, 10.1 g, 0.0459 moles), was added to reagent grade acetone (200 ml) in a separate round-bottomed flask, and this solution was carefully added to the 1-octadecyl-3-methylimidazolium chloride solution. The reaction mixture was heated at 60 degrees C. under reflux for approximately 16 hours. The reaction mixture was then filtered using a large frit glass funnel to remove the white KCl precipitate formed, and the filtrate was placed on a rotary evaporator for 4 hours to remove the acetone.

The reaction scheme is shown below:

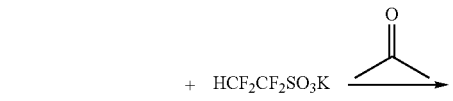
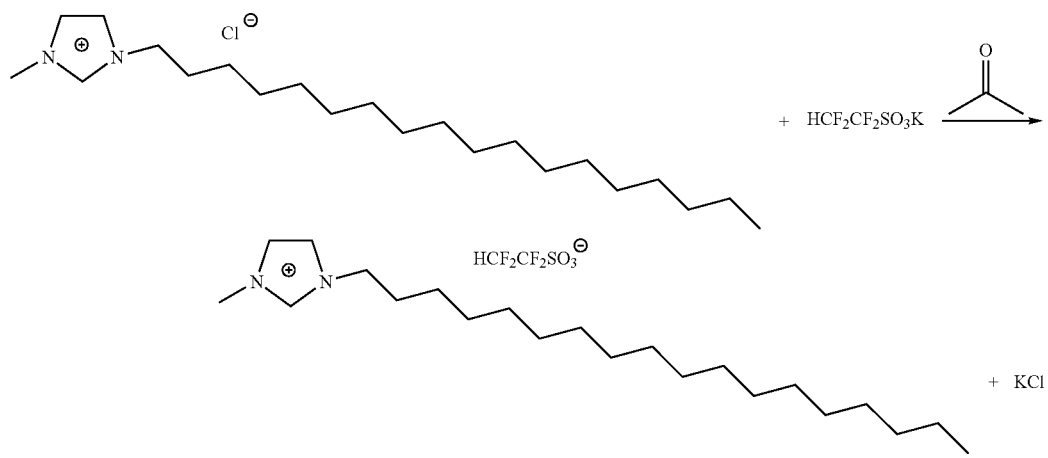

M Synthesis of 1-propyl-3-(1,1,2,2-TFES) imidazolium 1,1,2,2-tetrafluoroethanesulfonate Imidazole (19.2 g) was added to of tetrahydrofuran (80 mls) A glass shaker tube reaction vessel was filled with the THF-containing imidazole solution. The vessel was cooled to 18° C., evacuated to 0.08 MPa, and purged with nitrogen. The evacuate/purge cycle was repeated two more times. Tetrafluoroethylene (TFE, 5 g) was then added to the vessel, and it was heated to 100 degrees C., at which time the inside pressure was about 0.72 MPa. As the TFE pressure decreased due to the reaction, more TFE was added in small aliquots (5 g each) to maintain operating pressure roughly between 0.34 MPa and 0.86 MPa. Once 40 g of TFE had been fed, the vessel was vented and cooled to 25 degrees C. The THF was then removed under vacuum and the product was vacuum distilled at 40 degrees C. to yield pure product as shown by $^1H$ and $^{19}F$ NMR (yield 44 g). Iodopropane (16.99 g) was mixed with 1-(1,1,2,2-tetrafluoroethyl)imidazole (16.8 g) in dry acetonitrile (100 ml), and the mixture was refluxed for 3 days. The solvent was removed in vacuo, yielding a yellow waxy solid (yield 29 g). The product, 1-propyl-3-(1,1,2,2-tetrafluoroethyl)imidazolium iodide was confirmed by 1H NMR (in $CD_3CN$) [0.96 (t, 3H); 1.99 (m, 2H); 4.27 (t, 2H); 6.75 (t, 1H); 7.72 (d, 2H); 9.95 (s, 1H)].

Iodide (24 g) was then added to 60 ml of dry acetone, followed by 15.4 g of potassium 1,1,2,2-tetrafluoroethanesulfonate in 75 ml of dry acetone. The mixture was heated at 60 degrees C. overnight and a dense white precipitate was formed (potassium iodide). The mixture was cooled, filtered, and the solvent from the filtrate was removed using a rotary evaporator. Some further potassium iodide was removed under filtration. The product was further purified by adding 50 g of acetone, 1 g of charcoal, 1 g of celite and 1 g of silica gel. The mixture was stirred for 2 hours, filtered and the solvent removed. This yielded 15 g of a liquid, shown by NMR to be the desired product.

N) Synthesis of 1-butyl-3-methylimidazolium 1,1,2,3,3,3-hexafluoropropanesulfonate (Bmim-HFPS)

1-Butyl-3-methylimidazolium chloride (Bmim-Cl, 50.0 g) and high purity dry acetone (>99.5%, 500 ml) were combined in a 1l flask and warmed to reflux with magnetic stirring until the solid all dissolved. At room temperature in a separate 1l flask, potassium-1,1,2,3,3,3-hexafluoropropanesulfonte (HFPS-K) was dissolved in high purity dry acetone (550 ml). These two solutions were combined at room temperature and allowed to stir magnetically for 12 hr under positive nitrogen pressure. The stirring was stopped, and the KCl precipitate was allowed to settle. This solid was removed by suction filtration through a fitted glass funnel with a celite pad. The acetone was removed in vacuo to give a yellow oil. The oil was further purified by diluting with high purity acetone (100 ml) and stirring with decolorizing carbon (5 g). The mixture was suction filtered and the acetone removed in vacuo to give a colorless oil. This was further dried at 4 Pa and 25 degrees C. for 2 hr to provide 68.6 g of product.

$^{19}F$ NMR (DMSO-$d_6$) δ −73.8 (s, 3F); −114.5, −121.0 (ABq, J=258 Hz, 2F); −210.6 (m, J=42 Hz, 1F).

$^1H$ NMR (DMSO-$d_6$) δ 0.9 (t, J=7.4 Hz, 3H); 1.3 (m, 2H); 1.8 (m, 2H); 3.9 (s, 3H); 4.2 (t, J=7 Hz, 2H); 5.8 (dm, J=42 Hz, 1H); 7.7 (s, 1H); 7.8 (s, 1H); 9.1 (s, 1H).

% Water by Karl-Fisher titration: 0.12%.

Analytical calculation for $C_9H_{12}F_6N_2O_3S$: C, 35.7: H, 4.4: N, 7.6. Experimental Results: C, 34.7: H, 3.8: N, 7.2.

TGA (air): 10% wt. loss@340 degrees C., 50% wt. loss@367 degrees C.

TGA ($N_2$): 10% wt. loss@335 degrees C., 50% wt. loss@361 degrees C.

Extractable chloride by ion chromatography: 27 ppm.

O) Synthesis of 1-butyl-3-methylimidazolium 1,1,2-trifluoro-2-(trifluoromethoxy)ethanesulfonate (Bmim-TTES)

1-Butyl-3-methylimidazolium chloride (Bmim-Cl, 10.0 g) and deionized water (15 ml) were combined at room temperature in a 200 ml flask. At room temperature in a separate 200 ml flask, potassium 1,1,2-trifluoro-2-(trifluoromethoxy)ethanesulfonate (TTES-K, 16.4 g) was dissolved in deionized water (90 ml). These two solutions were combined at room temperature and allowed to stir magnetically for 30 min. under positive nitrogen pressure to give a biphasic mixture with the desired ionic liquid as the bottom phase. The layers were separated, and the aqueous phase was extracted with 2×50 ml portions of methylene chloride. The combined organic layers were dried over magnesium sulfate and concentrated in vacuo. The colorless oil product was dried at for 4 hr at 5 Pa and 25 degrees C. to afford 15.0 g of product.

$^{19}$F NMR (DMSO-$d_6$) δ −56.8 (d, $J_{FH}$=4 Hz, 3F); −119.5, −119.9 (subsplit ABq, J=260 Hz, 2F); −142.2 (dm, $J_{FH}$=53 Hz, 1F).

$^1$H NMR (DMSO-$d_6$) δ 0.9 (t, J=7.4 Hz, 3H); 1.3 (m, 2H); 1.8 (m, 2H); 3.9 (s, 3H); 4.2 (t, J=7.0 Hz, 2H); 6.5 (dt, J=53 Hz, J=7 Hz, 1H); 7.7 (s, 1H); 7.8 (s, 1H); 9.1 (s, 1H).

% Water by Karl-Fisher titration: 613 ppm.

Analytical calculation for C11H16F6N2O4S: C, 34.2: H, 4.2: N, 7.3.

Experimental Results: C, 34.0: H, 4.0: N, 7.1.

TGA (air): 10% wt. loss@328 degrees C., 50% wt. loss@354 degrees C.

TGA (N$_2$): 10% wt. loss@324 degrees C., 50% wt. loss@351 degrees C.

Extractable chloride by ion chromatography: <2 ppm.

P) Synthesis of 1-butyl-3-methylimidazolium 1,1,2-trifluoro-2-(perfluoroethoxy)ethanesulfonate (Bmim-TPES)

1-Butyl-3-methylimidazolium chloride (Bmim-Cl, 7.8 g) and dry acetone (150 ml) were combined at room temperature in a 500 ml flask. At room temperature in a separate 200 ml flask, potassium 1,1,2-trifluoro-2-(perfluoroethoxy)ethanesulfonate (TPES-K, 15.0 g) was dissolved in dry acetone (300 ml). These two solutions were combined and allowed to stir magnetically for 12 hr under positive nitrogen pressure. The KCl precipitate was then allowed to settle leaving a colorless solution above it. The reaction mixture was filtered once through a celite/acetone pad and again through a fritted glass funnel to remove the KCl. The acetone was removed in vacuo first on a rotovap and then on a high vacuum line (4 Pa, 25 degrees C.) for 2 hr. Residual KCl was still precipitating out of the solution, so methylene chloride (50 ml) was added to the crude product, which was then washed with deionized water (2×50 ml). The solution was dried over magnesium sulfate, and the solvent was removed in vacuo to give the product as a viscous light yellow oil (12.0 g, 62% yield).

$^{19}$F NMR (CD$_3$CN) δ −85.8 (s, 3F); −87.9, −90.1 (subsplit ABq, $J_{FF}$=147 Hz, 2F); −120.6, −122.4 (subsplit ABq, $J_{FF}$=258 Hz, 2F); −142.2 (dm, $J_{FH}$=53 Hz, 1F).

$^1$H NMR (CD$_3$CN) δ 1.0 (t, J=7.4 Hz, 3H); 1.4 (m, 2H); 1.8 (m, 2H); 3.9 (s, 3H); 4.2 (t, J=7.0 Hz, 2H); 6.5 (dm, J=53 Hz, 1H); 7.4 (s, 1H); 7.5 (s, 1H); 8.6 (s, 1H).

% Water by Karl-Fisher titration: 0.461.

Analytical calculation for C12H16F8N2O4S: C, 33.0: H, 3.7. Experimental Results: C, 32.0: H, 3.6.

TGA (air): 10% wt. loss@334 degrees C., 50% wt. loss@353 degrees C.

TGA (N$_2$): 10% wt. loss@330 degrees C., 50% wt. loss@365 degrees C.

Q) Synthesis of tetradecyl(tri-n-butyl)phosphonium 1,1,2,3,3,3-hexafluoropropanesulfonate ([4.4.4.14]P-HFPS)

To a 4 l round bottomed flask was added the ionic liquid tetradecyl(tri-n-butyl)phosphonium chloride (Cyphos® IL 167, 345 g) and deionized water (1000 ml). The mixture was magnetically stirred until it was one phase. In a separate 2l flask, potassium 1,1,2,3,3,3-hexafluoropropanesulfonate (HFPS-K, 214.2 g) was dissolved in deionized water (1100 ml). These solutions were combined and stirred under positive N$_2$ pressure at 26 degrees C. for 1 hr producing a milky white oil. The oil slowly solidified (439 g) and was removed by suction filtration and then dissolved in chloroform (300 ml). The remaining aqueous layer (pH=2) was extracted once with chloroform (100 ml). The chloroform layers were combined and washed with an aqueous sodium carbonate solution (50 ml) to remove any acidic impurity. They were then dried over magnesium sulfate, suction filtered, and reduced in vacuo first on a rotovap and then on a high vacuum line (4 Pa, 100 degrees C.) for 16 hr to yield the final product as a white solid (380 g, 76% yield).

$^{19}$F NMR (DMSO-$d_6$) δ −73.7 (s, 3F); −114.6, −120.9 (ABq, J=258 Hz, 2F); −210.5 (m, $J_{HF}$=41.5 Hz, 1F).

$^1$H NMR (DMSO-$d_6$) δ 0.8 (t, J=7.0 Hz, 3H); 0.9 (t, J=7.0 Hz, 9H); 1.3 (br s, 20H); 1.4 (m, 16H); 2.2 (m, 8H); 5.9 (m, $J_{HF}$=42 Hz, 1H).

% Water by Karl-Fisher titration: 895 ppm.

Analytical calculation for C29H57F6O3PS: C, 55.2: H, 9.1: N, 0.0.

Experimental Results: C, 55.1: H, 8.8: N, 0.0.

TGA (air): 10% wt. loss@373 degrees C., 50% wt. loss@421 degrees C.

TGA (N$_2$): 10% wt. loss@383 degrees C., 50% wt. loss@436 degrees C.

R) Synthesis of tetradecyl(tri-n-hexyl)phosphonium 1,1,2-trifluoro-2-(perfluoroethoxy)ethanesulfonate ([6.6.6.14]P-TPES)

To a 500 ml round bottomed flask was added acetone (Spectroscopic grade, 50 ml) and ionic liquid tetradecyl(tri-n-hexyl)phosphonium chloride (Cyphos® IL 101, 33.7 g). The mixture was magnetically stirred until it was one phase. In a separate 1l flask, potassium 1,1,2-trifluoro-2-(perfluoroethoxy)ethanesulfonate (TPES-K, 21.6 g) was dissolved in acetone (400 ml). These solutions were combined and stirred under positive N$_2$ pressure at 26 degrees C. for 12 hr producing a white precipitate of KCl. The precipitate was removed by suction filtration, and the acetone was removed in vacuo on a rotovap to produce the crude product as a cloudy oil (48 g). Chloroform (100 ml) was added, and the solution was washed once with deionized water (50 ml). It was then dried over magnesium sulfate and reduced in vacuo first on a rotovap and then on a high vacuum line (8 Pa, 24 degrees C.) for 8 hr to yield the final product as a slightly yellow oil (28 g, 56% yield).

$^{19}$F NMR (DMSO-$d_6$) δ −86.1 (s, 3F); −88.4, −90.3 (subsplit ABq, $J_{FF}$=147 Hz, 2F); −121.4, −122.4 (subsplit ABq, $J_{FF}$=258 Hz, 2F); −143.0 (dm, $J_{FH}$=53 Hz, 1F).

¹H NMR (DMSO-d₆) δ 0.9 (m, 12H); 1.2 (m, 16H); 1.3 (m, 16H); 1.4 (m, 8H); 1.5 (m, 8H); 2.2 (m, 8H); 6.3 (dm, $J_{FH}$=54 Hz, 1H).

% Water by Karl-Fisher titration: 0.11.

Analytical calculation for C36H69F8O4PS: C, 55.4: H, 8.9: N, 0.0.

Experimental Results: C, 55.2: H, 8.2: N, 0.1.

TGA (air): 10% wt. loss@311 degrees C., 50% wt. loss@339 degrees C.

TGA (N₂): 10% wt. loss@315 degrees C., 50% wt. loss@343 degrees C.

S) Synthesis of tetradecyl(tri-n-hexyl)phosphonium 1,1,2-trifluoro-2-(trifluoromethoxy)ethanesulfonate ([6.6.6.14]P-TTES)

To a 100 ml round bottomed flask was added acetone (Spectroscopic grade, 50 ml) and ionic liquid tetradecyl(tri-n-hexyl)phosphonium chloride (Cyphos® IL 101, 20.2 g). The mixture was magnetically stirred until it was one phase. In a separate 100 ml flask, potassium 1,1,2-trifluoro-2-(trifluoromethoxy)ethanesulfonate (TTES-K, 11.2 g) was dissolved in acetone (100 ml). These solutions were combined and stirred under positive N₂ pressure at 26 degrees C. for 12 hr producing a white precipitate of KCl.

The precipitate was removed by suction filtration, and the acetone was removed in vacuo on a rotovap to produce the crude product as a cloudy oil. The product was diluted with ethyl ether (100 ml) and then washed once with deionized water (50 ml), twice with an aqueous sodium carbonate solution (50 ml) to remove any acidic impurity, and twice more with deionized water (50 ml). The ether solution was then dried over magnesium sulfate and reduced in vacuo first on a rotovap and then on a high vacuum line (4 Pa, 24 degrees C.) for 8 hr to yield the final product as an oil (19.0 g, 69% yield).

¹⁹F NMR (CD₂Cl₂) δ -60.2 (d, $J_{FH}$=4 Hz, 3F); -120.8, -125.1 (subsplit ABq, J=260 Hz, 2F); -143.7 (dm, $J_{FH}$=53 Hz, 1F).

¹H NMR (CD₂Cl₂) δ 0.9 (m, 12H); 1.2 (m, 16H); 1.3 (m, 16H); 1.4 (m, 8H); 1.5 (m, 8H); 2.2 (m, 8H); 6.3 (dm, $J_{FH}$=54 Hz, 1H).

% Water by Karl-Fisher titration: 412 ppm.

Analytical calculation for C35H69F6O4PS: C, 57.5: H, 9.5: N, 0.0.

Experimental results: C, 57.8: H, 9.3: N, 0.0.

TGA (air): 10% wt. loss@331 degrees C., 50% wt. loss@359 degrees C.

TGA (N₂): 10% wt. loss@328 degrees C., 50% wt. loss@360 degrees C.

T) Synthesis of 1-ethyl-3-methylimidazolium 1,1,2,2-tetrafluoro-2-(pentafluoroethoxy)sulfonate (Emim-TPENTAS)

To a 500 ml round bottomed flask was added 1-ethyl-3-methylimidazolium chloride (Emim-Cl, 98%, 18.0 g) and reagent grade acetone (150 ml). The mixture was gently warmed (50 degrees C.) until all of the Emim-Cl dissolved. In a separate 500 ml flask, potassium 1,1,2,2-tetrafluoro-2-(pentafluoroethoxy)sulfonate (TPENTAS-K, 43.7 g) was dissolved in reagent grade acetone (450 ml).

These solutions were combined in a 1 l flask producing a white precipitate (KCl). The mixture was stirred at 24 degrees C. for 8 hr. The KCl precipitate was then allowed to settle leaving a clear yellow solution above it. The KCl was removed by filtration through a celite/acetone pad. The acetone was removed in vacuo to give a yellow oil, which was then diluted with chloroform (100 ml). The chloroform was washed three times with deionized water (50 ml), dried over magnesium sulfate, filtered, and reduced in vacuo first on a rotovap and then on a high vacuum line (4 Pa, 25 degrees C.) for 8 hr. The product was a light yellow oil (22.5 g).

¹⁹F NMR (DMSO-d₆) δ -82.9 (m, 2F); -87.3 (s, 3F); -89.0 (m, 2F); -118.9 (s, 2F).

¹H NMR (DMSO-d₆) δ 1.5 (t, J=7.3 Hz, 3H); 3.9 (s, 3H); 4.2 (q, J=7.3 Hz, 2H); 7.7 (s, 1H); 7.8 (s, 1H); 9.1 (s, 1H).

% Water by Karl-Fisher titration: 0.17%.

Analytical calculation for C10H11N2O4F9S: C, 28.2: H, 2.6: N, 6.6

Experimental results: C, 28.1: H, 2.9: N, 6.6.

TGA (air): 10% wt. loss@351 degrees C., 50% wt. loss@401 degrees C.

TGA (N₂): 10% wt. loss@349 degrees C., 50% wt. loss@406 degrees C.

U) Synthesis of Tetrabutylphosphonium 1,1,2-trifluoro-2-(perfluoroethoxy)ethanesulfonate (TBP-TPES)

To a 200 ml round bottomed flask was added deionized water (100 ml) and tetra-n-butylphosphonium bromide (Cytec Canada Inc., 20.2 g). The mixture was magnetically stirred until the solid all dissolved. In a separate 300 ml flask, potassium 1,1,2-trifluoro-2-(perfluoroethoxy)ethanesulfonate (TPES-K, 20.0 g) was dissolved in deionized water (400 ml) heated to 70 degrees C. These solutions were combined and stirred under positive N₂ pressure at 26 degrees C. for 2 hr producing a lower oily layer. The product oil layer was separated and diluted with chloroform (30 ml), then washed once with an aqueous sodium carbonate solution (4 ml) to remove any acidic impurity, and three times with deionized water (20 ml). It was then dried over magnesium sulfate and reduced in vacuo first on a rotovap and then on a high vacuum line (8 Pa, 24 degrees C.) for 2 hr to yield the final product as a colorless oil (28.1 g, 85% yield).

¹⁹F NMR (CD₂Cl₂) δ -86.4 (s, 3F); -89.0, -90.8 (subsplit ABq, $J_{FF}$=147 Hz, 2F); -119.2, -125.8 (subsplit ABq, $J_{FF}$=254 Hz, 2F); -141.7 (dm, $J_{FH}$=53 Hz, 1F).

¹H NMR (CD₂Cl₂) δ 1.0 (t, J=7.3 Hz, 12H); 1.5 (m, 16H); 2.2 (m, 8H); 6.3 (dm, $J_{FH}$=54 Hz, 1H).

% Water by Karl-Fisher titration: 0.29.

Analytical calculation for C20H37F8O4PS: C, 43.2: H, 6.7: N, 0.0.

Experimental results: C, 42.0: H, 6.9: N, 0.1.

Extractable bromide by ion chromatography: 21 ppm.

(V) Preparation of 1,3-dioctylimidazolium iodide [doim][I]

1,3-Dioctylimidazolium iodide [ooim][I] was prepared as described by L. Xu, et al., Journal of Organometallic Chemistry, 2000, 598, 409-416:

Imidazole (2.72 g; 0.04 mmol) and octyl bromide (3.1 g; 0.016 mmol) were dissolved in 55 ml of ethyl acetate. The mixture was refluxed under a nitrogen blanket. Initially, the solution was clear and colorless, however upon refluxing approximately 1 hour the mixture became cloudy with a tannish color. The mixture was allowed to reflux overnight. The mixture was then cooled to room temperature (RT) upon which a white precipitate formed. The mixture was extracted with water (2×: 30 ml). After drying the solvent with magnesium sulfate, the solvent was removed using a vacuum, yielding a tannish oil.

To the oily residue was added 60 ml of toluene followed by 1-iodoctane (4.8 g; 0.02). The mixture was refluxed overnight under a nitrogen blanket, resulting in a dark yellow mixture. The yellow oil was collected via a separation funnel rinsed with toluene (2×: 20 ml) and dried under vacuum.

(W) Preparation of 1-methyl-3-octylimidazolium iodide [omim][I]

1-Methyl-3-octylimidazolium iodide [omim][I] was prepared as described by L. Xu, et al. (Journal of Organometallic Chemistry, 2000, 598, 409-416):

1-Methylimidazole (1.65 g; 0.02 mmol) and 1-iodoctane (5.31 g; 0.022 mmol) were dissolved in 30 ml of toluene. The reaction was refluxed, whereupon the mixture immediately became yellow in color and cloudy. The mixture was refluxed overnight, during which a yellowish oily precipitate formed. The yellowish oil was collected and dried under vacuum.

The Following Nomenclature and Abbreviations are Used:

$a_i$=generic RK EOS parameter of the i-th species ($m^6 \cdot MPa \cdot mol^{-2}$)
$b_i$=generic RK EOS parameter of i-th species ($m^3 \cdot mol^{-1}$)
C=concentration ($mol \cdot m^{-3}$)
$C_b$=buoyancy force (N)
$C_f$=correction factor (kg)
$C_{pi}^0$=ideal gas heat capacity of i-th species ($J \cdot mol^{-1} \cdot K^{-1}$)
$C_0$=initial concentration ($mol \cdot m^{-3}$)
$C_s$=saturation concentration ($mol \cdot m^{-3}$)
<C>=space-averaged concentration ($mol \cdot m^{-3}$)
COP=coefficient of performance
D=diffusion constant ($m^2 \cdot s^{-1}$)
g=gravitational acceleration (9.80665 $m \cdot s^{-2}$)
f=mass flow rate ratio
f(T)=temperature dependent term of binary interaction parameter, $1+\tau_{ij}/T$
$H_i$=enthalpy at point i ($J \cdot kg^{-1}$)
$k_{ij}, k_{ji}, l_{ij}, l_{ji}$=binary interaction parameters
L=length (m)
$m_a$=mass absorbed (kg)
$m_i$=mass of i-th species on sample side of balance (kg)
$m_j$=mass of j-th species on counterweight side of balance (kg)
$m_{ij}$=binary interaction parameter
$m_s$=mass flow rate of solution ($kg \cdot sec^{-1}$)
$m_r$=mass flow rate of refrigerant ($kg \cdot sec^{-1}$)
$m_{IL}$=mass of ionic liquid sample (kg)
$MW_i$=molecular weight of i-th species ($kg \cdot mol^{-1}$)
N=n-th number component
P=pressure (MPa)
$P_{ci}$=critical pressure of i-th species (MPa)
$P_0$=initial pressure (MPa)
$Q_i$=heat (kW)
R=gas constant (8.31434 $m^3 \cdot Pa \cdot mol^{-1} \cdot K^{-1}$)
t=time (s)
$T_{ci}$=critical temperature of i-th species (K)
$T_i$=temperature of i-th species (K)
$T_j$=temperature of j-th species (K)
$T_s$=temperature of sample (K)
$V_i$=volume of i-th species ($m^3$)
$V_{IL}$=volume of ionic liquid ($m^3$)
$V_m$=liquid sample volume ($m^3$)
$\tilde{V}_g$=molar volume of gas ($m^3 \cdot mol^{-1}$)
$\tilde{V}_i$=molar volume of i-th species ($m^3 \cdot mol^{-1}$)
$\tilde{V}_{IL}$=molar volume of ionic liquid ($m^3 \cdot mol^{-1}$)
$\tilde{V}_m$=molar volume of mixture ($m^3 \cdot mol^{-1}$)
$\tilde{V}_0$=initial molar volume ($m^3 \cdot mol^{-1}$)
$\Delta \tilde{V}$=change in molar volume ($m^3 \cdot mol^{-1}$)
$W_i$=work (kW)
$x_i$=mole fraction of i-th species
z=depth (m)
α=EOS temperature dependence parameter
$β_k$=coefficient of temperature dependence parameter
$λ_n$=eigenvalue ($m^{-1}$)
$ρ_g$=density of gas ($kg \cdot m^{-3}$)
$ρ_i$=density of i-th component on sample side of balance ($kg \cdot m^{-3}$)
$ρ_j$=density of j-th component on counter weight side of balance ($kg \cdot m^{-3}$)
$ρ_{air}$=density of air ($kg \cdot m^{-3}$)
$ρ_s$=density of sample ($kg \cdot m^{-3}$)
η=heat ratio, output power divided by input power
$τ_{ij}$=binary interaction parameter (K) for temperature dependence term, f(T)

Figure 13:
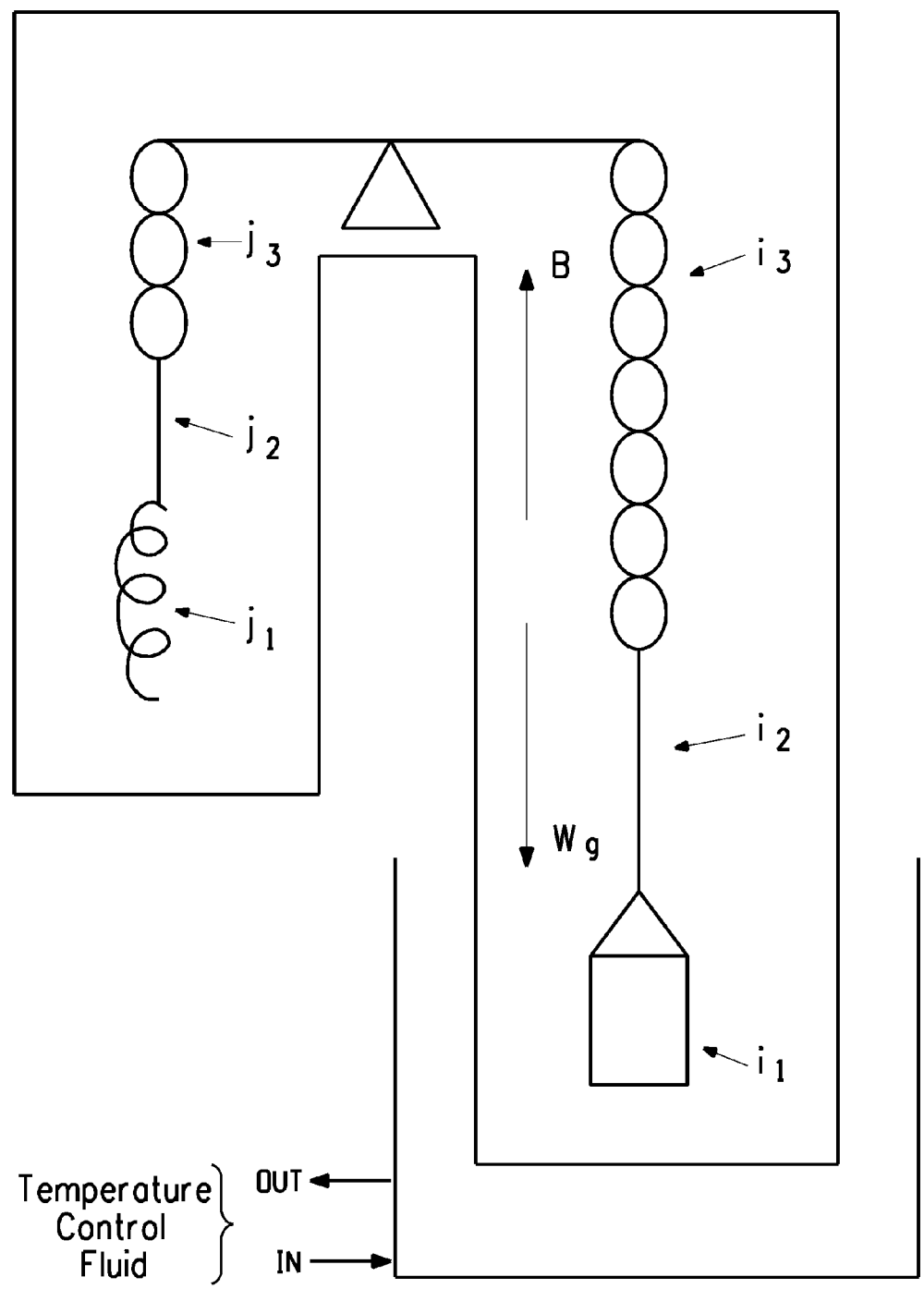
FIG. 13 shows a schematic diagram of the gravimetric microbalance used for measuring gas absorption in the ionic liquids. In the diagram $j_1$, $j_2$, and $j_3$ refer to the counterweight, hook and chain, respectively; $i_1$, $i_2$ and $i_3$ refer to the sample container, wire and chain, respectively, $W_g$ refers to the force due to gravity; and B refers to the force due to buoyancy.

Units
Pa≡Pascal
MPa≡Mega Pascal
mol≡mole
m≡meter
cm≡centimeter
kW≡kilowatt
K≡Kelvin
N≡Newton
J≡Joule
kJ≡kilojoule
kg≡kilogram
mg≡milligram
μg≡microgram
T≡temperature
P≡pressure
mbar≡millibar
min≡minute
° C.≡degrees centigrade
sec≡second The gas solubility and diffusivity measurements were made using a gravimetric microbalance (Hiden Isochema Ltd, IGA 003, Warrington, UK). The IGA design integrates precise computer-control and measurement of weight change, pressure and temperature to enable fully automatic and reproducible determination of gas adsorption-desorption isotherms and isobars. The microbalance consists of an electrobalance with sample and counterweight components inside a stainless steel pressure-vessel as shown in FIG. 13 and described in Example 16, Table 20. The balance has a weight range of 0-100 mg with a resolution of 0.1 μg. An enhanced pressure stainless steel (SS316LN) reactor capable of operation to 20.0 bar and 100° C. was installed. Approximately 60 mg of ionic liquid sample was added to the sample container and the reactor was sealed. The sample was dried and degassed by first pulling a coarse vacuum on the sample with a diaphragm pump (Pfeiffer, model MVP055-3, Asslar, Germany) and then fully evacuating the reactor to $10^{-8}$ bar with a turbopump (Pfeiffer, model TSH-071). While under deep vacuum, the sample was heated to 75° C. for 10 hr with an external water jacket connected to a remote-controlled constant-temperature bath (Huber Ministat, model cc-S3, Offenburg, Germany). A 30 percent ethylene glycol and 70 percent water mixture by volume was used as the recirculating fluid with a temperature range of 5 to 90° C. The sample mass slowly decreased as residual water and gases were removed. Once the mass had stabilized for at least 60 min, the sample dry mass was recorded. The percent weight loss for the various ionic liquids tested was in the range of 1 to 3%.

The IGA003 can operate in both dynamic and static mode. Dynamic mode operation provides a continuous flow of gas (max. 500 $cm^3 min^{-1}$) past the sample and the exhaust valve controls the set-point pressure. Static mode operation introduces gas into the top of the balance away from the sample and both the admittance and exhaust valves control the set-point pressure. All absorption measurements were performed in static mode. The sample temperature was measured with a type K thermocouple with an accuracy of ±0.1° C. The thermocouple was located inside the reactor next to the sample container. The water jacket maintained the set-point temperature automatically to within a typical regulation accuracy of ±0.1° C. Four isotherms (at 10, 25, 50, and 75° C.) were measured beginning with 10° C. Once the desired temperature was achieved and stable, the admittance and exhaust valves automatically opened and closed to adjust the pressure to the first set-point. Pressures from $10^{-9}$ to $10^{-1}$ bar were measured using a capacitance manometer (Pfeiffer, model PKR251), and pressures from $10^{-1}$ to 20.0 bar were measured using a piezo-resistive strain gauge (Druck, model PDCR4010, New Fairfield, Conn.). Regulation maintained the reactor pressure set-point to within ±4 to 8 mbar. The pressure ramp rate was set at 200 mbar $min^{-1}$ and the temperature ramp rate was set at 1° C. $min^{-1}$ The upper pressure limit of the stainless steel reactor was 20.0 bar, and several isobars up to 10 bar (i.e., 0.1, 0.5, 1, 4, 7, 10 bar) were measured. To ensure sufficient time for gas-liquid equilibrium, the ionic liquid samples were maintained at set-point for a minimum of 3 hr with a maximum time-out of 8 hr.

The IGA method exploits the relaxation behavior following pressure and temperature changes to simultaneously evaluate the time-dependent absorption and asymptotic uptake. The real-time processor was used to determine the end-point for each isotherm. The percent relaxation used as an end point for the real-time analysis was 99 percent. The minimum weight change for real-time analysis was set at 1 µg, the acceptable average deviation of the model from the acquired data was set at 7 µg, and the target interval for weight acquisition was set at a typical value of 1 µg. The temperature variation during an isotherm was maintained less than 0.1° C. $min^{-1}$.

Safety features of the IGA003 included a pressure relief valve and over-temperature control for the reactor. The factory-installed relief valve was replaced with a DuPont guideline relief valve (Circle-Seal, set-point pressure 24.5 bar; DuPont, Wilmington, Del.). To further protect the microbalance system from over-pressure, additional relief valves were installed on the custom gas manifold and on each gas cylinder; these relief valves were set to open if the pressure exceeded 25 bar. The reactor over-temperature interlock controller that comes standard on the IGA003 was set to turn off the water bath if the temperature exceeded 100° C. Due to the fact that some of the gases tested were flammable (i.e. HFC-32, HFC-143a, and HFC-152a), the IGA003 was mounted inside a custom stainless steel cabinet purged with nitrogen that minimize the possibility of a flame.

Thermogravimetric measurements were corrected for a number of gravitational balance forces introduced at high pressure as described by Pinkerton, E. P., et al., High-pressure gravimetric measurement of hydrogen capacity in vapor-grown carbon nanofibers and related materials [Proceedings of the 11$^{th}$ Canadian Hydrogen Conference, Victoria, BC, 2001, 633-642]). These included:
(1) Changes in the buoyant forces due to changes in pressure and temperature.
(2) Aerodynamic drag forces created by the flow of gases.
(3) Changes in the balance sensitivity due to changes in temperature and pressure.
(4) Volumetric changes in the samples due to expansivit.

The gravitational balance forces previously described are often of the same order of magnitude (0.1 to 5 mg) as the overall weight change in the sample and can lead to inaccurate results if not accounted for precisely. Distinguishing mass changes with an accuracy of 0.01 wt. % on small and sometimes limited sample quantities requires knowledge of the sample weight to within about 5 to 10 µg.

The buoyancy correction follows from Archimedes' principal: there is an upward force exerted on an object equivalent to the mass of fluid displaced. The upward force ($C_b$) due to buoyancy is calculated using eq 27 where the mass of the gas displaced is equivalent to the volume of the submersed object ($V_i$) times the density ($\rho_g$) of the gas at a given (T,P) and the gravitational acceleration (g). If the volume of the object remains constant, $V_i$ can be calculated by knowing the mass ($m_i$) and density ($\rho_i$) of the object.

$$C_b = \text{Buoyancy} = gV_i\rho_g(T, P) = g\frac{m_i}{\rho_i}\rho_g(T, P) \quad (27)$$

Instead of using the gas densities provided in the Hiden Isochema IGA software, the gas density for each gas was calculated using a computer program (REFPROP v.7) developed by the National Institute of Standards and Technology (NIST) (Lemmon E W, et al. [NIST reference fluid thermodynamic and transport properties—REFPROP, version 7.0 user's guide, U.S. Department of Commerce, Technology Administration, National Institute of Standards and Technology, Standard Reference Data Program, Gaithersburg, Md., 2002]).

The buoyancy correction using the IGA003 system involves many additional objects for weighing the sample. Table 20 provides a list of each critical component along with the weight, material, density, and temperature. The component arrangement in FIG. 13 leads to a mass balance as shown by eq 28. This expression accounts for the summation of all components as well as the contribution of the absorbed gas mass ($m_a$) and a correction factor ($C_f$) which accounts for the balance sensitivity to T, P. The density of air ($\rho_{air}$) at ambient temperature and pressure was subtracted from $\rho_i$ and $\rho_j$ because the components were initially weighed in air.

$$\sum_{i=1} m_i - \sum_{j=1} m_j - \sum_{i=1} \frac{m_i}{\rho_i}\rho_g(T_i, P) + \quad (28)$$
$$\sum_{j=1} \frac{m_j}{\rho_j}\rho_g(T_j, P) + m_{IL} + m_a - \frac{m_{IL}}{\rho_s(T_s)}\rho_g(T_s, P) -$$
$$\frac{m_a}{\rho_a(T_s)}\rho_g(T_s, P) - C_f(T_s, P) = \text{reading}$$

The largest contributions in eq 28 are typically those of the sample container, sample, and counter weight; the other referenced objects in Table 20 contribute less because of their larger densities (denominators in eq 28). Physical densities of ionic liquids were measured using a Micromeritics Accupyc 1330 helium pycnometer with an accuracy of ±0.001 g $cm^{-3}$ (Micromeritics Instrument Corp., Norcross, Ga.). Initially, the volume ($V_{IL}$) of each sample was calculated from its pycnometric density ($\rho_s$) and dry mass sample weight ($\rho_s$), but volumetric expansion ($\Delta\tilde{V}/\tilde{V}_0$) due to the gas absorption was later taken into account as described below to more accurately determine the buoyancy effect.

The system was operated in static mode that essentially eliminates any aerodynamic drag forces due to flowing gases.

Electrobalances are sensitive to temperature and pressure fluctuations on the beam arm and internal electronics. To minimize this effect, the balance electronics are heated externally with a band heater to a temperature of 45±0.1° C. In addition, the component temperatures provided in Table 20 are measured for the sample ($T_s$) and all others are estimated. Therefore, a correction factor ($C_f$) was determined as a function of T, P by measuring the buoyancy effect without a sample and calculating a least-squares fit to tare the balance. The correction factor was on the order of 0.1 to 0.3 mg and increased as expected with decreasing temperature and increasing pressure.

Initially the ionic liquid sample volume was considered to be constant and the mole fraction solubility calculated without taking into account buoyancy effects due to sample expansivity. In order to make a proper buoyancy correction due to the liquid volume change, a simple mole fraction average for the molar volume, $\tilde{V}_m$, was used.

$$\tilde{V}_m(T,P) = \tilde{V}_{IL}(1-x) + \tilde{V}_g x, \tag{29}$$

where $\tilde{V}_i = MW_i/\rho_i$ and x represents the molar fraction of gas in the solution.

$$V_m(T, P) = \tilde{V}_m(T, P)\left[\left(\frac{m_{IL}}{MW_{IL}}\right) + \left(\frac{m_g}{MW_g}\right)\right] \tag{30}$$

$$\frac{m_s}{\rho_s(T_s)}\rho_g(T_s, P) + \frac{m_a}{\rho_a(T_s)}\rho_g(T_s, P) = V_m(T, P)\rho_g(T, P) \tag{31}$$

As a first approximation, eqs 29 and 30 were used to estimate the change in the liquid sample volume, $V_m$, at the measured T, P conditions. Eq 31 can be substituted into eq 28 to account for the buoyancy change with respect to sample expansivity.

Besides the equilibrium solubility, time-dependent absorption data were also obtained using the Hiden gravimetric microbalance for each T, P set-point. In order to understand the time-dependent behavior of gas dissolving in liquid, we applied a mathematical model based on a simplified mass diffusion process. Imagine a flat-bottom sample container filled with ionic liquid at a certain liquid level height (L). The height is determined by knowing the cylindrical geometry of the sample container, dry sample weight after evacuation and heating, and the ionic liquid density at the proper temperature. After evacuation, the gas is introduced into the Pyrex® sample container with a constant pressure at a given temperature. A small amount of gas will start dissolving into the ionic liquid, and after a sufficient time it will reach a thermodynamic equilibrium, that is the solubility limit of the gas in the ionic liquid at the given T and P. This transient behavior with time is modeled as described by Shiflett M B, and Yokozeki A, supra; and Yokozeki A, (*Int. J. Refrigeration,* 2002, 22, 695-704).

Processes of gas dissolving in liquid may be highly complex phenomena because of a possible evolution of heat of mixing, the subsequent liquid convection due to the local temperature difference, as well as the free convection due to the density difference, and the possible change in thermophysical properties of the liquid. The following assumptions were made for the dissolving gas (Shiflett, M B, and Yokozeki, A, supra; and Yokozeki A, Time-dependent behavior of gas absorption in lubricant oil [*Int. J. Refrigeration* 2002, 22, 695-704]):

(1) Gas dissolves through a one-dimensional (vertical) diffusion process, in which there is no convective flow in the liquid.

(2) A thin boundary layer between the gas and liquid phases exists, where the thermodynamic equilibrium is instantly established with the saturation concentration ($C_S$), and where the concentration is constant all the time at a given temperature and pressure.

(3) Temperature and pressure are kept constant.

(4) The gas-dissolved liquid is a highly dilute solution, and so the relevant thermophysical properties of the solution do not change.

The process is then described by one-dimensional mass diffusion due to the local concentration difference. The governing differential equations are:

$$\frac{\partial C}{\partial t} = D\frac{\partial^2 C}{\partial z^2} \tag{32}$$

Initial Condition: $C = C_0$ when $t = 0$ and $0 < z < L$ (33)

Boundary Conditions: $C = C_S$ when $t > 0$ and $z = 0$ (34)

$$\frac{\partial C}{\partial z} = 0 \text{ at } z = L \tag{35}$$

where C is the concentration of a dissolving substance in ionic liquid as a function of time, t and vertical location, z, where L is the depth of ionic liquid in the container, and z=0 corresponds to the vapor-liquid boundary. $C_0$ is an initial homogenous concentration of the dissolving gas, and is zero (initially) or a small finite amount at t>0. D is the diffusion coefficient that is assumed to be constant.

Eq 32 can be solved analytically for the initial and boundary conditions eqs 33-35 by a standard method such as separation variables or Laplace transform and yields:

$$C = C_S\left[1 - 2\left(1 - \frac{C_0}{C_S}\right)\sum_{n=0}^{\infty}\frac{\exp(-\lambda_n^2 Dt)\sin\lambda_n z}{L\lambda_n}\right], \tag{36}$$

where $$\lambda_n = \left(n + \frac{1}{2}\right)\frac{\pi}{L}.$$

An experimentally observed quantity at a specified time is the total concentration (or mass) of dissolved gas in ionic liquid, and not the concentration profile in z. This space-averaged concentration at a given time, <C>, can be calculated from eq 37.

$$\langle C \rangle = \int_0^L C\,dz/L \tag{37}$$

$$\langle C \rangle = C_S\left[1 - 2\left(1 - \frac{C_0}{C_S}\right)\sum_{n=0}^{\infty}\frac{\exp(-\lambda_n^2 Dt)}{L^2\lambda_n^2}\right] \tag{38}$$

Although eq 38 contains an infinite summation, only the first few terms, except for initial small time periods, are sufficient in practical applications. In this work, the summation was terminated after ten terms when the numerical contribution to the summation in <C> became less than $10^{-12}$. By analyzing experimental data with this equation, we obtained the saturation concentration ($C_S$) and diffusion constant (D) at given T and P, when $C_0$ was known.

Examples 3-7 and FIGS. 5-9 show solubility and diffusivity results for several hydrofluorocarbons (HFC-32, HFC-125, HFC-134a, HFC-143a, and HFC-152a) in one ionic liquid, [bmim][$PF_6$], at 10, 25, 50, and 75° C. Compositions were prepared that consisted of HFC-32 and [bmim][$PF_6$] from about 0.3 to about 81.2 mole percent of HFC-32 over a temperature range from about 10 to about 75° C. at a pressure from about 0.1 to 10 bar. Compositions were prepared that consisted of HFC-125 and [bmim][$PF_6$] from about 0.1 to about 65.1 mole percent of HFC-125 over a temperature range from about 10 to about 75° C. at a pressure from about 0.1 to 10 bar. Compositions were prepared that consisted of HFC-134a and [bmim][$PF_6$] from about 0.1 to about 72.1 mole percent of HFC-134a over a temperature range from about 10 to about 75° C. at a pressure from about 0.1 to 3.5 bar. Compositions were prepared that consisted of HFC-143a and [bmim][$PF_6$] from about 0.1 to about 23.5 mole percent of HFC-143a over a temperature range from about 10 to about 75° C. at a pressure from about 0.1 to 10 bar. Compositions were prepared that consisted of HFC-152a and [bmim][$PF_6$] from about 0.5 to about 79.7 mole percent of HFC-152a over a temperature range from about 10 to about 75° C. at a pressure from about 0.1 to 4.5 bar.

Figure 10:
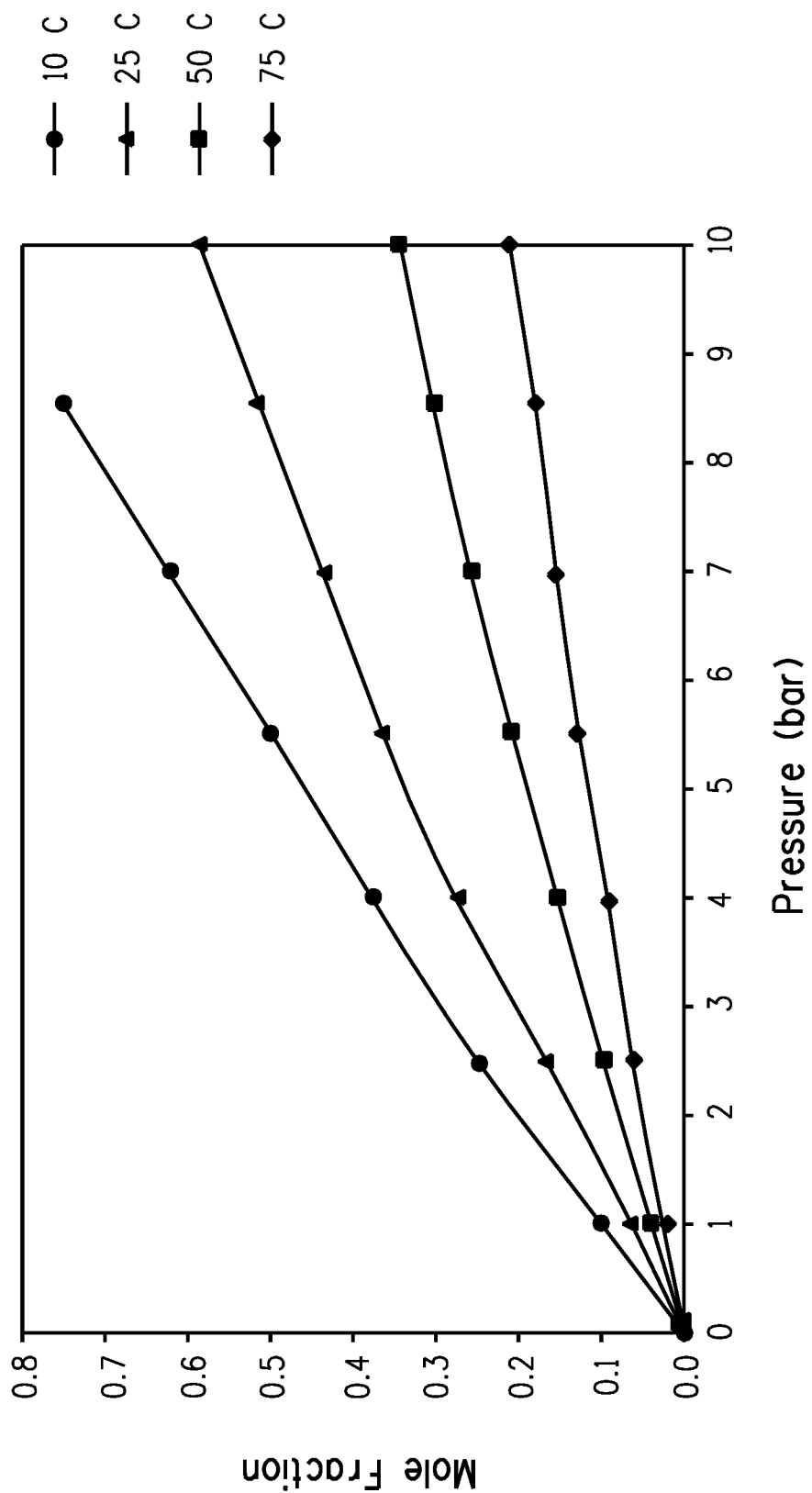
FIG. 10 shows measured isothermal solubility data (in mole fraction) for HFC-32 in [bmim][$BF_4$] as a function of pressure. Filled circles (●) represent measured isothermal data at 10° C., filled triangles (▲) represent measured isothermal data at 25° C., filled squares (■) represent measured isothermal data at 50° C., and filled diamonds (◆) represent measured isothermal data at 75° C. Solid lines represent data trends.
Figure 11:
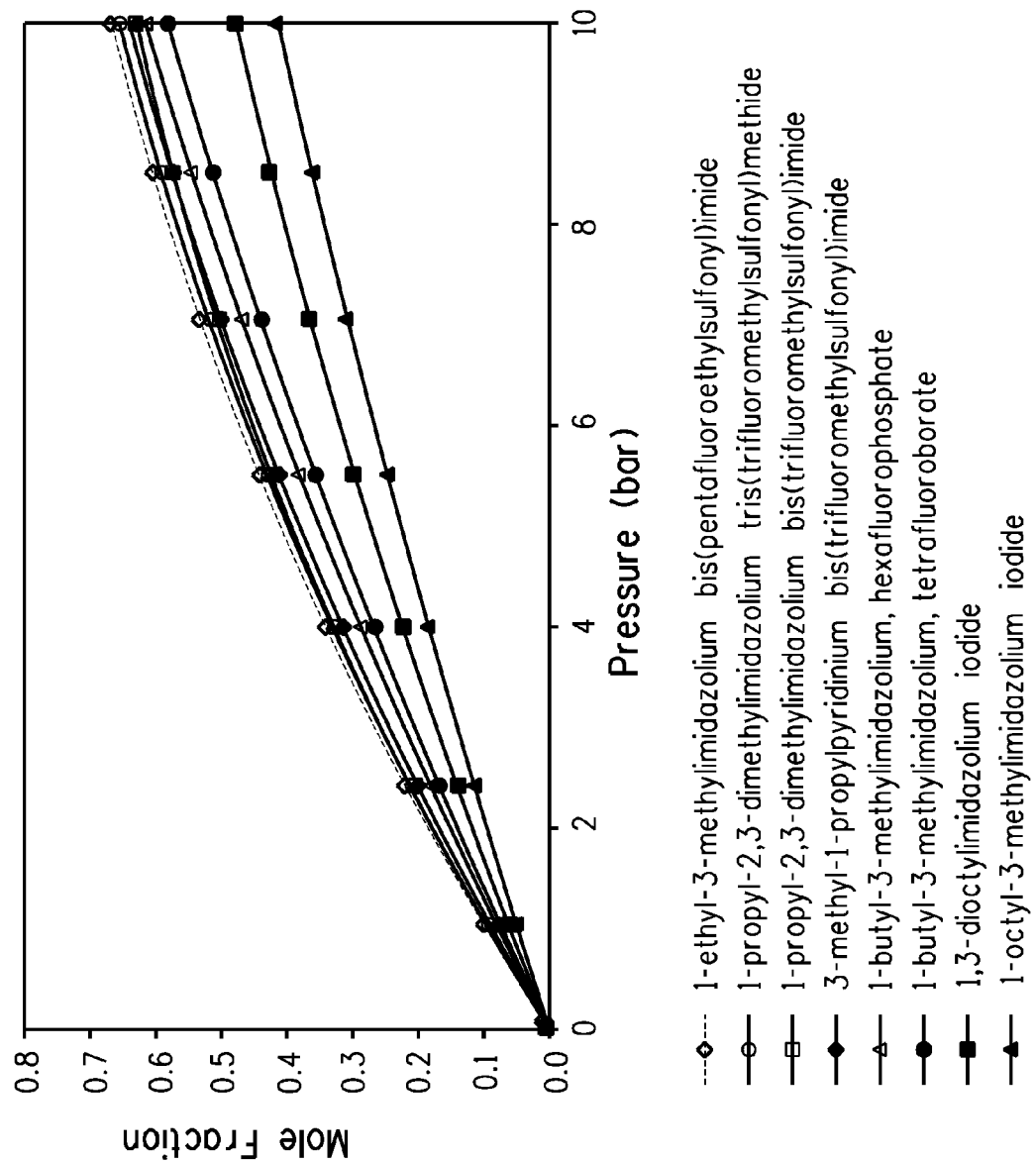
FIG. 11 shows measured isothermal solubility data at 25° C. of the systems HFC-32+eight different ionic liquids as a function of pressure for comparison. Open diamonds (0) represent measured isothermal data for HFC-32+1-ethyl-3-methylimidazolium bis(pentafluoroethylsulfonyl)imide at 25° C., pen circles (○) represent measured isothermal data for HFC-32+1-propyl-2,3-dimethylimidazolium tris(trifluoromethylsulfonyl)methide at 25° C., open squares ( ) represent measured isothermal data for HFC-32+1-propyl-2,3-dimethylimidazolium bis(trifluoromethylsulfonyl)imide at 25° C., closed diamonds (◆) represented measured isothermal data for HFC-32+3-methyl-1-propylpyridinium bis(trifluoromethylsulfonyl)imide, open triangles (Δ) represent measured isothermal data for HFC-32+1-butyl-3-methylimidazolium hexafluorophosphate at 25° C., filled circles (●) represent measured isothermal data for HFC-32+1-butyl-3-methylimidazolium tetrafluoroborate at 25° C., filled squares (■) represent measured isothermal data for HFC-32+1,3-dioctylimidazolium iodide at 25° C., and filled triangles (▲) represent measured isothermal data for HFC-32+1-octyl-3-methylimidazolium iodide at 25° C. Solid lines represent data trends.

Examples 8-14 and FIGS. 10 and 11 show solubility and diffusivity results for HFC-32 in several additional ionic liquids ([bmim][$PF_6$], [bmim][$BF_4$], [dmpim][tTFMSmethide], [omim][I], [doim][I], [emim][bPFESimide], [dmpim][bTFMSimide], and [pmpy][bTFMSimide]). Compositions were prepared that consisted of HFC-32 and [bmim][$BF_4$] from about 0.1 to about 76.5 mole percent of HFC-32 over a temperature range from about 10 to about 75° C. at a pressure from about 0.1 to 10 bar. Compositions were prepared that consisted of HFC-32 and [dmpim][tTFMSmethide] from about 0.4 to about 80.2 mole percent of HFC-32 over a temperature range from about 10 to about 75° C. and a pressure from about 0.1 to 10 bar. Compositions were prepared that consisted of HFC-32 and [omim][I] from about 0.4 to about 41.6 mole percent of HFC-32 at a temperature of about 25° C. and a pressure from about 0.1 to 10 bar. Compositions were prepared that consisted of HFC-32 and [doim][I] from about 0.7 to about 46.8 mole percent of HFC-32 at a temperature of about 25° C. and a pressure from about 0.1 to 10 bar. Compositions were prepared that consisted of HFC-32 and [emim][bPFESimide] from about 1.0 to about 66.6 mole percent of HFC-32 at a temperature of about 25° C. and a pressure from about 0.1 to 10 bar. Compositions were prepared that consisted of HFC-32 and [dmpim][tTFMSimide] from about 0.8 to about 64.5 mole percent of HFC-32 at a temperature of about 25° C. and a pressure from about 0.1 to 10 bar. Compositions were prepared that consisted of HFC-32 and [pmpy][bTFMSimide] from about 1.0 to about 63.9 mole percent of HFC-32 at a temperature of about 25° C. and a pressure from about 0.1 to 10 bar.

Figure 12:
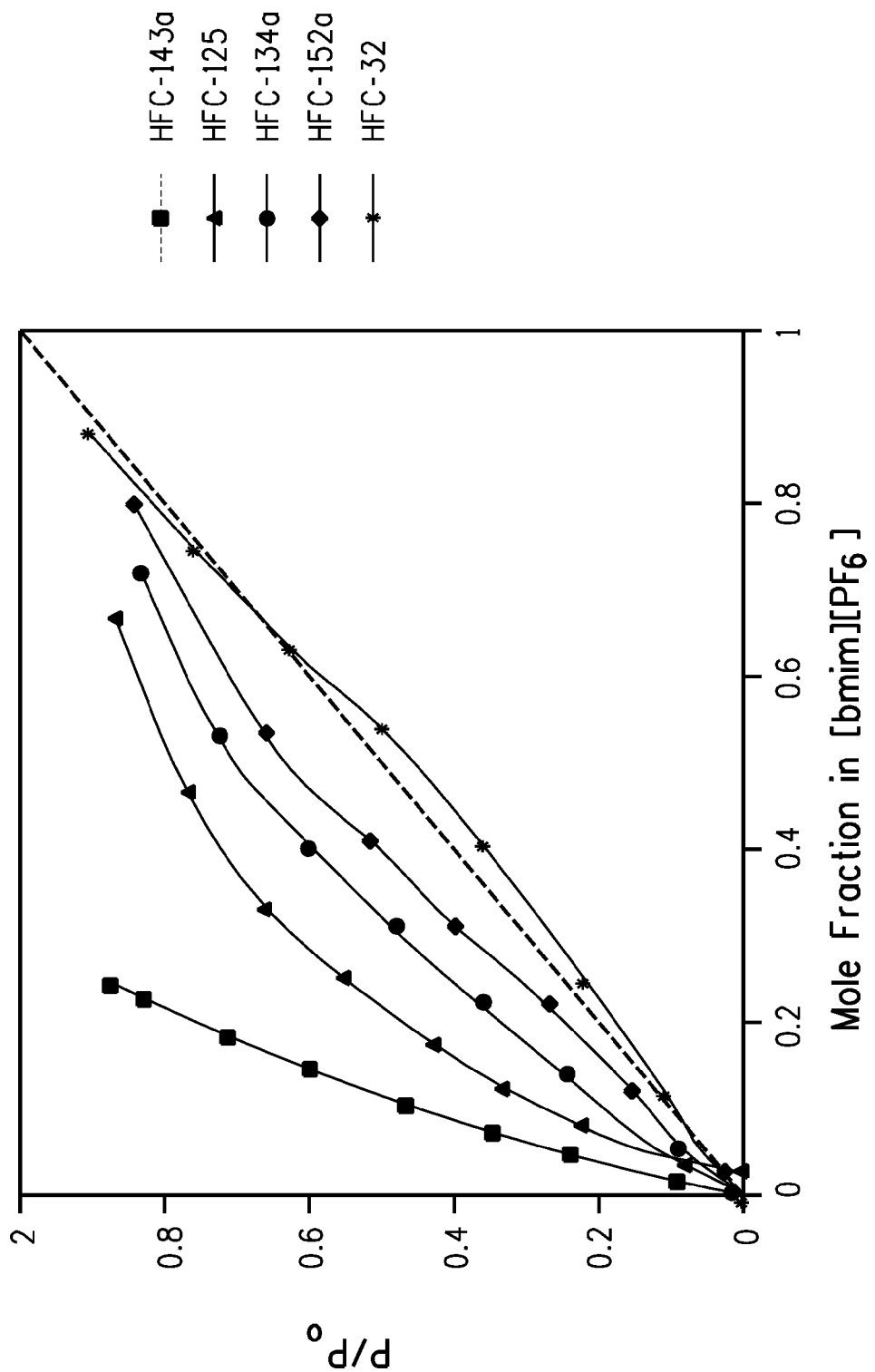
FIG. 12 shows measured isothermal solubility data (in mole fraction) at 10° C. of the systems HFC-32, HFC-152a, HFC-134a, HFC-125, and HFC-143a+[bmim][$PF_6$] in terms of absolute pressure divided by the gas saturation pressure at 10° C. shown by ratio ($P/P_0$). Open cross hatch (x) represents measured isothermal data for HFC-32 at 10° C. with $P_0$=11.069 bar, filled diamonds (◆) represents measured isothermal data for HFC-152a at 10° C. with $P_0$=3.7277 bar, filled circles (●) represent measured isothermal data for HFC-134a at 10° C. with $P_0$=4.1461 bar, filled triangles (▲) represent measured isothermal data for HFC-125 at 10° C. with $P_0$=9.0875 bar, filled squares (■) represent measured isothermal data for HFC-143a at 10° C. with $P_0$=8.3628 bar. Solid lines represent data trend and dashed line represents Raoult's Law.

FIG. 12 shows measured isothermal solubility data (in mole fraction) at 10° C. of the systems HFC-32, HFC-152a, HFC-134a, HFC-125, and HFC-143a+[bmim][$PF_6$] in terms of absolute pressure divided by the gas saturation pressure ($P_0$) at 10° C. shown by ratio ($P/P_0$). The saturation pressures for HFC-32, HFC-125, HFC-134a, HFC-143a, and HFC-152a at 10° C. are $P_0$=11.069 bar, $P_0$=3.7277 bar, $P_0$=4.1461 bar, $P_0$=9.0875, and $P_0$=8.3628 bar, respectively. Negative deviations from Raoult's law (i.e. curvature below the dashed line) are unusual and indicate strong interaction between the refrigerant and the ionic liquid. This in turn translates into high solubility that is ideal for an absorption cycle working fluid. In particular HFC-32 has negative deviation from Raoult's law as shown in FIG. 12. A composition was prepared comprising HFC-32 and [bmim][$PF_6$] from about 0.1 to 63 mole percent of HFC-32 at about 10° C. and $P/P_0$ from about 0.1 to about 0.63. Strong positive deviations from Raoult's law (i.e. curvature above the dashed line) are more typical and indicate refrigerant and ionic liquids are less soluble and eventually may form a liquid-liquid phase separation. A composition was prepared comprising HFC-152a and [bmim][$PF_6$] from about 0.1 to about 80 mole percent of HFC-152a at about 10° C. and $P/P_0$ from 0.1 to about 0.86. A composition was prepared comprising HFC-134a and [bmim][$PF_6$] from about 0.1 to about 72 mole percent of HFC-134a at about 10° C. and $P/P_0$ from about 0.1 to about 0.84. A composition was prepared comprising HFC-125 and [bmim][$PF_6$] from about 0.1 mole to about 65 mole percent of HFC-125 at about 10° C. and $P/P_0$ from about 0.1 to about 0.88. A composition was prepared comprising HFC-143a and [bmim][$PF_6$] from about 0.1 to about 25 mole percent at about 10° C. and $P/P_0$ from about 0.1 to about 0.90.

Example 1

Absorption Cooling Process

TABLE 2

EOS Constants of Pure Refrigerants and Absorbents.

| Compound | Molar Mass | $T_c$ (K) | $P_c$ (kPa) | $\beta_0$ | $\beta_1$ | $\beta_2$ | $\beta_3$ |
|---|---|---|---|---|---|---|---|
| R-32 | 52.02 | 351.26 | 5782 | 1.0019 | 0.48333 | −0.07538 | 0.00673 |
| R-125 | 120.22 | 339.19 | 3637 | 1.0001 | 0.47736 | −0.01977 | −0.0177 |
| R-134a | 102.03 | 374.21 | 4059 | 1.0025 | 0.50532 | −0.04983 | 0 |
| R-134 | 102.03 | 391.97 | 4580 | 1.0012 | 0.48291 | −0.05071 | 0 |
| R-143a | 84.04 | 346.20 | 3759 | 1.0006 | 0.45874 | −0.04846 | −0.0143 |
| R-152a | 66.05 | 386.44 | 4520 | 1.0012 | 0.48495 | −0.08508 | 0.0146 |
| $NH_3$ | 17.03 | 405.40 | 11333 | 1.0018 | 0.46017 | −0.06158 | 0.00168 |
| $H_2O$ | 18.02 | 647.10 | 22064 | 1.0024 | 0.54254 | −0.08667 | 0.00525 |
| [bmim][$PF_6$] | 284.18 | 950 | 2027 | 1 | 0.6571 | 0 | 0 |
| [bmim][$BF_4$] | 226.02 | 950 | 2533 | 1 | 0.8362 | 0 | 0 |

TABLE 3

Coefficients for Ideal Gas Heat Capacity [J · $mol^{-1}$ · $K^{-1}$] in eq 14.

| Compound | $C_0$ | $C_1$ | $C_2$ | $C_3$ |
|---|---|---|---|---|
| R-32 | 20.34 | 0.07534 | $1.872 \times 10^{-5}$ | $-3.116 \times 10^{-8}$ |
| R-125 | 16.58 | 0.33983 | $-2.873 \times 10^{-4}$ | $8.870 \times 10^{-8}$ |
| R-134a | 12.89 | 0.30500 | $-2.342 \times 10^{-4}$ | $6.852 \times 10^{-8}$ |
| R-134 | 15.58 | 0.28475 | $-2.028 \times 10^{-4}$ | $5.395 \times 10^{-8}$ |

TABLE 3-continued

Coefficients for Ideal Gas Heat Capacity [J · mol$^{-1}$ · K$^{-1}$] in eq 14.

| Compound | $C_0$ | $C_1$ | $C_2$ | $C_3$ |
|---|---|---|---|---|
| R-143a | 5.740 | 0.31388 | $-2.595 \times 10^{-4}$ | $8.410 \times 10^{-8}$ |
| R-152a | 8.670 | 0.2394 | $-1.456 \times 10^{-4}$ | $3.392 \times 10^{-8}$ |
| NH$_3$ | 27.31 | 0.02383 | $1.707 \times 10^{-5}$ | $-1.185 \times 10^{-8}$ |
| H$_2$O | 32.24 | $1.924 \times 10^{-3}$ | $1.055 \times 10^{-5}$ | $-3.596 \times 10^{-9}$ |
| [bmim][PF$_6$] | $-2.214$ | 0.57685 | $-3.854 \times 10^{-4}$ | $9.785 \times 10^{-8}$ |
| [bmim][BF$_4$] | 8.946 | 0.43986 | $-1.881 \times 10^{-4}$ | $1.177 \times 10^{-8}$ |

TABLE 4

Binary Interaction Parameters of Refrigerant-Absorbent Pairs Determined from Experimental PTx data shown in Examples 2-7.

| Binary Systems (1)/(2) | $l_{12}$ | $l_{21}$ | $m_{12,21}$ | $\tau_{12,21}$ | $\beta_1$ (absorbent) |
|---|---|---|---|---|---|
| R-32/[bmim][PF$_6$] | $-0.142$ | $-0.0123$ | 0 | 0 | 0.6571 |
| R-32/[bmim][BF$_4$] | $-0.0474$ | $-0.0474$ | 0 | 0 | 0.8362 |
| R-134a/[bmim][PF$_6$] | 0.0730 | 0.0187 | 0 | 0 | 0.6571 |
| R-134/[bmim][PF$_6$] | $-0.0957$ | $-0.1037$ | 0 | 0 | 0.6571 |
| R-152a/[bmim][PF$_6$] | 0.0483 | 0.0212 | 0 | 0 | 0.6571 |
| R-125/[bmim][PF$_6$] | 0.1575 | 0.0218 | 0 | 0 | 0.6571 |
| NH$_3$/H$_2$O | $-0.316$ | $-0.316$ | $-0.0130$ | 0 | 0.54254 |

TABLE 5

Comparisons of Theoretical Absorption Cycle Performances.[a]

| Mode 1 Configuration | $P_{con}$, $P_g$ kPa | $P_{eva}$, $P_a$ kPa | f | $x_g$ mass % | $x_a$ mass % | $Q_e$ kW | COP |
|---|---|---|---|---|---|---|---|
| R-32/[bmim][PF$_6$] | 2486 | 1106 | 7.35 | 90.40 | 78.10 | 250.4 | 0.385 |
| R-32/[bmim][BF$_4$] | 2486 | 1106 | 6.41 | 90.17 | 76.11 | 250.4 | 0.330 |
| R-134a/[bmim][PF$_6$] | 1015 | 414 | 10.66 | 92.36 | 83.70 | 150.8 | 0.254 |
| R-134/[bmim][PF$_6$] | 810 | 322 | 4.38 | 88.75 | 68.48 | 165.5 | 0.348 |
| R-152a/[bmim][PF$_6$] | 907 | 373 | 13.27 | 94.07 | 86.98 | 247.7 | 0.300 |
| R-125/[bmim][PF$_6$] | 2011 | 909 | 16.49 | 92.15 | 86.56 | 82.4 | 0.128 |
| NH$_3$/H$_2$O | 1548 | 615 | 2.54 | 59.5 | 36.1 | 1112 | 0.646 |
| H$_2$O/LiBr | 7.38 | 1.23 | 4.08 | 66.3 | 50.0 | 2502 | 0.833 |

[a]Absorption Cycle conditions: $T_g/T_{con}/T_a/T_{eva}$ = 100/40/30/10° C., and $m_r$ = 1 kg · s$^{-1}$.

Example 2

TABLE 6

Comparisons of Theoretical Vapor Compression and Hybrid Vapor Compression - Absorption Cycle Performances.[a,b]

| | $P_{con}$, $P_g$ kPa | $P_{eva}$, $P_a$ kPa | f | $x_g$ mass % | $x_a$ mass % | $Q_e$ kW | COP |
|---|---|---|---|---|---|---|---|
| Mode 2 Parallel and Series Configuration | | | | | | | |
| R-32[b] | 2486 | 1106 | — | — | — | 250.4 | 7.48 |
| R-134a[b] | 1015 | 414 | — | — | — | 150.8 | 7.95 |
| R-152a[b] | 907 | 373 | — | — | — | 247.7 | 8.21 |
| R-125[b] | 2011 | 909 | — | — | — | 82.4 | 6.66 |
| R-32/R-125[b] (50/50 wt %) | 2393 | 1077 | — | — | — | 161.7 | 7.27 |
| Mode 3 Parallel Configuration | | | | | | | |
| R-32/[bmim][PF$_6$][a+b] | 2486 | 1106 | 7.35 | 90.40 | 78.10 | 500.8 | 0.732 |
| R-32/[bmim][BF$_4$][a+b] | 2486 | 1106 | 6.41 | 90.17 | 76.11 | 500.8 | 0.632 |
| R-134a/[bmim][PF$_6$][a+b] | 1015 | 414 | 10.66 | 92.36 | 83.70 | 301.6 | 0.492 |
| R-152a/[bmim][PF$_6$][a+b] | 907 | 373 | 13.27 | 94.07 | 86.98 | 495.4 | 0.579 |
| R-125/[bmim][PF$_6$][a+b] | 2011 | 909 | 16.49 | 92.15 | 86.56 | 164.8 | 0.251 |
| Mode 3 Series Configuration | | | | | | | |
| R-32/[bmim][PF$_6$][b+c] | 2486 | 1106 | 18.78 | 82.50 | 78.10 | 250.4 | 0.478 |
| R-32/[bmim][BF$_4$][b+c] | 2486 | 1106 | 15.00 | 81.56 | 76.12 | 250.4 | 0.418 |
| R-134a/[bmim][PF$_6$][b+c] | 1015 | 414 | 35.87 | 86.11 | 83.7 | 150.8 | 0.339 |
| R-152a/[bmim][PF$_6$][b+c] | 907 | 373 | 44.21 | 89.0 | 86.98 | 247.8 | 0.356 |
| R-125/[bmim][PF$_6$][b+c] | 2011 | 909 | 79.51 | 87.7 | 86.6 | 82.5 | 0.166 |

[a]Absorption cycle conditions: $T_g/T_{con}/T_a/T_{eva}$ = 100/40/30/10° C., and $m_r$ = 1 kg · s$^{-1}$.
[b]Vapor compression cycle conditions: $T_{con}/T_{eva}$ = 40/10° C., and $m_r$ = 1 kg · s$^{-1}$.
[c]Absorption cycle conditions: $T_g/T_{con}/T_a/T_{eva}$ = 60/40/30/10° C., and $m_r$ = 1 kg · s$^{-1}$.

Example 3

Solubility of Difluoromethane (HFC-32) in 1-butyl-3-methylimidazolium hexafluorophosphate ([bmim][PF$_6$])

A solubility and diffusivity study was made at temperatures of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Tables 7a, 7b, 7c and 7d provide data for $C_o$, $C_s$, D, $X_{calc}$, and $X_{meas}$ at temperatures of 10, 25, 50 and 75° C., respectively.

TABLE 7a

| T (° C.) | P (bar) | $C_o$ (mass %) | $C_s$ (mass %) | D (m$^2$/sec) | $X_{calc.}$ (mol. fraction) | $X_{meas.}$ (mol. fraction) |
|---|---|---|---|---|---|---|
| 10.0 | 0.0979 | — | — | — | — | 0.026 |
| 10.0 | 0.9957 | 0.82 | 2.53 | 1.94E−11 | 0.124 | 0.106 |
| 10.0 | 2.4967 | 3.32 | 7.56 | 1.71E−11 | 0.309 | 0.270 |
| 10.0 | 3.9964 | 8.18 | 12.38 | 3.65E−11 | 0.436 | 0.426 |
| 10.0 | 5.4975 | 14.44 | 18.71 | 6.34E−11 | 0.557 | 0.555 |
| 10.0 | 6.9965 | 22.12 | 27.85 | 7.42E−11 | 0.678 | 0.676 |
| 10.0 | 8.4954 | — | — | — | — | 0.812 |

TABLE 7b

| T (° C.) | P (bar) | $C_o$ (mass %) | $C_s$ (mass %) | D (m$^2$/sec) | $X_{calc.}$ (mol. fraction) | $X_{meas.}$ (mol. fraction) |
|---|---|---|---|---|---|---|
| 24.9 | 0.0965 | — | — | — | — | 0.018 |
| 25.0 | 0.9952 | 0.49 | 1.69 | 2.45E−11 | 0.086 | 0.076 |
| 25.0 | 2.4965 | 2.22 | 4.53 | 2.44E−11 | 0.206 | 0.189 |
| 25.0 | 3.9979 | 5.05 | 7.37 | 3.51E−11 | 0.303 | 0.295 |
| 24.9 | 5.4969 | 8.23 | 10.47 | 5.41E−11 | 0.390 | 0.387 |
| 24.9 | 6.9950 | 11.82 | 14.09 | 6.75E−11 | 0.473 | 0.471 |
| 25.0 | 8.5012 | 15.75 | 18.26 | 8.33E−11 | 0.550 | 0.548 |
| 24.9 | 9.9994 | 20.38 | 23.31 | 8.84E−11 | 0.624 | 0.622 |

TABLE 7c

| T (° C.) | P (bar) | $C_o$ (mass %) | $C_s$ (mass %) | D (m$^2$/sec) | $X_{calc.}$ (mol. fraction) | $X_{meas.}$ (mol. fraction) |
|---|---|---|---|---|---|---|
| 49.6 | 0.0992 | 0.00 | 0.12 | 4.76E−11 | 0.007 | 0.006 |
| 49.9 | 0.9954 | 0.33 | 0.92 | 5.28E−11 | 0.048 | 0.047 |
| 49.9 | 2.4963 | 1.43 | 2.31 | 5.29E−11 | 0.115 | 0.113 |
| 49.9 | 3.9949 | 2.84 | 3.72 | 5.98E−11 | 0.174 | 0.173 |
| 49.9 | 5.4966 | 4.41 | 5.22 | 5.99E−11 | 0.231 | 0.229 |
| 49.9 | 6.9965 | 5.81 | 6.72 | 7.69E−11 | 0.282 | 0.282 |
| 50.0 | 8.4959 | 7.37 | 8.32 | 8.54E−11 | 0.331 | 0.331 |
| 50.0 | 9.9959 | 9.78 | 10.05 | 4.04E−11 | 0.379 | 0.377 |

TABLE 7d

| T (° C.) | P (bar) | $C_o$ (mass %) | $C_s$ (mass %) | D (m$^2$/sec) | $X_{calc.}$ (mol. fraction) | $X_{meas.}$ (mol. fraction) |
|---|---|---|---|---|---|---|
| 75.0 | 0.0988 | 0.00 | 0.06 | 7.12E−11 | 0.003 | 0.003 |
| 75.0 | 0.9968 | 0.30 | 0.56 | 8.19E−11 | 0.030 | 0.029 |
| 75.0 | 2.4950 | 0.96 | 1.38 | 8.14E−11 | 0.071 | 0.069 |
| 75.0 | 3.9944 | 1.74 | 2.19 | 9.82E−11 | 0.109 | 0.108 |
| 74.9 | 5.4983 | 2.60 | 3.03 | 9.70E−11 | 0.146 | 0.145 |
| 74.9 | 6.9966 | 3.42 | 3.89 | 9.58E−11 | 0.181 | 0.180 |
| 75.0 | 8.4958 | 4.28 | 4.77 | 9.56E−11 | 0.215 | 0.212 |
| 75.0 | 9.9989 | 5.12 | 5.62 | 1.18E−10 | 0.245 | 0.244 |

Example 4

Solubility of Pentafluoroethane (HFC-125) in 1-butyl-3-methylimidazolium hexafluorophosphate ([bmim][PF$_6$])

A solubility and diffusivity study was made at temperatures of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Tables 8a, 8b, 8c and 8d provide data for $C_o$, $C_s$, D, $X_{calc}$, and $X_{meas}$ at temperatures of 10, 25, 50 and 75° C., respectively.

TABLE 8a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 9.9  | 0.0992 | 0.0   | 0.12  | 2.52E-12 | 0.003 | 0.013 |
| 10.0 | 0.9964 | 0.73  | 1.50  | 1.83E-11 | 0.035 | 0.034 |
| 10.1 | 1.9959 | 1.72  | 3.96  | 6.36E-12 | 0.089 | 0.074 |
| 10.0 | 2.9960 | 3.55  | 6.25  | 9.31E-12 | 0.136 | 0.125 |
| 10.1 | 3.9964 | 6.03  | 8.88  | 1.56E-11 | 0.187 | 0.182 |
| 9.9  | 4.9965 | 9.10  | 12.52 | 2.44E-11 | 0.253 | 0.250 |
| 10.0 | 5.9965 | 13.18 | 17.56 | 4.05E-11 | 0.335 | 0.336 |
| 9.9  | 6.9962 | 19.19 | 26.04 | 6.12E-11 | 0.455 | 0.454 |
| 10.0 | 7.9979 | —     | —     | —        | —     | 0.651 |

TABLE 8b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0977 | —     | —     | —        | —     | 0.003 |
| 25.0 | 0.9963 | 0.23  | 0.09  | 1.81E-11 | 0.002 | 0.023 |
| 25.0 | 1.9982 | 1.05  | 2.12  | 1.50E-11 | 0.049 | 0.050 |
| 24.9 | 2.9949 | 2.13  | 3.11  | 2.15E-11 | 0.071 | 0.079 |
| 25.0 | 3.9982 | 3.50  | 4.71  | 2.03E-11 | 0.105 | 0.109 |
| 25.0 | 4.9947 | 4.84  | 6.18  | 2.39E-11 | 0.135 | 0.140 |
| 25.0 | 5.9951 | 6.38  | 7.91  | 2.65E-11 | 0.169 | 0.176 |
| 25.0 | 7.9955 | 8.96  | 12.10 | 4.81E-11 | 0.246 | 0.254 |
| 24.9 | 9.9977 | 14.20 | 18.16 | 7.82E-11 | 0.344 | 0.352 |

TABLE 8c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 49.9 | 0.1003 | —    | —    | —        | —     | 0.000 |
| 49.9 | 0.9963 | 0.18 | 0.55 | 4.29E-11 | 0.013 | 0.013 |
| 49.9 | 1.9983 | 0.73 | 1.17 | 4.59E-11 | 0.027 | 0.027 |
| 50.0 | 2.9996 | 1.34 | 1.78 | 5.19E-11 | 0.041 | 0.041 |
| 49.9 | 3.9969 | 1.96 | 2.44 | 4.75E-11 | 0.056 | 0.056 |
| 50.0 | 4.9993 | 2.60 | 3.10 | 5.38E-11 | 0.070 | 0.070 |
| 49.9 | 5.9961 | 3.29 | 3.80 | 5.14E-11 | 0.086 | 0.085 |
| 49.9 | 7.9970 | 4.38 | 5.25 | 5.55E-11 | 0.116 | 0.116 |
| 49.9 | 9.9958 | 5.85 | 6.82 | 5.87E-11 | 0.148 | 0.148 |

TABLE 8d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.1021 | —    | —    | —        | —     | 0.001 |
| 74.9 | 0.9965 | 0.07 | 0.28 | 7.49E-11 | 0.007 | 0.007 |
| 75.0 | 1.9961 | 0.36 | 0.60 | 9.46E-11 | 0.014 | 0.016 |
| 75.1 | 2.9967 | 0.70 | 0.93 | 7.04E-11 | 0.022 | 0.025 |
| 75.0 | 3.9971 | 1.04 | 1.27 | 7.96E-11 | 0.030 | 0.033 |
| 75.0 | 4.9983 | 1.36 | 1.61 | 9.86E-11 | 0.037 | 0.042 |
| 75.0 | 5.9980 | 1.75 | 1.97 | 7.12E-11 | 0.045 | 0.052 |
| 75.1 | 7.9997 | 2.26 | 2.65 | 1.14E-10 | 0.061 | 0.068 |
| 75.0 | 9.9959 | 3.00 | 3.33 | 8.89E-11 | 0.075 | 0.085 |

Example 5

Solubility of 1,1,1-2-tetrafluoroethane (HFC-134a) in 1-butyl-3-methylimidazolium hexafluorophosphate ([bmim][PF$_6$])

A solubility and diffusivity study was made at temperatures of 10, 25, 50, and 75° C. over a pressure range from 0 to 3.5 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Tables 9a, 9b, 9c and 9d provide data for $C_o$, $C_s$, D, $X_{calc}$, and $X_{meas}$ at temperatures of 10, 25, 50 and 75° C., respectively.

TABLE 9a

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 9.8  | 0.0999 | 0.0   | 0.23  | 4.21E-12 | 0.006 | 0.003 |
| 10.0 | 0.4981 | 0.35  | 2.20  | 6.46E-12 | 0.059 | 0.050 |
| 9.9  | 0.9986 | 2.25  | 5.73  | 5.78E-12 | 0.145 | 0.126 |
| 9.9  | 1.4981 | 5.40  | 9.15  | 1.01E-11 | 0.219 | 0.212 |
| 9.9  | 2.0024 | 9.50  | 13.64 | 1.48E-11 | 0.306 | 0.303 |
| 9.9  | 2.4907 | 14.39 | 19.36 | 2.67E-11 | 0.401 | 0.402 |
| 9.9  | 2.9974 | 20.96 | 27.51 | 5.33E-11 | 0.514 | 0.516 |
| 9.9  | 3.4900 | —     | —     | —        | —     | 0.721 |

TABLE 9b

| T (° C.) | P (bar) | $C_o$ (mass %) | $C_s$ (mass %) | $D_{eff.}$ (m²/sec) | $X_{calc.}$ (mol. fraction) | $X_{meas.}$ (mol. fraction) |
|---|---|---|---|---|---|---|
| 25.0 | 0.1002 | —     | —     | —        | —     | 0.011 |
| 24.9 | 0.4981 | 0.57  | 1.52  | 1.89E-11 | 0.041 | 0.042 |
| 25.0 | 0.9972 | 1.82  | 3.26  | 1.71E-11 | 0.086 | 0.085 |
| 25.0 | 1.4987 | 3.60  | 5.09  | 2.00E-11 | 0.130 | 0.130 |
| 25.0 | 1.9930 | 5.43  | 7.09  | 2.27E-11 | 0.175 | 0.175 |
| 24.9 | 2.4996 | 7.53  | 9.31  | 2.59E-11 | 0.222 | 0.222 |
| 25.0 | 2.9952 | 9.78  | 11.82 | 2.82E-11 | 0.272 | 0.273 |
| 24.9 | 3.5000 | 12.51 | 14.62 | 3.99E-11 | 0.323 | 0.323 |

TABLE 9c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 49.9 | 0.0992 | 0.07 | 0.13 | 2.44E-11 | 0.004 | 0.004 |
| 50.0 | 0.4984 | 0.25 | 0.75 | 4.39E-11 | 0.021 | 0.021 |
| 49.9 | 0.9971 | 1.00 | 1.57 | 3.94E-11 | 0.043 | 0.043 |

TABLE 9c-continued

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 49.9 | 1.4989 | 1.79 | 2.42 | 4.48E−11 | 0.064 | 0.065 |
| 50.0 | 1.9895 | 2.65 | 3.28 | 4.38E−11 | 0.086 | 0.086 |
| 50.0 | 2.4900 | 3.75 | 4.23 | 2.33E−11 | 0.110 | 0.108 |
| 50.0 | 2.9897 | 4.43 | 5.10 | 4.90E−11 | 0.130 | 0.130 |
| 50.0 | 3.4933 | 5.39 | 6.06 | 5.00E−11 | 0.152 | 0.152 |

TABLE 9d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.0970 | 0.00 | 0.03 | 6.45E−11 | 0.001 | 0.001 |
| 74.9 | 0.4984 | 0.09 | 0.32 | 7.49E−11 | 0.009 | 0.009 |
| 74.9 | 0.9934 | 0.51 | 0.79 | 7.93E−11 | 0.022 | 0.022 |
| 74.9 | 1.5010 | 0.98 | 1.27 | 7.78E−11 | 0.035 | 0.035 |
| 75.0 | 1.9983 | 1.44 | 1.73 | 8.37E−11 | 0.047 | 0.046 |
| 75.0 | 2.5014 | 1.89 | 2.21 | 8.37E−11 | 0.059 | 0.059 |
| 75.0 | 3.0022 | 2.39 | 2.71 | 8.26E−11 | 0.072 | 0.072 |
| 75.0 | 3.4897 | 2.95 | 3.21 | 5.53E−11 | 0.085 | 0.084 |

Example 6

Solubility of 1,1,1-trifluoroethane (HFC-143a) in 1-butyl-3-methylimidazolium hexafluorophosphate ([bmim][PF$_6$])

A solubility and diffusivity study was made at temperatures of 10, 25, 50, and 75° C. over a pressure range from 0 to 7.5 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Tables 10a, 10b, 10c and 10d provide data for $C_o$, $C_s$, D, $X_{calc}$, and $X_{meas}$ at temperatures of 10, 25, 50 and 75° C., respectively.

TABLE 10a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 11.7 | 0.0956 | 0.03 | 0.10 | 8.10E−12 | 0.003 | 0.003 |
| 12.0 | 0.9970 | 0.22 | 0.92 | 8.51E−12 | 0.031 | 0.029 |
| 11.9 | 1.9830 | 0.99 | 1.93 | 8.11E−12 | 0.064 | 0.060 |
| 12.0 | 2.9740 | 1.95 | 2.39 | 3.21E−12 | 0.078 | 0.093 |
| 12.3 | 3.9808 | 3.06 | 4.03 | 1.04E−11 | 0.127 | 0.124 |
| 12.0 | 4.9975 | 4.16 | 5.23 | 1.10E−11 | 0.161 | 0.156 |
| 12.0 | 5.9821 | 5.30 | 6.42 | 1.44E−11 | 0.192 | 0.188 |
| 12.2 | 6.9975 | 6.54 | 7.63 | 1.94E−11 | 0.223 | 0.219 |
| 12.2 | 7.4832 | 7.80 | 8.31 | 2.03E−11 | 0.239 | 0.235 |

TABLE 10b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0951 | 0.00 | 0.01 | 1.53E−11 | 0.001 | 0.004 |
| 24.9 | 0.9970 | 0.24 | 0.69 | 2.05E−11 | 0.023 | 0.023 |
| 24.9 | 2.0054 | 0.84 | 1.33 | 2.56E−11 | 0.045 | 0.042 |
| 24.9 | 2.9895 | 1.40 | 2.10 | 1.83E−11 | 0.069 | 0.068 |

TABLE 10b-continued

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 24.9 | 4.0147 | 2.26 | 2.89 | 1.77E−11 | 0.093 | 0.090 |
| 24.9 | 4.9886 | 2.95 | 3.60 | 2.24E−11 | 0.114 | 0.112 |
| 24.9 | 5.9855 | 3.71 | 4.33 | 2.73E−11 | 0.136 | 0.134 |
| 24.9 | 7.0019 | 4.47 | 5.12 | 2.83E−11 | 0.157 | 0.155 |
| 24.9 | 7.5011 | 5.14 | 5.53 | 3.61E−11 | 0.169 | 0.165 |

TABLE 10c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 49.9 | 0.1050 | — | — | — | — | 0.001 |
| 49.9 | 1.0023 | 0.16 | 0.40 | 4.47E−11 | 0.014 | 0.013 |
| 50.1 | 2.0045 | 0.61 | 0.84 | 3.41E−11 | 0.028 | 0.027 |
| 50.0 | 3.0002 | 1.03 | 1.26 | 2.90E−11 | 0.042 | 0.040 |
| 50.0 | 4.0021 | 1.39 | 1.65 | 5.08E−11 | 0.055 | 0.054 |
| 50.0 | 5.0046 | 1.81 | 2.08 | 4.10E−11 | 0.069 | 0.067 |
| 50.0 | 6.0039 | 2.29 | 2.50 | 3.75E−11 | 0.082 | 0.079 |
| 50.0 | 7.0029 | 2.63 | 2.90 | 5.57E−11 | 0.094 | 0.092 |
| 50.0 | 10.0030 | 3.56 | 4.16 | 5.51E−11 | 0.131 | 0.127 |

TABLE 10d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.0995 | — | — | — | — | 0.001 |
| 74.9 | 1.0005 | 0.18 | 0.26 | 7.38E−11 | 0.009 | 0.009 |
| 74.8 | 1.9960 | 0.38 | 0.54 | 1.04E−10 | 0.018 | 0.018 |
| 74.9 | 3.0001 | 0.67 | 0.81 | 1.07E−10 | 0.028 | 0.027 |
| 74.9 | 4.0015 | 0.91 | 1.08 | 1.32E−10 | 0.037 | 0.036 |
| 74.9 | 5.0027 | 1.18 | 1.36 | 1.20E−10 | 0.045 | 0.044 |
| 75.0 | 5.9979 | 1.44 | 1.63 | 1.40E−10 | 0.054 | 0.053 |
| 75.0 | 7.0026 | 1.92 | 1.94 | 3.79E−09 | 0.064 | 0.061 |
| 74.9 | 10.0035 | 2.65 | 2.76 | 1.90E−09 | 0.089 | 0.083 |

Example 7

Solubility of 1,1-difluoroethane (HFC-152a) in 1-butyl-3-methylimidazolium hexafluorophosphate ([bmim][PF$_6$])

A solubility and diffusivity study was made at temperatures of 10, 25, 50, and 75° C. over a pressure range from 0 to 4.5 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Tables 9a, 9b, 9c and 9d provide data for $C_o$, $C_s$, D, $X_{calc}$, and $X_{meas}$ at temperatures of 10, 25, 50 and 75° C., respectively.

TABLE 11a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 10.0 | 0.0973 | — | — | — | — | 0.021 |
| 10.0 | 0.4994 | 1.23 | 2.90 | 1.14E−11 | 0.114 | 0.103 |
| 10.0 | 0.9933 | 3.58 | 6.11 | 1.56E−11 | 0.219 | 0.210 |

TABLE 11a-continued

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 10.0 | 1.4985 | 6.91 | 9.60 | 3.09E−11 | 0.314 | 0.301 |
| 9.9 | 2.0011 | 10.40 | 14.00 | 3.60E−11 | 0.412 | 0.407 |
| 9.9 | 2.4952 | 15.52 | 20.42 | 6.44E−11 | 0.525 | 0.521 |
| 9.9 | 3.1963 | — | — | — | — | 0.797 |

TABLE 11b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.1002 | 0.16 | 0.66 | 2.00E−11 | 0.028 | 0.030 |
| 25.0 | 0.5006 | 1.02 | 1.92 | 2.01E−11 | 0.078 | 0.077 |
| 24.9 | 0.9982 | 2.34 | 3.55 | 2.64E−11 | 0.137 | 0.136 |
| 25.0 | 1.4924 | 4.20 | 5.35 | 2.89E−11 | 0.196 | 0.194 |
| 25.0 | 2.4969 | 6.74 | 9.52 | 4.96E−11 | 0.312 | 0.311 |
| 25.0 | 3.4818 | 11.59 | 15.05 | 7.73E−11 | 0.433 | 0.432 |
| 25.0 | 4.5051 | 18.83 | 23.81 | 1.04E−10 | 0.573 | 0.574 |

TABLE 11c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.1 | 0.9921 | 0.03 | 0.15 | 5.73E−11 | 0.007 | 0.007 |
| 50.0 | 1.0017 | 0.88 | 1.46 | 5.52E−11 | 0.060 | 0.060 |
| 50.0 | 1.5020 | 1.63 | 2.22 | 5.94E−11 | 0.089 | 0.089 |
| 50.0 | 2.4969 | 2.72 | 3.81 | 6.43E−11 | 0.145 | 0.145 |
| 50.0 | 4.5051 | 6.31 | 7.33 | 7.88E−11 | 0.254 | 0.254 |

TABLE 11d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 74.9 | 0.1032 | 0.04 | 0.11 | 1.38E−10 | 0.005 | 0.005 |
| 74.9 | 0.5019 | 0.19 | 0.42 | 1.25E−10 | 0.018 | 0.018 |
| 74.9 | 1.0023 | 0.57 | 0.84 | 1.21E−10 | 0.035 | 0.035 |
| 74.9 | 1.5014 | 0.99 | 1.27 | 1.25E−10 | 0.052 | 0.052 |
| 75.0 | 2.4964 | 1.63 | 2.12 | 1.42E−10 | 0.085 | 0.085 |
| 75.0 | 3.4970 | 2.57 | 2.98 | 1.48E−10 | 0.117 | 0.117 |
| 74.8 | 4.5003 | 3.51 | 3.89 | 1.21E−10 | 0.148 | 0.149 |

Example 8

Solubility of Difluoromethane (HFC-32) in 1-butyl-3-methylimidazolium tetrafluoroborate ([bmim][BF$_4$]

A solubility and diffusivity study was made at temperatures of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Tables 12a, 12b, 12c and 12d provide data for $C_o$, $C_s$, D, $X_{calc}$, and $X_{meas}$ at temperatures of 10, 25, 50 and 75° C., respectively.

TABLE 12a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 9.9 | 0.1002 | 8.35 | 9.20 | 1.76E−11 | 0.008 | 0.009 |
| 9.9 | 0.9985 | 10.08 | 13.74 | 1.72E−11 | 0.100 | 0.108 |
| 10.0 | 2.4995 | 15.10 | 18.94 | 3.29E−11 | 0.239 | 0.254 |
| 10.0 | 3.9954 | 21.28 | 25.08 | 4.53E−11 | 0.376 | 0.396 |
| 9.8 | 5.4992 | 28.16 | 33.17 | 8.48E−11 | 0.499 | 0.519 |
| 9.9 | 6.9988 | 37.79 | 46.86 | 1.08E−10 | 0.625 | 0.636 |
| 9.9 | 8.4966 | 52.61 | 52.61 | 1.01E−10 | 0.766 | 0.765 |

TABLE 12b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0969 | 0.01 | 0.15 | 3.37E−11 | 0.007 | 0.006 |
| 25.0 | 0.9968 | 0.59 | 1.81 | 3.36E−11 | 0.074 | 0.070 |
| 25.0 | 2.4955 | 2.75 | 4.79 | 3.70E−11 | 0.180 | 0.174 |
| 25.0 | 3.9989 | 5.87 | 7.95 | 4.62E−11 | 0.273 | 0.270 |
| 25.0 | 5.4977 | 9.23 | 11.36 | 5.98E−11 | 0.358 | 0.356 |
| 25.0 | 6.9955 | 12.90 | 15.12 | 7.44E−11 | 0.436 | 0.434 |
| 25.0 | 8.4945 | 17.08 | 19.33 | 9.10E−11 | 0.510 | 0.510 |
| 25.0 | 9.9985 | 21.83 | 24.46 | 9.94E−11 | 0.585 | 0.583 |

TABLE 12c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.0 | 0.0977 | 0.01 | 0.07 | 8.71E−11 | 0.003 | 0.003 |
| 49.9 | 0.9961 | 0.37 | 0.95 | 7.56E−11 | 0.040 | 0.039 |
| 50.0 | 2.4967 | 1.67 | 2.47 | 7.40E−11 | 0.099 | 0.099 |
| 50.0 | 3.9964 | 3.16 | 4.01 | 8.23E−11 | 0.154 | 0.153 |
| 49.9 | 5.4956 | 4.75 | 5.59 | 8.95E−11 | 0.205 | 0.204 |
| 49.9 | 6.9953 | 6.38 | 7.22 | 9.88E−11 | 0.253 | 0.253 |
| 49.8 | 8.4986 | 8.05 | 8.91 | 1.06E−10 | 0.298 | 0.298 |
| 50.0 | 9.9963 | 9.75 | 10.64 | 1.11E−10 | 0.341 | 0.341 |

TABLE 12d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.0971 | 0.0 | 0.03 | 1.26E−10 | 0.001 | 0.001 |
| 74.9 | 0.9956 | 0.26 | 0.54 | 1.28E−10 | 0.023 | 0.023 |
| 74.9 | 2.4948 | 1.03 | 1.40 | 1.25E−10 | 0.058 | 0.058 |
| 75.0 | 3.9950 | 1.92 | 2.27 | 1.22E−10 | 0.092 | 0.091 |
| 74.9 | 5.4951 | 2.75 | 3.14 | 1.45E−10 | 0.124 | 0.123 |
| 75.0 | 6.9955 | 3.64 | 4.03 | 1.59E−10 | 0.154 | 0.154 |
| 74.9 | 8.4964 | 4.54 | 4.94 | 1.42E−10 | 0.184 | 0.183 |
| 74.9 | 9.9994 | 5.44 | 5.82 | 1.89E−10 | 0.212 | 0.212 |

Example 9

Solubility of Difluoromethane (HFC-32) in 1,2-dimethyl-3-propylimidazolium tris(trifluoromethylsulfonyl)methide ([dmpim][tTFMSmethide]

A solubility and diffusivity study was made at temperatures of 10, 25, 50, and 75° C. over a pressure range from 0 to 10 bar where the solubilities ($X_{meas.}$) were measured using a gravimetric microbalance and the diffusivities (D) were calculated using a one-dimensional diffusion model analysis.

The initial concentration ($C_o$), final saturation concentration ($C_s$), and calculated solubility ($X_{calc}$) are also provided in the table.

Tables 13a, 13b, 13c and 13d provide data for $C_o$, $C_s$, D, $X_{calc}$, and $X_{meas}$ at temperatures of 10, 25, 50 and 75° C., respectively.

TABLE 13a

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 10.0 | 0.1010 | 0.03 | 0.11 | 1.71E−11 | 0.012 | 0.012 |
| 10.0 | 0.9964 | 0.43 | 1.44 | 1.39E−11 | 0.134 | 0.136 |
| 10.0 | 2.4970 | 2.39 | 4.13 | 2.52E−11 | 0.313 | 0.311 |
| 10.0 | 3.9969 | 5.57 | 7.39 | 5.04E−11 | 0.458 | 0.457 |
| 10.0 | 5.4947 | 9.70 | 11.67 | 8.93E−11 | 0.583 | 0.583 |
| 10.0 | 6.9966 | 15.43 | 17.70 | 1.37E−10 | 0.695 | 0.696 |
| 10.0 | 8.4959 | 24.33 | 28.09 | 1.56E−10 | 0.805 | 0.802 |

TABLE 13b

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 24.9 | 0.0998 | 0.01 | 0.09 | 2.71E−11 | 0.010 | 0.010 |
| 24.9 | 0.9997 | 0.42 | 1.01 | 2.52E−11 | 0.098 | 0.096 |
| 24.9 | 2.4956 | — | — | — | — | 0.225 |
| 24.9 | 3.9958 | 3.61 | 4.55 | 5.46E−11 | 0.336 | 0.335 |
| 24.9 | 5.4927 | 5.76 | 6.69 | 7.98E−11 | 0.432 | 0.431 |
| 24.9 | 6.9955 | 8.15 | 9.13 | 1.10E−10 | 0.516 | 0.515 |
| 24.9 | 8.4948 | 11.02 | 12.07 | 1.34E−10 | 0.593 | 0.593 |
| 24.9 | 10.0000 | 14.52 | 15.59 | 1.83E−10 | 0.662 | 0.662 |

TABLE 13c

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 50.0 | 0.0991 | 0.21 | 0.04 | 6.45E−11 | 0.004 | 0.004 |
| 50.0 | 0.9995 | 0.29 | 0.57 | 6.75E−11 | 0.058 | 0.057 |
| 50.0 | 2.4945 | 1.11 | 1.52 | 7.87E−11 | 0.141 | 0.141 |
| 50.0 | 3.9947 | 2.10 | 2.50 | 9.56E−11 | 0.213 | 0.213 |
| 50.0 | 5.4954 | — | — | — | — | 0.278 |
| 50.0 | 6.9968 | — | — | — | — | 0.338 |
| 50.0 | 8.4944 | 5.37 | 5.73 | 1.51E−10 | 0.392 | 0.392 |
| 50.0 | 9.9952 | 6.61 | 6.96 | 1.68E−10 | 0.442 | 0.442 |

TABLE 13d

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 75.0 | 0.0940 | — | — | — | — | 0.000 |
| 74.9 | 1.0018 | 0.06 | 0.31 | 6.06E−11 | 0.032 | 0.031 |
| 75.0 | 2.5040 | 0.71 | 0.89 | 1.23E−10 | 0.087 | 0.087 |
| 74.9 | 3.9958 | 1.32 | 1.49 | 1.26E−10 | 0.138 | 0.138 |
| 74.9 | 5.4938 | 1.92 | 2.09 | 1.59E−10 | 0.184 | 0.184 |
| 74.9 | 7.0051 | 2.58 | 2.72 | 1.35E−10 | 0.229 | 0.229 |
| 74.9 | 8.4954 | 3.24 | 3.37 | 1.19E−10 | 0.270 | 0.268 |
| 74.9 | 10.0046 | 3.89 | 4.05 | 2.10E−10 | 0.309 | 0.308 |

Example 10

Solubility of Difluoromethane (HFC-32) in 1-octyl-3-methylimidazolium iodide ([omim][I]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Table 14 provides data for $C_o$, $C_s$, D, $X_{calc}$, and $X_{meas}$ at a temperature of 25° C.

TABLE 14

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.1007 | 0.01 | 0.06 | 1.75E−11 | 0.004 | 0.004 |
| 25.2 | 1.0021 | 0.23 | 0.80 | 1.77E−11 | 0.048 | 0.048 |
| 25.0 | 2.4971 | 1.20 | 2.13 | 1.86E−11 | 0.119 | 0.118 |
| 25.0 | 3.9999 | 2.58 | 3.55 | 2.27E−11 | 0.186 | 0.185 |
| 25.0 | 5.5008 | 4.07 | 5.04 | 3.13E−11 | 0.247 | 0.246 |
| 25.0 | 6.9964 | 5.64 | 6.64 | 3.81E−11 | 0.306 | 0.306 |
| 25.0 | 8.5027 | 7.52 | 8.33 | 2.86E−11 | 0.360 | 0.362 |
| 25.0 | 10.0022 | 9.27 | 10.35 | 6.37E−11 | 0.417 | 0.416 |

Example 11

Solubility of Difluoromethane (HFC-32) in 1,3-dioctylimidazolium iodide ([doim][I]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Table 15 provides data for $C_o$, $C_s$, D, $X_{calc}$, and $X_{meas}$ at a temperature of 25° C.

TABLE 15

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.1002 | 0.03 | 0.11 | 1.78E−11 | 0.009 | 0.007 |
| 25.0 | 1.0010 | 0.29 | 0.87 | 2.11E−11 | 0.066 | 0.064 |
| 25.0 | 2.5003 | 1.29 | 2.17 | 2.35E−11 | 0.152 | 0.150 |
| 25.0 | 4.0024 | 2.62 | 3.51 | 2.91E−11 | 0.227 | 0.225 |
| 25.0 | 5.5024 | 4.03 | 4.93 | 3.54E−11 | 0.295 | 0.293 |
| 25.0 | 7.0010 | 5.51 | 6.43 | 4.25E−11 | 0.357 | 0.355 |
| 24.9 | 8.4988 | 7.12 | 8.07 | 5.00E−11 | 0.415 | 0.413 |
| 25.0 | 10.0024 | 8.83 | 9.85 | 5.77E−11 | 0.469 | 0.468 |

Example 12

Solubility of Difluoromethane (HFC-32) in 1-ethyl-3-methylimidazolium bis(pentafluoroethylsulfonyl)imide ([emim][bPFESimide]

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Table 16 provides data for $C_o$, $C_s$, D, $X_{calc}$, and $X_{meas}$ at a temperature of 25° C.

TABLE 16

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 25.0 | 0.0956 | 0.03 | 0.11 | 7.46E−11 | 0.010 | 0.010 |
| 25.0 | 0.9970 | 0.71 | 1.22 | 7.95E−11 | 0.104 | 0.104 |
| 25.0 | 2.4959 | 2.49 | 3.19 | 1.09E−10 | 0.237 | 0.237 |
| 25.0 | 3.9961 | 4.61 | 5.33 | 1.31E−10 | 0.347 | 0.347 |
| 25.0 | 5.4925 | 7.03 | 7.75 | 1.57E−10 | 0.443 | 0.442 |
| 25.0 | 6.9931 | 9.70 | 10.49 | 1.83E−10 | 0.525 | 0.525 |
| 25.0 | 8.5025 | 12.87 | 13.71 | 2.07E−10 | 0.600 | 0.598 |
| 25.0 | 10.0050 | 16.49 | 17.56 | 1.66E−10 | 0.668 | 0.666 |

Example 13

Solubility of Difluoromethane (HFC-32) in 1,2-dimethyl-3-propylimidazolium bis(trifluoromethylsulfonyl)imide ([dmpim][bTFMSimide])

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Table 17 provides data for $C_o$, $C_s$, D, $X_{calc}$, and $X_{meas}$ at a temperature of 25° C.

TABLE 17

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 24.9 | 0.0989 | 0.02 | 0.11 | 6.31E−11 | 0.008 | 0.008 |
| 25.0 | 0.9951 | 0.65 | 1.22 | 6.60E−11 | 0.091 | 0.090 |
| 25.0 | 2.4949 | 2.44 | 3.25 | 8.94E−11 | 0.213 | 0.212 |
| 25.0 | 3.9762 | 4.62 | 5.46 | 1.21E−10 | 0.317 | 0.317 |
| 25.0 | 5.5013 | 7.08 | 8.00 | 1.46E−10 | 0.412 | 0.412 |
| 25.0 | 7.0174 | 10.02 | 10.92 | 1.75E−10 | 0.497 | 0.496 |
| 25.0 | 8.5131 | 13.56 | 14.29 | 2.23E−10 | 0.573 | 0.573 |
| 25.0 | 10.0108 | 17.55 | 18.41 | 2.33E−10 | 0.645 | 0.645 |

Example 14

Solubility of Difluoromethane (HFC-32) in 1-propyl-3-methylpyridinium bis(trifluoromethylsulfonyl)imide ([pmpy][bTFMSimide])

A solubility and diffusivity study was made at a temperature of 25° C. over a pressure range from 0 to 10 bar where the solubilities ($X_{meas.}$) were measured using a gravimetric microbalance and the diffusivities (D) were calculated using a one-dimensional diffusion model analysis. The initial concentration ($C_o$), final saturation concentration ($C_s$), and calculated solubility ($X_{calc.}$) are also provided in the table.

Table 18 provides data for $C_o$, $C_s$, D, $X_{calc}$, and $X_{meas}$ at a temperature of 25° C.

TABLE 18

| T (° C.) | P (bar) | $C_o$ (mass %) | $C_s$ (mass %) | D (m²/sec) | $X_{calc.}$ (mol. fraction) | $X_{meas.}$ (mol. fraction) |
|---|---|---|---|---|---|---|
| 24.9 | 0.0951 | 0.02 | 0.12 | 9.96E−11 | 0.010 | 0.010 |
| 24.9 | 1.0020 | 0.74 | 1.32 | 1.00E−10 | 0.097 | 0.096 |
| 24.9 | 2.5034 | — | — | — | — | 0.221 |
| 24.9 | 3.9959 | 4.93 | 5.73 | 1.52E−10 | 0.327 | 0.328 |
| 24.9 | 5.4973 | 7.52 | 8.30 | 1.92E−10 | 0.420 | 0.419 |
| 24.9 | 6.9923 | 10.35 | 11.16 | 2.20E−10 | 0.501 | 0.502 |
| 24.9 | 8.4965 | 13.61 | 14.48 | 2.41E−10 | 0.575 | 0.575 |
| 24.9 | 10.0044 | 17.35 | 18.06 | 6.21E−10 | 0.638 | 0.639 |

Example 15

Solubility of 1,1,2,2-tetrafluoroethane (HFC-134) in 1-butyl-3-methylimidazolium hexafluorophosphate ([bmim][PF$_6$]

A solubility study was made at temperatures of 10, 25, 50, and 75° C. over a pressure range from 0 to 3.5 bar where the solubilities ($X_{meas.}$) were measured using a gravimetric microbalance.

Tables 20a, 20b, 20c and 20d provide data for $X_{meas}$ at temperatures of 10, 25, 50 and 75° C., respectively.

TABLE 19a

| T (° C.) | P (bar) | $X_{meas.}$ (mol. fraction) |
|---|---|---|
| 10.0 | 0.010 | 0.031 |
| 10.0 | 0.500 | 0.189 |
| 10.0 | 1.000 | 0.377 |
| 10.0 | 1.500 | 0.541 |
| 10.0 | 2.000 | 0.683 |
| 10.0 | 2.500 | 0.788 |

TABLE 19b

| T (° C.) | P (bar) | $X_{meas.}$ (mol. fraction) |
|---|---|---|
| 25.0 | 0.100 | 0.024 |
| 25.0 | 0.500 | 0.116 |
| 24.9 | 1.000 | 0.225 |
| 24.9 | 1.500 | 0.330 |
| 24.9 | 2.000 | 0.428 |
| 25.0 | 2.500 | 0.522 |
| 24.9 | 3.000 | 0.611 |
| 24.9 | 3.500 | 0.689 |

TABLE 19c

| T (° C.) | P (bar) | $X_{meas.}$ (mol. fraction) |
|---|---|---|
| 50.0 | 0.100 | 0.006 |
| 50.0 | 0.500 | 0.049 |
| 50.0 | 1.000 | 0.103 |
| 50.0 | 1.500 | 0.154 |
| 50.0 | 2.000 | 0.204 |
| 50.0 | 2.500 | 0.253 |
| 50.0 | 3.000 | 0.300 |
| 50.0 | 3.500 | 0.344 |

TABLE 19d

| T (° C.) | P (bar) | $X_{meas}$ (mol. fraction) |
|---|---|---|
| 74.9 | 0.100 | 0.006 |
| 75.0 | 0.500 | 0.029 |
| 75.0 | 1.000 | 0.058 |
| 75.0 | 1.500 | 0.086 |
| 75.0 | 2.000 | 0.113 |
| 75.0 | 2.500 | 0.140 |
| 75.0 | 3.000 | 0.166 |
| 75.0 | 3.500 | 0.194 |

Example 16

The description of the microbalance components shown in FIG. 13 are provided in Table 20.

TABLE 20

Microbalance Components Contributing to Buoyancy Calculation

| Subscript | Item | Weight (g) | Material | Density (g · cm$^{-3}$) | Temperature (° C.) |
|---|---|---|---|---|---|
| s | Dry sample | $m_s$ | [bmim][PF$_6$] [bmim][BF$_4$] | $\rho_s$ | Sample Temp. ($T_s$) |
| a | Interacted gas | $m_a$ | CO$_2$ | $\rho_a$ | ($T_s$) |
| i$_1$ | Sample container | 0.5986 | Pyrex | 2.23 | ($T_s$) |
| i$_2$ | Wire | 0.051 | Tungsten | 21.0 | ($T_s$) |
| i$_3$ | Chain | 0.3205 | Gold | 19.3 | 30 |
| j$_1$ | Counter-weight | 0.8054 | Stainless Steel | 7.9 | 25 |
| j$_2$ | Hook | 0.00582 | Tungsten | 21.0 | 25 |
| j$_3$ | Chain | 0.2407 | Gold | 19.3 | 30 |

What is claimed is:

1. A process for adjusting the temperature of an object, medium or a space comprising
    (a) absorbing refrigerant vapor with an absorbent to form a mixture;
    (b) heating the mixture to separate refrigerant, in vapor form, from the absorbent and increase the pressure of the refrigerant vapor;
    (c) condensing the refrigerant vapor under pressure to a liquid;
    (d) reducing the pressure of the liquid refrigerant, and evaporating the refrigerant to form first and second portions of refrigerant vapor;
    (e-1) mechanically increasing the pressure of the first portion of refrigerant vapor, and then repeating step (c) to subject the first portion of refrigerant vapor to condensation to liquid; and
    (e-2) repeating step (a) to re-absorb, with the absorbent, the second portion of refrigerant vapor;
    wherein the absorbent comprises one or more ionic liquids; and
    wherein the refrigerant is selected from one or more members of the group consisting of hydrofluorocarbons, N$_2$, O$_2$, CO$_2$, Ar, H$_2$ and non-fluorinated hydrocarbons, wherein a non-fluorinated hydrocarbon is selected from the group consisting of C$_1$ to C$_4$ straight-chain, branched or cyclic alkanes and C$_1$ to C$_4$ straight-chain, branched or cyclic alkenes.

2. A process according to claim 1 wherein, in step (c), the refrigerant vapor is condensed to the liquid in proximity to the object, medium or space to heat the object, medium or space.

3. A process according to claim 1 wherein, in step (d), liquid refrigerant is evaporated to form refrigerant vapor in proximity to the object, medium or space to cool the object, medium or space.

4. A process for adjusting the temperature of an object, medium or a space comprising
    (a) absorbing refrigerant vapor with an absorbent to form a mixture;
    (b) heating the mixture to separate refrigerant, in vapor form, from the absorbent and increase the pressure of the refrigerant vapor;
    (c) further increasing the pressure of the refrigerant vapor mechanically;
    (d) condensing the refrigerant vapor under pressure to a liquid;
    (e) reducing the pressure of the liquid refrigerant, and evaporating the refrigerant to form refrigerant vapor; and
    (f) repeating step (a) to re-absorb the refrigerant vapor with the absorbent;
    wherein the absorbent comprises one or more ionic liquids; and
    wherein the refrigerant is selected from one or more members of the group consisting of hydrofluorocarbons, N$_2$, O$_2$, CO$_2$, Ar, H$_2$ and non-fluorinated hydrocarbons, wherein a non-fluorinated hydrocarbon is selected from the group consisting of C$_1$ to C$_4$ straight-chain, branched or cyclic alkanes and C$_1$ to C$_4$ straight-chain, branched or cyclic alkenes.

5. A process according to claim 4 wherein, in step (d), the refrigerant vapor is condensed to the liquid in proximity to the object, medium or space to heat the object, medium or space.

6. A process according to claim 4 wherein, in step (e), liquid refrigerant is evaporated to form refrigerant vapor in proximity to the object, medium or space to cool the object, medium or space.

7. A process according to claim 1 or 4 wherein the absorbent separated from refrigerant in step (b) is recirculated for use in a later step.

8. A process according to claim 1 or 4 wherein the ionic liquid comprises a cation selected from the group consisting of:

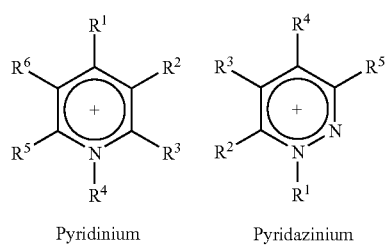

Pyridinium        Pyridazinium

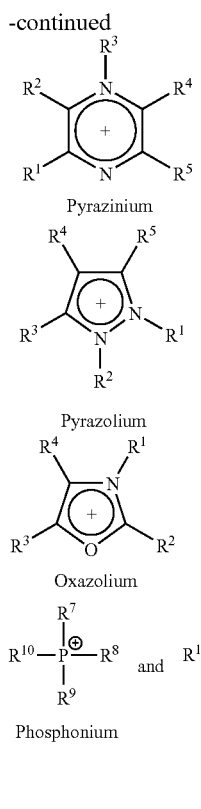

Pyrimidinium, Pyrazinium, Imidazolium, Pyrazolium, Thiazolium, Oxazolium, Triazolium, Phosphonium, Ammonium wherein $R^1$, $R^2$, $R^3$, $R^4$, $R^5$ and $R^6$ are each independently selected from the group consisting of:
(i) H;
(ii) halogen;
(iii) —$CH_3$, —$C_2H_5$, or a $C_3$ to $C_{25}$ straight-chain, branched or cyclic alkane or alkene group, optionally substituted with at least one member selected from the group consisting of Cl, Br, F, I, OH, $NH_2$ and SH;
(iv) —$CH_3$, —$C_2H_5$, or a $C_3$ to $C_{25}$ straight-chain, branched or cyclic alkane or alkene group comprising one to three heteroatoms selected from the group consisting of O, N, Si and S, and optionally substituted with at least one member selected from the group consisting of Cl, Br, F, I, OH, $NH_2$ and SH;
(v) a $C_6$ to $C_{20}$ unsubstituted aryl, or a $C_6$ to $C_{25}$ unsubstituted heteroaryl, group having one to three heteroatoms independently selected from the group consisting of O, N, Si and S; and
(vi) a $C_6$ to $C_{25}$ substituted aryl, or a $C_6$ to $C_{25}$ substituted heteroaryl, group having one to three heteroatoms independently selected from the group consisting of O, N, Si and S; wherein said substituted aryl or substituted heteroaryl group has one to three substituents independently selected from the group consisting of:
1. —$CH_3$, —$C_2H_5$, or a $C_3$ to $C_{25}$ straight-chain, branched or cyclic alkane or alkene group, optionally substituted with at least one member selected from the group consisting of Cl, Br, F I, OH, $NH_2$ and SH;
2. OH,
3. $NH_2$, and
4. SH; and wherein $R^7$, $R^8$, $R^9$, and $R^{10}$ are each independently selected from the group consisting of:
(i) —$CH_3$, —$C_2H_5$, or a $C_3$ to $C_{25}$ straight-chain, branched or cyclic alkane or alkene group, optionally substituted with at least one member selected from the group consisting of Cl, Br, F, I, OH, $NH_2$ and SH;
(ii) —$CH_3$, —$C_2H_5$, or a $C_3$ to $C_{25}$ straight-chain, branched or cyclic alkane or alkene group comprising one to three heteroatoms selected from the group consisting of O, N, Si and S, and optionally substituted with at least one member selected from the group consisting of Cl, Br, F, I, OH, $NH_2$ and SH;
(iii) a $C_6$ to $C_{25}$ unsubstituted aryl, or a $C_6$ to $C_{25}$ unsubstituted heteroaryl, group having one to three heteroatoms independently selected from the group consisting of O, N, Si and S; and
(iv) a $C_6$ to $C_{25}$ substituted aryl, or a $C_6$ to $C_{25}$ substituted heteroaryl, group having one to three heteroatoms independently selected from the group consisting of O, N, Si and S; wherein said substituted aryl or substituted heteroaryl group has one to three substituents independently selected from the group consisting of:
(1) —$CH_3$, —$C_2H_5$, or a $C_3$ to $C_{25}$ straight-chain, branched or cyclic alkane or alkene group, optionally substituted with at least one member selected from the group consisting of Cl, Br, F, I, OH, $NH_2$ and SH,
(2) OH,
(3) $NH_2$, and
(4) SH; and wherein optionally at least two of $R^1$, $R^2$, $R^3$, $R^4$, $R^5$, $R^6$, $R^7$, $R^8$, $R^9$, and $R^{10}$ can together form a cyclic or bicyclic alkanyl or alkenyl group.

9. A process according to claim 8 wherein any one of, or any group of more than one of, $R^1$, $R^2$, $R^3$, $R^4$, $R^5$, $R^6$, $R^7$, $R^8$, $R^9$ and $R^{10}$ comprises F—.

10. A process according to claim 1 or 4 wherein the ionic liquid comprises an anion selected from the group consisting of $[CH_3CO_2]^-$, $[HSO_4]^-$, $[CH_3OSO_3]^-$, $[C_2H_5OSO_3]^-$, $[AlCl_4]^-$, $[CO_3]^{2-}$, $[HCO_3]^-$, $[NO_2]^-$, $[NO_3]^-$, $[SO_4]^{2-}$, $[PO_4]^{3-}$, $[HPO_4]^{2-}$, $[H_2PO_4]^-$, $[HSO_3]^-$, $[CuCl_2]^-$, $Cl^-$, $Br^-$, $I^-$, $SCN^-$ and any fluorinated anion.

11. A process according to claim 1 or 4 wherein the ionic liquid comprises a fluorinated anion selected from the group consisting of $[BF_4]^-$, $[PF_6]^-$, $[SbF_6]^-$, $[CF_3SO_3]^-$, $[HCF_2CF_2SO_3]^-$, $[CF_3HFCCF_2SO_3]^-$, $[HCClFCF_2SO_3]^-$, $[(CF_3SO_2)_2N]^-$, $[(CF_3CF_2SO_2)_2N]^-$, $[(CF_3SO_2)_3C]^-$, $[CF_3CO_2]^-$, $[CF_3OCFHCF_2SO_3]^-$, $[CF_3CF_2OCFHCF_2SO_3]^-$, $[CF_3CFHOCF_2CF_2SO_3]^-$, $[CF_2HCF_2OCF_2CF_2SO_3]^-$, $[CF_2ICF_2OCF_2CF_2SO_3]^-$, $[CF_3CF_2OCF_2CF_2SO_3]^-$, $[(CF_2HCF_2SO_2)_2N]^-$, $[(CF_3CFHCF_2SO_2)_2N]^-$, and $F^-$.

12. A process according to claim 1 or 4 wherein the hydrofluorocarbon is selected from the group consisting of: difluoromethane (HFC-32), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), and fluoroethane (HFC-161) and mixtures thereof.

13. A process according to claim 1 or 4 wherein the ionic liquid absorbent comprises one or both of a fluorinated cation and a fluorinated anion; and the refrigerant comprises the hydrofluorocarbon.

* * * * *